United States Patent
Kim et al.

(10) Patent No.: US 10,925,086 B2
(45) Date of Patent: Feb. 16, 2021

(54) EFFICIENT SYSTEM INFORMATION REQUEST METHOD AND APPARATUS OF TERMINAL IN NEXT GENERATION MOBILE COMMUNICATION SYSTEM

(71) Applicant: Samsung Electronics Co., Ltd., Suwon-si (KR)

(72) Inventors: Sangbum Kim, Suwon-si (KR); Soenghun Kim, Suwon-si (KR); Seungri Jin, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/244,580

(22) Filed: Jan. 10, 2019

(65) Prior Publication Data

US 2019/0215862 A1     Jul. 11, 2019

(30) Foreign Application Priority Data

Jan. 10, 2018    (KR) ........................ 10-2018-0003537

(51) Int. Cl.
    *H04W 72/14*     (2009.01)
    *H04W 74/00*     (2009.01)
    *H04W 74/08*     (2009.01)

(52) U.S. Cl.
    CPC ......... *H04W 72/14* (2013.01); *H04W 74/006* (2013.01); *H04W 74/0833* (2013.01); *H04W 74/0841* (2013.01)

(58) Field of Classification Search
None
See application file for complete search history.

(56) References Cited

U.S. PATENT DOCUMENTS

| | | | |
|---|---|---|---|
| 2015/0098400 A1* | 4/2015 | Lee | H04W 56/0045 370/329 |
| 2017/0332372 A1 | 11/2017 | Lee et al. | |
| 2018/0279375 A1* | 9/2018 | Jeon | H04W 72/14 |

FOREIGN PATENT DOCUMENTS

KR    10-2018-0106506 A    10/2018

OTHER PUBLICATIONS

Samsung, 'On Demand SI: Remaining Issues', R2-1710096,3GPP TSG-RAN WG2 #99bis, Prague, Czech Republic, Sep. 29, 2017.
Asustek, 'Discussion on On-demand system information request in NR', R2-1712214, 3GPP TSGRAN WG2 Meeting #100, Reno, USA, Nov. 16, 2017.

(Continued)

*Primary Examiner* — Yaotang Wang
(74) *Attorney, Agent, or Firm* — Jefferson IP Law, LLP

(57) ABSTRACT

The disclosure relates to a communication scheme and system for converging a $5^{th}$ generation (5G) communication system for supporting a data rate higher than that of a $4^{th}$ generation (4G) system with an internet of things (IoT) technology. The disclosure is applicable to intelligent services (e.g., smart home, smart building, smart city, smart car, connected car, health care, digital education, retail, and security and safety-related services) based on 5G communication technology and IoT-related technology. The disclosure relates to a technology about system information request-related operations of a terminal and a base station.

12 Claims, 39 Drawing Sheets

(56) References Cited

OTHER PUBLICATIONS

LG Electronics Inc., 'Efficient SI request for other SI', R2-167051, 3GPP TSG-RAN WG2 #95bis, Kaohsiung, Taiwan, Oct. 1, 2016.
3GPP; TSGRAN; Study on New Radio (NR) access technology (Release 14), 3GPP TR 38.912 V14.1.0, Aug. 3, 2017.
International Search Report dated Apr. 16, 2019, issued in International Application No. PCT/KR2019/000410.
Extended European Search Report dated Nov. 26, 2020, issued in a counterpart European Application No. 19739136.0- 1215/3721660.
"3rd Generation Partnership Project; Technical Specification Group Radio Access Network; NR; Medium Access control (MAC) protocol specification (Release 15)", 3GPP Standard; Technical Specification; 3GPP TS 38.321, vol. RAN WG2, No. V1.1.0, pp. 1-64, XP051391736; Nov. 16, 2017.
Vivo: "Other SI request and delivery", 3GPP Draft; R2-1704585, vol. RAN WG2, XP051275140; May 14, 2017.
Vivo: "Discussion on the RACH procedure for on-demand SI", 3GPP Draft; R2-1804691, vol. RAN XP051414844; Apr. 5, 2018.

\* cited by examiner (a)

| | C₇ | C₆ | C₅ | C₄ | C₃ | C₂ | C₁ | R |
|---|---|---|---|---|---|---|---|---|
| 3c-05 | | | | | | | | |
| 3c-10 | P | V | PH (Type 2, PCell) | | | | | |
| 3c-15 | R | R | $P_{CMAX,c}$ 1 | | | | | |
| 3c-20 | P | V | PH (Type 1, PCell) | | | | | |
| 3c-25 | R | R | $P_{CMAX,c}$ 2 | | | | | |
| 3c-30 | P | V | PH (Type x, SCell 1) | | | | | |
| 3c-35 | R | R | $P_{CMAX,c}$ 3 | | | | | |

...

| P | V | PH (Type x, SCell n) |
|---|---|---|
| R | R | $P_{CMAX,c}$ m |

FIG. 3H

| R | R | PH (Type 1, PCell) | ~ 3h-05 |
| R | R | P CMAX,c 1 | ~ 3h-10 |
| R | R | PH (Type x, PCell) | ~ 3h-15 |
| R | R | P CMAX,c 1 | ~ 3h-20 |

Present if Pcell is configured with SUL, x is 3 if SUL is SRS-only uplink

FIG. 31

| C7 | C6 | C5 | C4 | C3 | C2 | C1 | R |  |
|----|----|----|----|----|----|----|----|---|
| R | R | | | | | | | 31-05 |
| R | R | PH (Type 1, PCell) | | | | | | 31-10 |
| R | R | P CMAX,c 1 | | | | | | 31-15 Present if Pcell is configured with SUL, x is 3 if SUL is SRS-only uplink |
| R | R | PH (Type X, PCell) | | | | | | 31-20 |
| R | R | P CMAX,c 1 | | | | | | 31-25 |
| R | R | PH (Type X, SCell 1) | | | | | | 31-30 x is 3 if SCell 1 UL is SRS-only UL |
| R | R | P CMAX,c 2 | | | | | | 31-35 Present if SCell 1 is configured with SUL, x is 3 if the SUL of SCell 1 is SRS-only uplink |
| R | R | PH (Type X, SCell 1) | | | | | | 31-40 |
| R | R | P CMAX,c 2 | | | | | | 31-45 |

...

| | | |
|---|---|---|
| R | R | PH (Type X, SCell n) |
| R | R | P CMAX,c m |
| R | R | PH (Type X, SCell n) |
| R | R | P CMAX,c m | x is 3 if SCell n UL is SRS-only UL

Present if SCell n is configured with SUL, x is 3 if the SUL of SCell n is SRS-only uplink

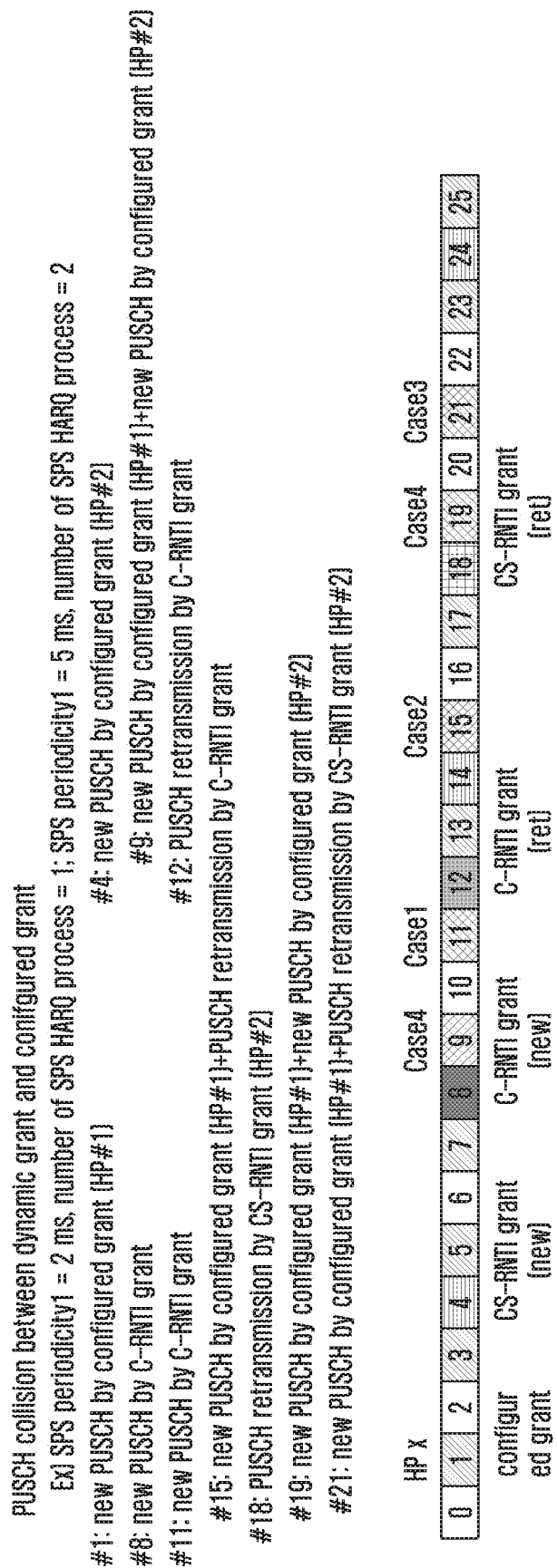

EFFICIENT SYSTEM INFORMATION REQUEST METHOD AND APPARATUS OF TERMINAL IN NEXT GENERATION MOBILE COMMUNICATION SYSTEM

CROSS-REFERENCE TO RELATED APPLICATION(S)

This application is based on and claims priority under 35 U.S.C. § 119(a) of a Korean patent application number 10-2018-0003537, filed on Jan. 10, 2018, in the Korean Intellectual Property Office, the disclosure of which is incorporated by reference herein in its entirety.

BACKGROUND

1. Field

The disclosure relates to system information request-related operations of a terminal and a base station in a next generation mobile communication system.

2. Description of the Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post long term evolution (LTE) System". Implementation of the 5G communication system in higher frequency (mm-Wave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system.

In addition, in the 5G communication system, there are developments under way for system network improvement based on advanced small cells, cloud radio access networks (RANs), ultra-dense networks, device-to-device (D2D) communication, wireless backhaul, moving network, cooperative communication, Coordinated Multi-Points (CoMP), reception-end interference cancellation, and the like.

In the 5G system, hybrid FSK and QAM modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the internet of things (IoT) where distributed entities, such as things, exchange and process information without human intervention. The internet of everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, machine-to-machine (M2M) communication, machine type communication (MTC), and so forth.

Such an IoT environment may provide intelligent Internet technology services that create new values for human life by collecting and analyzing data generated among connected things. The IoT may be applied to a variety of fields including a smart home, a smart building, a smart city, a smart car or a connected car, a smart grid, health care, smart appliances, and advanced medical services through convergence and combination between existing information technology (IT) and various industrial applications.

In line with these developments, various attempts have been made to apply the 5G communication system to IoT networks. For example, technologies such as a sensor network, MTC and M2M communication may be implemented by beamforming, MIMO, and array antennas. Application of a cloud radio access network (RAN) as the above-described Big Data processing technology may also be considered to be an example of convergence between the 5G technology and the IoT technology.

In the next generation mobile communication system, the system information broadcast by a base station is divided into minimum system information (SI) and other SI. The minimum SI is broadcast periodically and includes configuration information necessary for initial access and SI scheduling information necessary for terminals to receive the other SI that is broadcast periodically or in response to a request. Typically, the other SI includes entire configuration information that is not included in the minimum SI.

Meanwhile, there is a need of an efficient other system information request method and apparatus of a terminal in the next generation mobile communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure aims to provide a method for a terminal to request for the other SI using a random access procedure.

Another aspect of the disclosure is to provide a method for a terminal transmitting data, simultaneously using multiple radio access technologies (RATs), to report its power headroom in a wireless communication system.

Another aspect of the disclosure is to provide a power headroom format and a method for reporting a power headroom for the case where a supplementary uplink frequency is configured.

Another aspect of the disclosure is to define a method for prioritizing, when a configured grant and a dynamic grant for uplink transmissions of a terminal collide with each other, the transmissions to resolve decoding difficulty at a receiving end in a next generation mobile communication system.

Additional aspects will be set forth in part in the description which follows and, in part, will be apparent from the description, or may be learned by practice of the presented embodiments.

In accordance with an aspect of the disclosure, a method by a terminal in a wireless communication system is provided. The method includes transmitting, to a base station, a first message for initiating a random access procedure, receiving, from the base station, a second message including a timing advance command and uplink grant, based on the first message, starting a timer associated with the timing advance command, transmitting, to the base station, a third message based on the uplink grant, receiving, from the base station, a fourth message for completion of the random access procedure, based on the third message, identifying whether the random access procedure was initiated for system information (SI) request and determining whether to stop the timer based on a result of the identification.

In accordance with an aspect of the disclosure, a method by a base station in a wireless communication system is provided. The method includes receiving, from a terminal, a first message for initiating a random access procedure, transmitting, to the terminal, a second message including a timing advance command and uplink grant, based on the first message, receiving, from the terminal, a third message based on the uplink grant, and transmitting, to the terminal, a fourth message for completion of the random access procedure, based on the third message, wherein a timer associated with the timing advance command is started by the terminal based on the second message, and wherein the timer is stopped by the terminal based on whether the random access procedure was initiated for SI request.

In accordance with an aspect of the disclosure, a terminal in a wireless communication system is provided. The terminal includes a transceiver, and a controller configured to control the transceiver to transmit, to a base station, a first message for initiating a random access procedure, control the transceiver to receive, from the base station, a second message including a timing advance command and uplink grant, based on the first message, start a timer associated with the timing advance command, control the transceiver to transmit, to the base station, a third message based on the uplink grant, control the transceiver to receive, from the base station, a fourth message for completion of the random access procedure, based on the third message, identify whether the random access procedure was initiated for system information (SI) request, and determine whether to stop the timer based on a result of the identification.

In accordance with an aspect of the disclosure, a base station in a wireless communication system is provided. The base station includes a transceiver, and a controller configured to control the transceiver to receive, from a terminal, a first message for initiating a random access procedure, control the transceiver to transmit, to the terminal, a second message including a timing advance command and uplink grant, based on the first message, control the transceiver to receive, from the terminal, a third message based on the uplink grant, and control the transceiver to transmit, to the terminal, a fourth message for completion of the random access procedure, based on the third message, wherein a timer associated with the timing advance command is started by the terminal based on the second message, and wherein the timer is stopped by the terminal based on whether the random access procedure was initiated for SI request.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3C is a diagram illustrating a power headroom report (PHR) format in use for legacy LTE according to an embodiment of the disclosure;

FIG. 3H is a diagram illustrating a PHR format for a case where only a PCell exists according to an embodiment of the disclosure;

FIG. 3I is a diagram illustrating a PHR format for use in configuring multiple SCells according to an embodiment of the disclosure;

FIG. 4G is a diagram for explaining a collision-free data transmission method by prioritizing predetermined grants in a potential PUSCH collision situation being considered according to an embodiment of the disclosure;

Throughout the drawings, like reference numerals will be understood to refer to like parts, components, and structures.

DETAILED DESCRIPTION

Figure 1A:
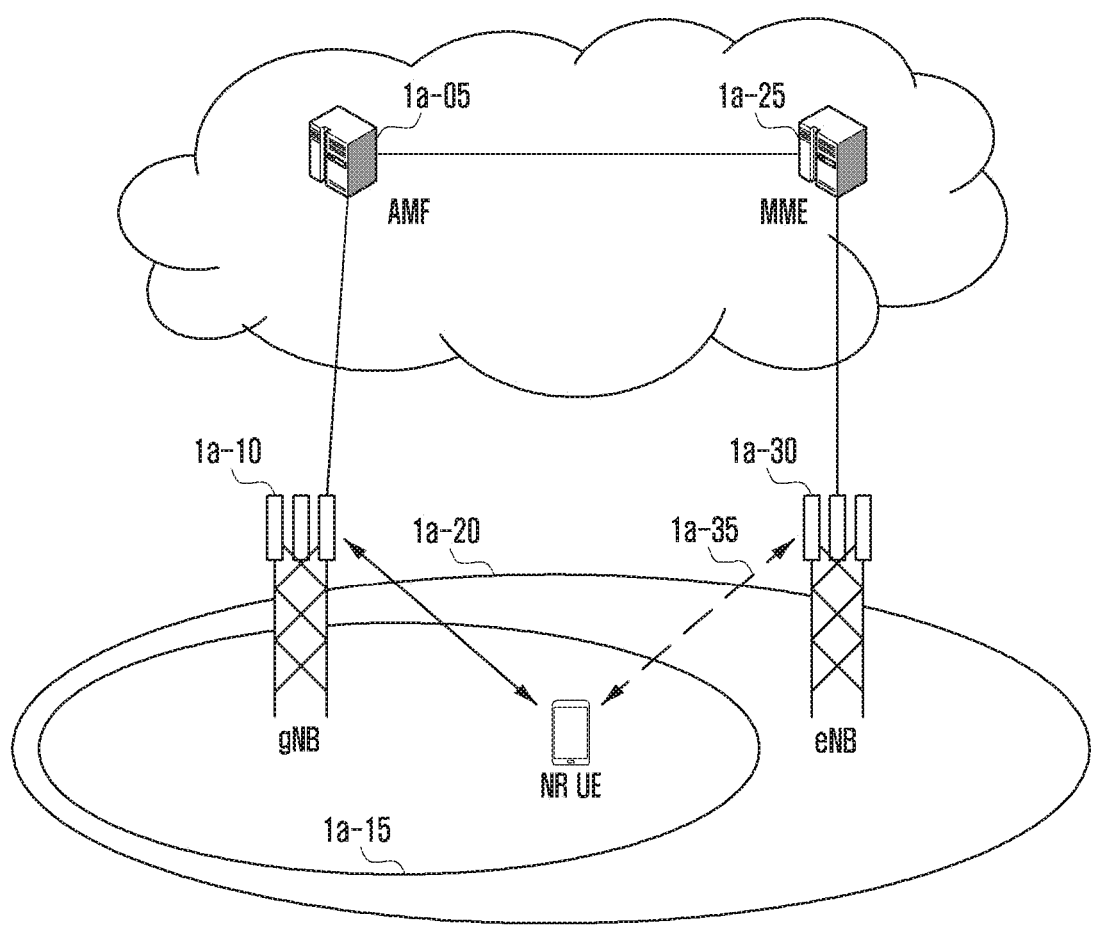
FIG. 1A is a diagram illustrating a structure of a next generation mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the disclosure and methods of accomplishing the same may be understood more readily by reference to the following detailed description of embodiments and the accompanying drawings. The disclosure may, however, be embodied in many different forms and should not be construed as being limited to the embodiments set forth herein; rather, these embodiments are provided so that this disclosure will be thorough and complete and will fully convey the concept of the disclosure to those skilled in the art, and the disclosure will only be defined by the appended claims. Like reference numerals refer to like elements throughout the specification.

First Embodiment

Detailed descriptions of well-known functions and structures incorporated herein may be omitted to avoid obscuring the subject matter of the disclosure. Embodiments of the disclosure are described in detail with reference to the accompanying drawings.

FIG. 1A is a diagram illustrating a structure of a next generation mobile communication system according to an embodiment of the disclosure.

Referring to FIG. 1A, a radio access network (RAN) of the next generation mobile communication system (New Radio (NR)) includes a new radio Node B (hereinafter, referred to as gNB) 1a-10 representing a RAN and a mobility management function (AMF) 1a-05 representing an NR core network. A new radio user equipment (hereinafter, referred to as NR UE or simply UE) 1a-15 connects to an external network via the NR NB 1a-10 and the AMF 1a-05.

In FIG. 1A, the NR NB 1a-10 corresponds to an evolved Node B (eNB) in the legacy LTE system. The NR UE 1a-15 connects to the gNB 1a-10 through a radio channel as denoted by reference number 1a-20, and the gNB 1a-10 may provide services superior to those of the legacy eNB. In the next generation mobile communication system in which all user traffic is served through shared channels, there is a need of an entity for collecting UE-specific status information (such as buffer status, power headroom status, and channel status) and scheduling the UEs based on the collected information, and the gNB 1a-10 takes charge of such functions. Typically, one gNB hosts multiple cells. In order to meet the data rate requirement higher than that for legacy LTE, it is necessary to secure a maximum bandwidth broader than ever before by employing advanced technologies such as orthogonal frequency division multiplexing (OFDM) as a radio access scheme and beamforming. It may be possible to employ an adaptive modulation and coding (AMC) technology to determine a modulation scheme and a channel coding rate in adaptation to the channel condition of the UE. The AMF 1a-05 is responsible for mobility management, bearer setup, and QoS setup. As an entity of taking charge of various control functions including the UE mobility management, the AMF 1a-05 is connected with a plurality of NR NBs. The next generation mobile communication system may interoperate with the legacy LTE system and, in this case, the AMF 1a-05 connects to an MME 1a-25 through a network interface. The MME 1a-25 is connected with the eNB 1a-30 as a legacy base station. A UE supporting LTE-NR Dual Connectivity may maintain a connection to the eNB 1a-30 as denoted by reference number 1a-35 as well as the connection to the gNB 1a-10 to transmit/receive data.

Figure 1B:
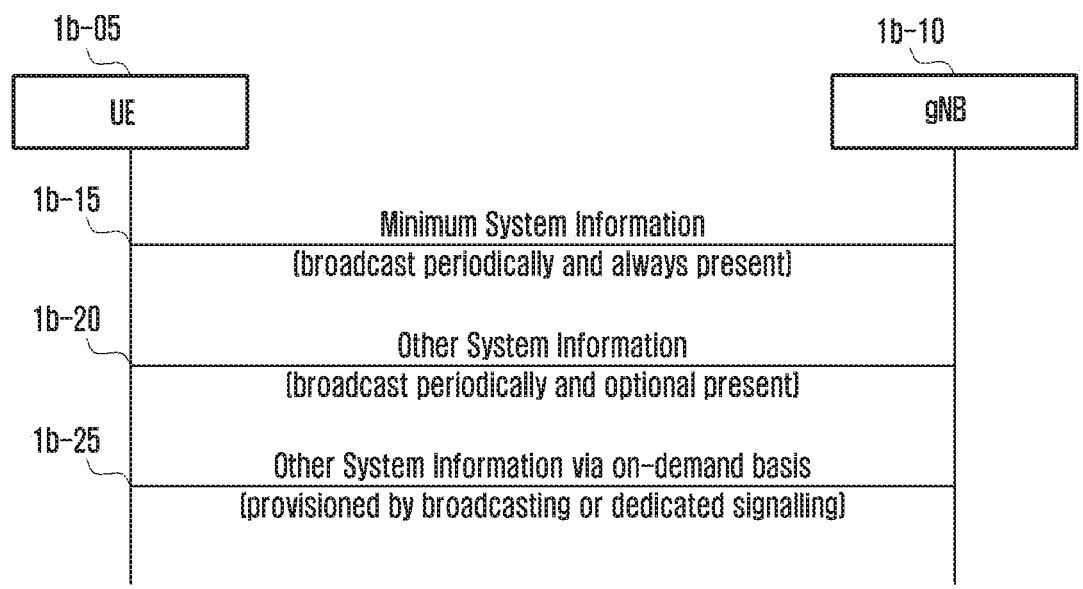
FIG. 1B is a signal flow diagram illustrating a method for providing system information in a next generation mobile communication system according to an embodiment of the disclosure.

FIG. 1B is a signal flow diagram illustrating a method for providing system information in a next generation mobile communication system according to an embodiment of the disclosure.

Referring to FIG. 1B, in the next generation mobile communication system, a gNB 1b-10 broadcasts system information, which is divided into minimum SI and other SI. The gNB 1b-10 broadcasts the minimum SI periodically at operation 1b-15, and the minimum SI includes configuration information for use by a UE 1b-05 in an initial access procedure and SI scheduling information for use by the UE 1b-05 in receiving the other SI that is broadcast periodically or in response to a request. Typically, the other SI includes entire configuration information that is not included in the minimum SI. The other SI may be broadcast periodically or in response to a request from a UE at operation 1b-20 or transmitted to the UE 1b-05 via dedicated signaling at operation 1b-25. In the case where the other SI is transmitted in response to a request from the UE, it is necessary for the UE to determine whether the other SI is available in the corresponding cell or being currently broadcast (in response to a request from another UE). Such a determination may be made based on specific information included in the minimum SI. A UE in an idle mode (RRC_IDLE) or INACTIVE mode (RRC_INACTIVE) may request for the other SI in the current mode without RRC state transition. A UE in a connected mode (RRC_CONNECTED) may request for the other SI and receive the other SI via dedicated RRC signaling. The other SI is broadcast during a predetermined period at a predetermined interval. The public warning system (PWS) information falls into the category of the other SI. Whether to broadcast or transmit the other SI to the UE via dedicated RRC signaling depends on the network implementation.

Figure 1C:
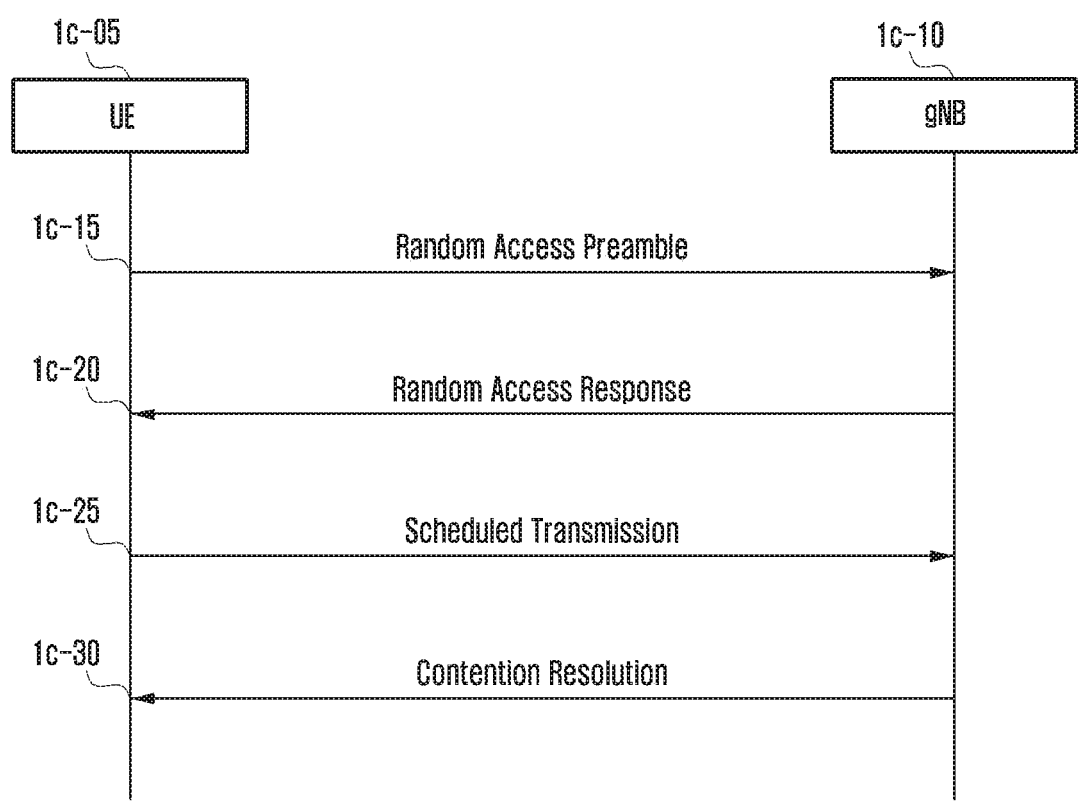
FIG. 1C is signal flow diagram illustrating a random access procedure in a legacy LTE system according to an embodiment of the disclosure.

FIG. 1C is signal flow diagram illustrating a random access procedure in a legacy LTE system according to an embodiment of the disclosure.

Referring to FIG. 1C, a random access procedure is initiated to achieve uplink synchronization or transmit data to the network. In detail, the random access procedure is initiated for switching from the idle mode to the connected mode, reestablishing an RRC connection, performing a handover, and starting uplink/downlink (UL/DL) data transmission. If a dedicated preamble is assigned by the gNB 1c-10, the UE 1c-05 may transmit the corresponding preamble. If not, the UE 1c-05 may select one of two preamble groups and then a preamble from the selected group. The two groups are referred to as group A and group B. If a channel quality value is greater than a predetermined threshold value and a size of msg3 is greater than a predetermined threshold value, the UE selects a preamble from group A; if not, the UE selects a preamble from group B. The UE 1c-05 transmits the preamble at the $n^{th}$ subframe at operation 1c-15. If the preamble is transmitted at $n^{th}$ subframe, a random access response (RAR) window starts at the $(n+3)^{th}$ subframe such that the UE 1c-05 monitors the RAR window to receive an RAR at operation 1c-20. The RAR scheduling information is indicated with a random access radio network temporary identifier (RA-RNTI) on a physical downlink control channel (PDCCH). The RA-RNTI is derived from a radio resource location at which the preamble has be transmitted. The RAR includes a timing advance command, a UL grant, and a temporary cell RNTI (C-RNTI). If the RAR is received successfully during the RAR window, the UE 1c-05 transmits a msg3, at operation 1c-25, based on the UL grant included in the RAR. The msg3 includes information determined depending on the purpose of the random access. Table 1 shows information conveyed in the msg3 by way of example.

TABLE 1

Examples of information included in msg3

| CASE | Message 3 contents |
|---|---|
| RRC CONNECTION SETUP | CCCH SDU |
| RRC RE-ESTABLISHMENT | CCCH SDU, BSR (if grant is enough), PHR (if triggered & grant is enough) |
| Handover (random preamble) | C-RNTI CE, BSR, PHR, (part of) DCCH SDU |
| Handover (dedicated preamble) | BSR, PHR, (part of) DCCH SDU |
| UL resume | C-RNTI CE, BSR, PHR, (part of) DCCH/DTCH SDU |
| PDCCH order (random preamble) | C-RNTI CE, BSR, PHR, (part of) DCCH/DTCH SDU |
| PDCCH order (dedicated preamble) | BSR, PHR, (part of) DCCH/DTCH SDU |

If the RAR is received in the $n^{th}$ subframe, the UE 1c-05 transmits the msg3 at the $(n+)^{th}$ subframe. An HARQ process is applied after the msg3 transmission. Upon transmitting the msg3, the UE starts a predetermined timer and performs monitoring to receive a contention resolution (CR) message at operation 1c-30 before expiry of the timer. The CR message may include an RRC Connection Setup message or an RRC Connection Reestablishment message depending on the purpose of the random access in addition to a CR MAC CE.

Figure 1D:
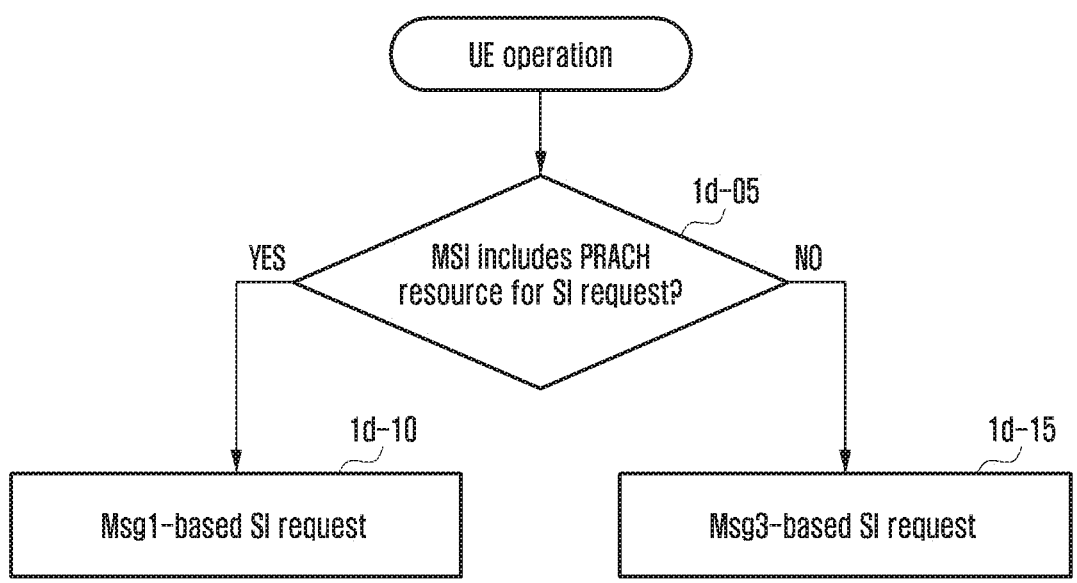
FIG. 1D is a flowchart illustrating a procedure for selecting an msg1-based or msg3-based SI request method according to an embodiment of the disclosure.

FIG. 1D is a flowchart illustrating a procedure for selecting an msg1-based or msg3-based SI request method according to an embodiment of the disclosure.

Referring to FIG. 1D, in order to request for other SI, a UE uses a random access procedure. The UE uses the msg1 (preamble) or msg3 to request to the network for system information. At operation 1d-05, the UE determines whether the minimum SI broadcast periodically may include physical random access channel (PRACH) resource information available for use in requesting for other SI. The PRACH resource information may include preamble ID (or index) information for use in requesting for SI (prach-ConfigIndex) and information or the radio resources available for preamble transmission. If it is determined that the minimum SI includes the PRACH resource information, the UE may request for other SI, at operation 1d-10, using the SI request-dedicated msg1. If it is determined that the minimum SI does not include PRACH resource information, the UE request for the other system information, at operation 1d-15, using the msg3. In this case, the UE transmits a random preamble available for use in normal random access procedure.

Figure 1E:
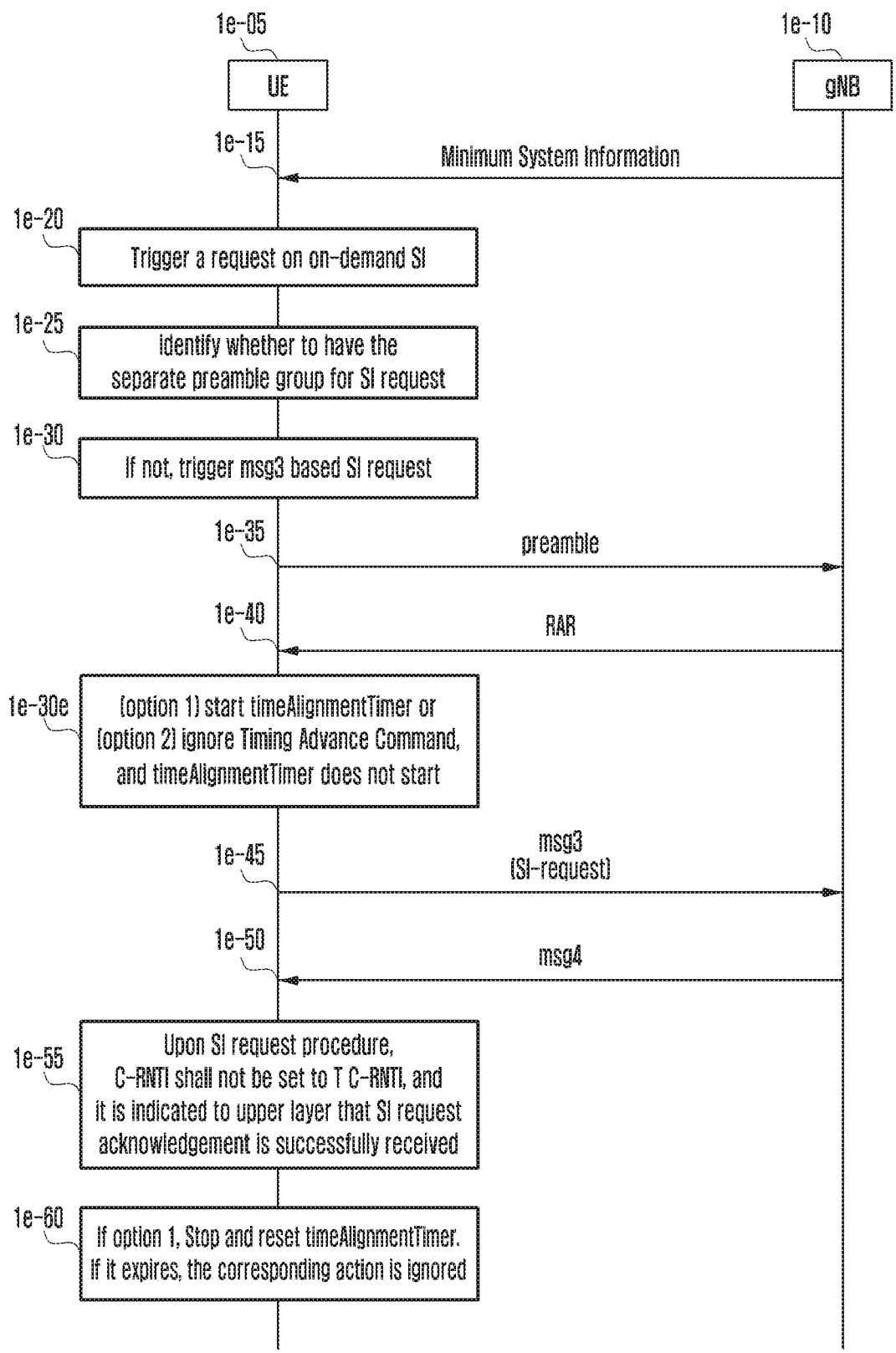
FIG. 1E is a signal flow diagram illustrating an msg3-based SI request procedure according to an embodiment of the disclosure.

FIG. 1E is a signal flow diagram illustrating an msg3-based SI request procedure according to an embodiment of the disclosure.

Referring to FIG. 1E, at operation 1e-15 a UE 1e-05 receives minimum SI that is periodically broadcast by a gNB 1e-10. The UE triggers a request for other system information at operation 1e-20. The UE determines at operation 1e-25 whether the minimum SI includes dedicated preamble information for use in requesting for other SI. If not, the UE requests for SI, at operation 1e-30, using the msg3. The UE 1e-05 transmits a preamble to the gNB 1e-10 at operation 1e-35. It is not necessary for the preamble to be a preamble dedicated to an SI request. The UE 1e-05 receives an RAR message from the gNB 1e-10 at operation 1e-40.

The RAR message includes TAC, UL grant, and temporary C-RNTI information. The TAC information includes information for use in achieving UL time synchronization. The UL grant information includes scheduling information for use by the UE in transmitting the msg3. The temporary C-RNTI information is a temporary ID value in use by a MAC layer in the random access procedure.

The UE 1e-05 takes a different action that is determined depending on the purpose of requesting for the system information, i.e., whether the request is made for access. If the UE has transmitted the preamble for the purpose of access to the system and receives an RAR message in reply, it applies the timing advance command and starts a timer, timeAlignmentTimer. The timer value is delivered to the UE via the minimum SI. If the timer expires, the UE performs operations as follows.

Delete data in HARQ buffers for all serving cells
Release PUCCHs for all serving cells
Release SRS for all serving cells
Delete all scheduling information Meanwhile, if the UE has transmitted the preamble for the purpose of requesting for system information and receives an RAR message in reply, it takes an operation of one of following options at operation 1e-30e.

In the first option, the UE ignores the timing advance command and starts the timer (timeAlignmentTimer). After starting the timer, the UE stops and resets the timer at a predetermined time point, at operation 1e-60, during or after the random access procedure. When the timer expires, the aforementioned operations that are supposed to be taken upon expiry of the timer are not performed.

In the second option, the UE ignores the timing advance command and does not start the timer, (timeAlignmentTimer). The operations that are supposed to be taken upon expiry of the timer are not performed.

The UE transmits the msg3 to the gNB at operation 1e-45. The msg3 includes information on the type of SI message or SIB requested by the UE. Upon receipt of the msg3, the gNB may transmit to the UE, at operation 1e-50, an msg4 indicating that it has received the system information request successfully. The UE determines an operation to take depending on the purpose of the random access, i.e., for system information request or for other purposes (e.g., access request). In the case of the access request, the UE converts the temporary C-RNTI value included in the RAR message to the C-RNTI. In the case of the system information request, the UE deletes the temporary C-RNTI value included in the RAR message. The UE also informs the upper layer that the system information has been successfully delivered at operation 1e-55.

Figure 1F:
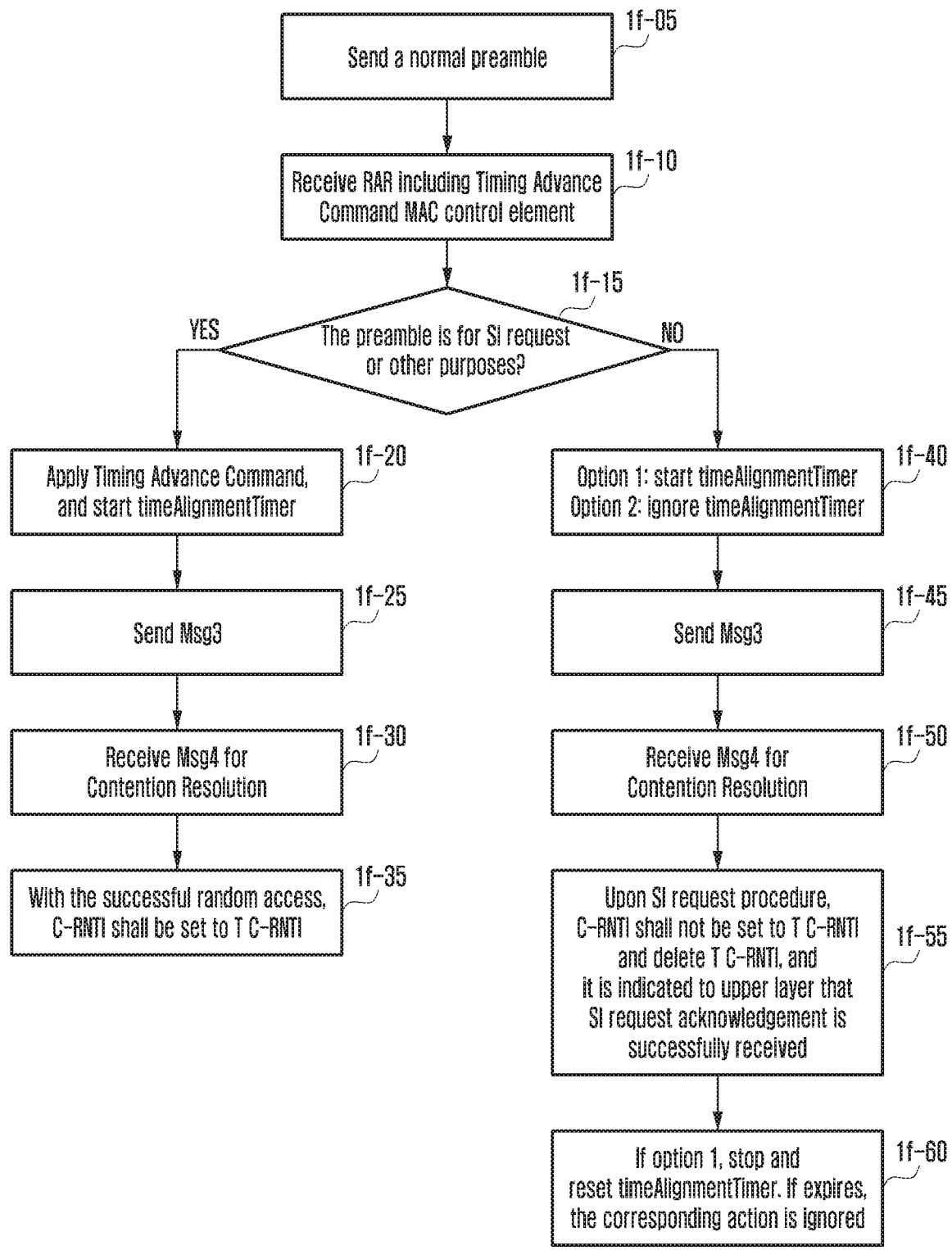
FIG. 1F is a flowchart illustrating a UE operation in an msg3-based SI request procedure according to an embodiment of the disclosure.

FIG. 1F is a flowchart illustrating a UE operation in an msg3-based SI request procedure according to an embodiment of the disclosure.

Referring to FIG. 1F, at operation 1f-05 the UE transmits a preamble to a network. The preamble may be one dedicated to requesting for SI.

At operation 1f-10, the UE receives an RAR message from the network in response to the preamble. The RAR message includes TAC, UL grant, and temporary C-RNTI information. The TAC information includes information for use in achieving UL time synchronization. The UL grant information includes scheduling information for use by the UE in transmitting the msg3. The temporary C-RNTI information is a temporary ID value in use by a MAC layer in the random access procedure.

At operation 1f-15, the UE determines whether the preamble is transmitted for the purpose of requesting for system information or other purposes, i.e., access request.

If it is determined that the preamble is transmitted for a normal access request, the UE applies, at operation 1f-20, a timing advance command included in the RAR message and starts a timer (timeAlignmentTimer) with a value received via the minimum SI. If the timer expires, the UE performs operations as follows.

Delete data in HARQ buffers for all serving cells
Release PUCCHs for all serving cells
Release SRS for all serving cells
delete all scheduling information At operation 1f-25, the UE transmits an msg3 and receives an msg4 at operation 1f-30. At operation 1f-35, the UE ascertains successful completion of the random access procedure and converts the temporary C-RNTI value included in the RAR message to a C-RNTI.

If it is determined that the preamble is transmitted for a system information request, the UE performs an operation of one of following options at operation 1f-40.

In the first option, the UE ignores the timing advance command and starts the timer (timeAlignmentTimer). After starting the timer, the UE stops and resets the timer at a predetermined time point during or after the random access procedure. When the timer expires, the UE skips performing the aforementioned operations that are supposed to be taken upon expiry of the timer.

In the second option, the UE ignores the timing advance command and does not start the timer, (timeAlignmentTimer). The operations that are supposed to be taken upon expiry of the timer are not performed.

At operation 1f-45, the UE transmits an msg3 to the network. The UE transmits the msg3 to the gNB at operation 1e-45. The msg3 includes information on the type of SI message or SIB requested by the UE.

At operation 1f-50, the UE receives the msg4 indicating that the system information request message indicating that the system information request has been successfully delivered.

At operation 1f-55, if the random access procedure is successfully completed, the UE deletes the temporary C-RNTI value included in the RAR message rather than converting it to a C-RNTI.

At operation 1f-60, the UE stops and resets the timer (timeAlignmentTimer) at a predetermined time point during or after the random access procedure. When the timer expires, the UE does not perform the aforementioned operations that are supposed to be taken upon expiry of the timer.

Figure 1G:
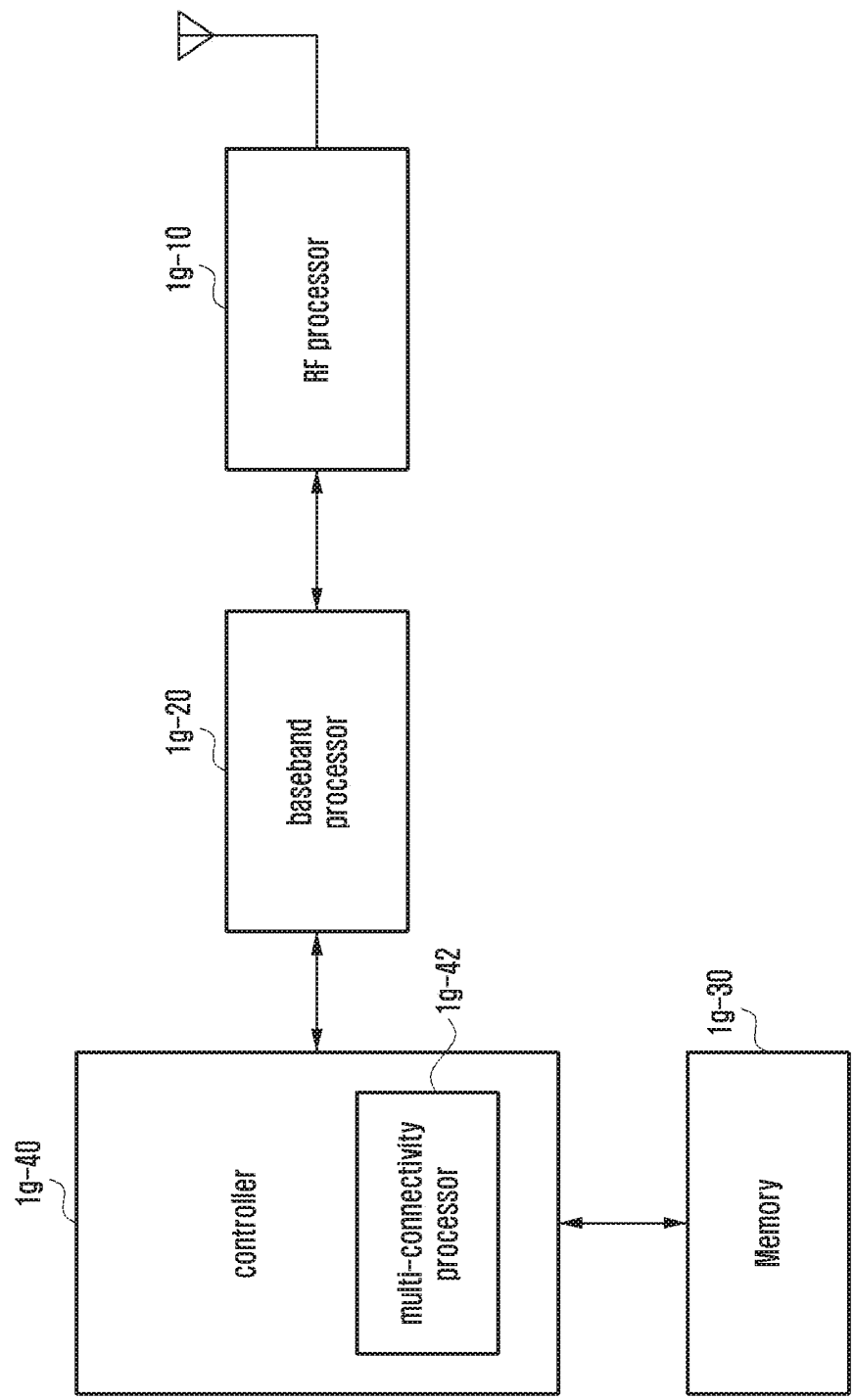
FIG. 1G is a block diagram illustrating a configuration of a UE according to an embodiment of the disclosure.

FIG. 1G is a block diagram illustrating a configuration of a UE according to an embodiment of the disclosure.

Referring to FIG. 1G, the UE includes a radio frequency (RF) processor 1g-10, a baseband processor 1g-20, a memory 1g-30, a controller 1g-40 and a multi-connectivity processor 1g-42.

The RF processor 1g-10 has a function for transmitting/receiving a signal over a radio channel such as band conversion and amplification of the signal. That is, the RF processor 1g-10 up-converts a baseband signal from the baseband processor 1g-20 to an RF band signal and transmits the RF signal via an antenna and down-converts the RF signal received via the antenna to a baseband signal. For example, the RF processor 1g-10 may include a transmission filter, an amplifier, a mixer, an oscillator, a digital-to-analog converter (DAC), and an analog-to-digital converter (ADC). Although one antenna is depicted in the drawing, the UE may be provided with a plurality of antennas. The RF processor 1g-10 may also include a plurality of RF chains. The RF processor 1g-10 may perform beamforming. For beamforming, the RF processor 1g-10 may adjust the phase and size of a signal to be transmitted/received by means of the antennas or antenna elements. The RF processor 1g-10 may be configured to support a MIMO scheme with which the UE can receive multiple layers simultaneously.

The baseband processor 1g-20 has a baseband signal-bit string conversion function according to a physical layer standard of the system. For example, in a data transmission mode, the baseband processor 1g-20 performs encoding and modulation on the transmission bit string to generate complex symbols. In a data reception mode, the baseband processor 1g-20 performs demodulation and decoding on the baseband signal from the RF processor 1g-10 to recover the transmitted bit string. In the case of using an OFDM scheme for data transmission, the baseband processor 1g-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 1g-20 splits the baseband signal from the RF processor 1g-10 into OFDM symbols, performs fast fourier transform (FFT) on the OFDM symbols to recover the signals mapped to the subcarriers, and performs demodulation and decoding on the signals to recover the transmitted bit string.

The baseband processor 1g-20 and the RF processor 1g-10 process the transmission and reception signals as described above. Accordingly, the baseband processor 1g-20 and the RF processor 1g-10 may be referred to as a transmitter, a receiver, a transceiver, or a communication unit. At least one of the baseband processor 1g-20 and the RF processor 1g-10 may include a plurality of communication modules for supporting different radio access technologies. At least one of the baseband processor 1g-20 and the RF processor 1g-10 may also include multiple communication modules for processing the signals in different frequency bands. For example, the different radio access technologies may include a wireless local area network (WLAN) (e.g., institute of electrical and electronics engineers (IEEE) 802.11) and a cellular network (e.g., LTE). The different frequency bands may include a super high frequency (SHF) band (e.g., 2.5 GHz and 5 GHz bands) and an mmWave band (e.g., 60 GHz).

The memory 1g-30 stores data such as basic programs for operation of the UE, application programs, and setting information. The memory 1g-30 may also store the information on a second access node for radio communication with a second radio access technology. The memory 1g-30 provides the stored information in response to a request from the controller 1g-40.

The controller 1g-40 controls overall operations of the UE. For example, the controller 1g-40 controls the baseband processor 1g-20 and the RF processor 1g-10 for transmitting and receiving signals. The controller 1g-40 writes and reads data to and from the memory 1g-30. For this purpose, the controller 1g-40 may include at least one processor. For example, the controller 1g-40 may include a communication processor (CP) for controlling communications and an application processor (AP) for controlling higher layer programs such as applications.

Figure 1H:
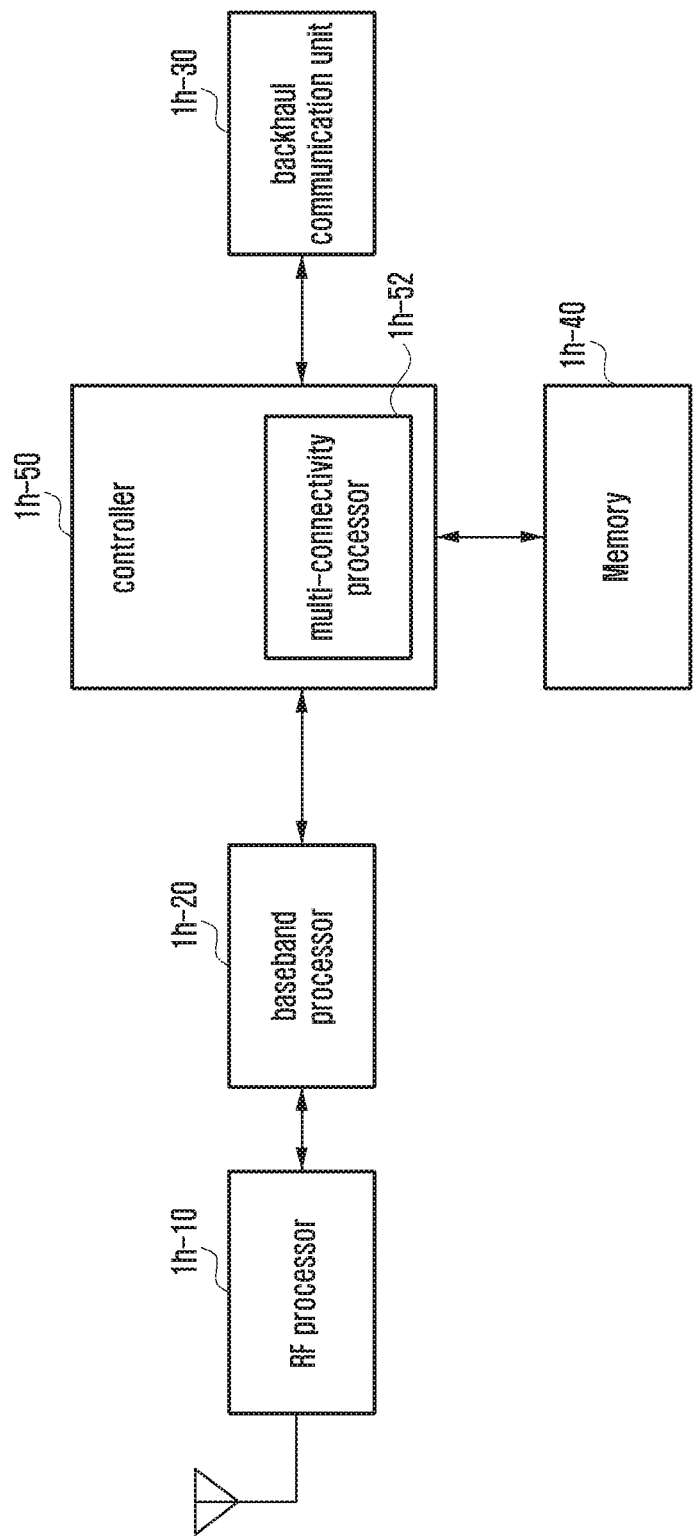
FIG. 1H is a block diagram illustrating a configuration of a gNB according to an embodiment of the disclosure.

FIG. 1H is a block diagram illustrating a configuration of a base station according to an embodiment of the disclosure.

Referring to FIG. 1H, the base station includes an RF processor 1h-10, a baseband processor 1h-20, a backhaul communication unit 1h-30, a memory 1h-40, a controller 1h-50 and a multi-connectivity processor 1h-52.

The RF processor 1h-10 has a function for transmitting/receiving a signal over a radio channel such as band conversion and amplification of the signal. That is, the RF processor 1h-10 up-converts a baseband signal from the baseband processor 1h-20 to an RF band signal and transmits the RF signal via an antenna and down-converts the RF signal received via the antenna to a baseband signal. For example, the RF processor 1h-10 may include a transmission filter, a reception filter, an amplifier, a mixer, an oscillator, a DAC, and an ADC. Although one antenna is depicted in the drawing, the base station may be provided with a plurality of antennas. The RF processor 1h-10 may also include a plurality of RF chains. The RF processor 1h-10 may perform beamforming. For beamforming, the RF processor 1h-10 may adjust the phase and size of a signal to be transmitted/received by means of the antennas or antenna elements. The RF processor 1h-10 may be configured to transmit one or more layers for a downlink MIMO operation.

The baseband processor 1h-20 has a baseband signal-bit string conversion function according to a physical layer standard of the system. For example, in a data transmission mode, the baseband processor 1h-20 performs encoding and modulation on the transmission bit string to generate complex symbols. In a data reception mode, the baseband processor 1h-20 performs demodulation and decoding on the baseband signal from the RF processor 1h-10 to recover the transmitted bit string. In the case of using an OFDM scheme for data transmission, the baseband processor 1h-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 1h-20 splits the baseband signal from the RF processor 1h-10 into OFDM symbols, performs fast fourier transform (FFT) on the OFDM symbols to recover the signals mapped to the subcarriers, and performs demodulation and decoding on the signals to recover the transmitted bit string. The baseband processor 1h-20 and the RF processor 1h-10 process the transmission and reception signals as described above. Accordingly, the baseband processor 1h-20 and the RF processor 1h-10 may be referred to as a transmitter, a receiver, a transceiver, or a communication unit.

The backhaul communication unit 1h-30 provides an interface for communication with other nodes in the network. That is, the backhaul communication unit 1h-30 converts a bit string to be transmitted from the base station to another node, e.g., another base station and core network, to a physical signal and converts a physical signal received from another node to a bit string.

The memory 1h-40 stores data such as basic programs for operation of the base station, application programs, and setting information. The memory 1h-40 may also store the information on the bearers established for UEs and measurement results reported by the connected UEs. The memory 1h-40 may also store the information for use by a UE in determining whether to enable or disable multi-connectivity. The memory 1h-40 may provide the stored data in reference to a request from the controller 1h-50.

The controller 1h-50 controls overall operations of the base station. For example, the controller 1h-50 controls the baseband processor 1h-20, the RF processor 1h-10, and the backhaul communication unit 1h-30 for transmitting and receiving signals. The controller 1h-50 writes and reads data to and from the memory 1h-40. For this purpose, the controller 1h-50 may include at least one processor.

Second Embodiment

The operation principle of the disclosure is described in detail with reference to the accompanying drawings. Detailed descriptions of well-known functions and structures incorporated herein may be omitted to avoid obscuring the subject matter of the disclosure. Furthermore, terms used herein are defined by taking functions of the disclosure into account and can be changed according to the practice or intention of users or operators. Therefore, definitions of the terms should be made according to overall disclosures set forth herein.

In the following description, the terms indicating various access nodes, network entities, messages, interfaces between network entities, and information items are used for convenience of explanation of the disclosure. Accordingly, the terms used in the following description are not limited to specific meanings, and they may be replaced by other terms that are equivalent in technical meanings.

In the following descriptions, the terms and definitions given in the 3GPP LTE standards are used for convenience of explanation. However, the disclosure is not limited by use of these terms and definitions and can be applied to other standards-based systems in the same manner. In particular, the disclosure is applicable to the 3GPP NR (5G mobile communication standard).

This embodiment relates to a power headroom report method of a UE that is simultaneously connected to multiple base stations operating with heterogeneous radio access technologies (RATs) in a wireless communication system.

Figure 2A:
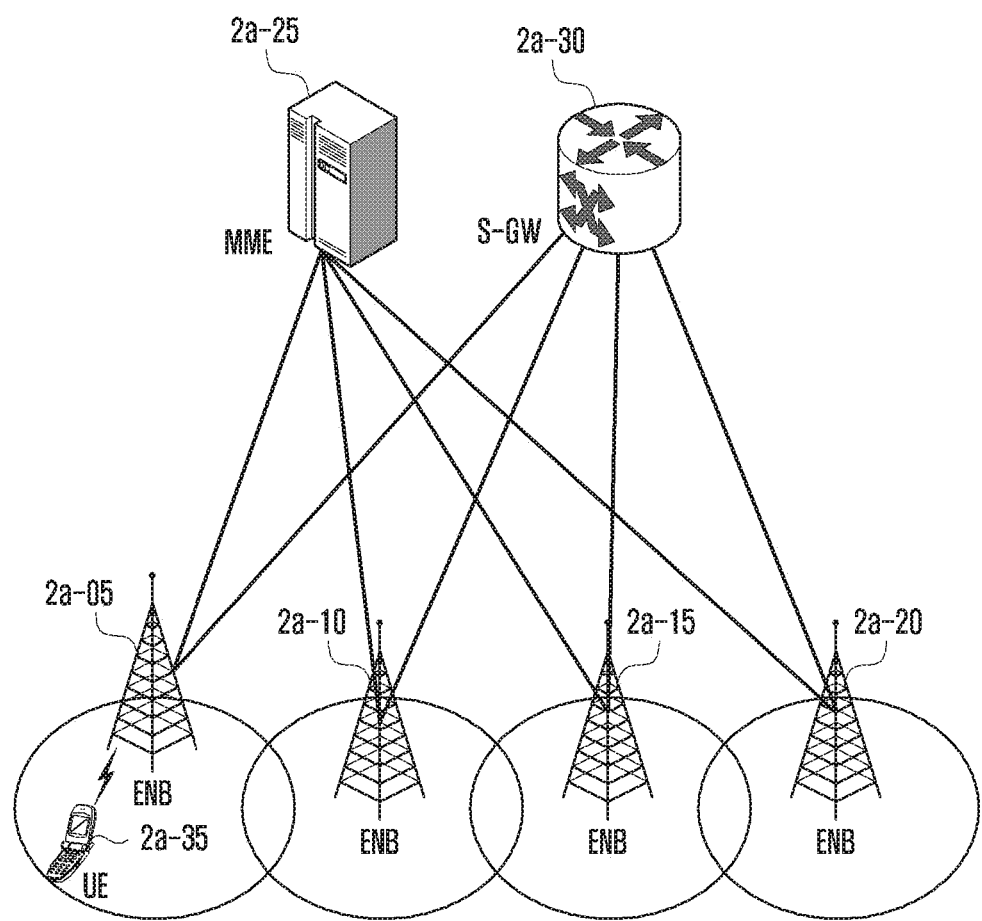
FIG. 2A is a diagram illustrating LTE system architecture provided for reference to explain according to an embodiment of the disclosure.

FIG. 2A is a diagram illustrating an LTE system architecture provided for reference to explain the disclosure according to an embodiment of the disclosure.

Referring to FIG. 2A, the radio communication system includes evolved Node Bs (eNBs) 2a-05, 2a-10, 2a-15, and 2a-20; a Mobility Management Entity (MME) 2a-25; and a Serving Gateway (S-GW) 2a-30. The user equipment (UE) 2a-35 connects to an external network via the eNBs 2a-05, 2a-10, 2a-15, and 2a-20 and the S-GW 2a-30.

The eNBs 2a-05, 2a-10, 2a-15, and 2a-20 are access nodes of a cellular network for serving the UEs attempting connection to the network. That is, each of the eNBs 2a-05, 2a-10, 2a-15, and 2a-20 collects status information of UEs (such as buffer status, power headroom, channel status) for serving user traffic and schedules the UEs to support connections between the UEs and a core network (CN). The MME 2a-25 is an entity taking charge of a UE mobility management and control function and serves the eNBs 2a-05, 2a-10, 2a-15, and 2a-20; the S-GW 2a-30 is an entity taking charge of a data bearer function. The MME 2a-25 and the S-GW 2a-30 may also perform UE authentication and bearer management on the UEs connected to the network and handle the packets arriving from and to be transmitted to the eNBs 2a-05, 2a-10, 2a-15, and 2a-20.

Figure 2B:
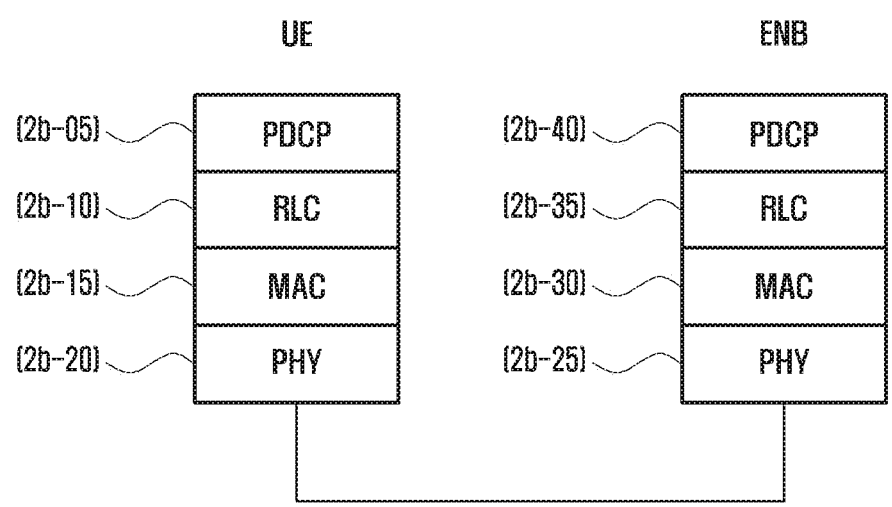
FIG. 2B is a diagram illustrating a protocol stack of an interface between a UE and an eNB in a LTE system for reference to explain according to an embodiment of the disclosure.

FIG. 2B is a diagram illustrating a protocol stack of an interface between a UE and an eNB in a LTE system for reference to explain according to an embodiment of the disclosure. The protocol stack of the NR system is almost identical with that of the LTE system.

Referring to FIG. 2B, the protocol stack of the interface between the UE and the eNB in the LTE system includes a plurality of protocol layers stacked from the bottom to the top: physical layer denoted by reference numbers 2b-20 and 2b-25, medium access control (MAC) layer denoted by reference numbers 2b-15 and 2b-30, radio link control (RLC) layer denoted by reference numbers 2b-10 and 2b-35, and packet data convergence control (PDCP) layer denoted by reference numbers 2b-05 and 2b-40. The PDCP layer denoted by reference numbers 2b-05 and 2b-40 takes charge of compressing/decompressing an IP header, and the RLC layer denoted by reference numbers 2b-10 and 2b-35 takes charge of reformatting PDCP PDUs in order to fit them into the size indicated by the MAC layer. The MAC layer denoted by reference numbers 2b-15 and 2b-30 allows for connection of multiple RLC entities established for one UE and takes charge of multiplexing RLC PDUs from the RLC layer into a MAC PDU and demultiplexing a MAC PDU into RLC PDUs. The PHY layer denoted by reference numbers 2b-20 and 2b-25 takes charge of channel-coding and modulation on higher layer data to generate and transmit OFDM symbols over a radio channel, and demodulating and channel-decoding on OFDM symbols received over the radio channel to deliver the decoded data to the higher layers. The PHY layer denoted by reference numbers 2b-20 and 2b-25 uses hybrid automatic repeat request (HARQ) for additional error correction by transmitting 1-bit information indicating positive or negative acknowledgement about data packets, the acknowledgement being transmitted from the receiver to the transmitter. The 1-bit information is referred to as acknowledgement/negative acknowledgement (ACK/NACK). The downlink HARQ ACK/NACK corresponding to an uplink transmission may be transmitted in a Physical hybrid-ARQ indicator channel (PHICH), and the uplink HARQ ACK/NACK corresponding to a downlink transmission may be transmitted in a physical uplink control channel (PUCCH) or physical uplink shared channel (PUSCH).

Although not shown in the drawing, there is a radio resource control (RRC) layer above the PDCP layer, and peer RRC entities exchange connection and measurement configuration control messages for controlling radio resources.

Meanwhile, the PHY layer may be configured to use one or more frequencies/carriers simultaneously, and this technique is referred to as carrier aggregation (CA). In comparison with the legacy signal carrier system, CA makes it possible to increase the data rate for communication between a UE and an eNB dramatically by aggregating one or more secondary component carriers with a primary component carrier. In LTE and NR systems, a base station hosts a primary cell (PCell) corresponding to the primary component carrier and, if necessary, at least one secondary cell (SCell) corresponding to the secondary component carrier. A technology extending the CA for use in association with two base stations is dual connectivity (DC). In the DC technology, a UE connects to a master E-UTRAN nodeB (hereinafter, referred to as MeNB) and a secondary E-UTRAN nodeB (hereinafter, referred to as SeNB) simultaneously; a group of cells hosted by the MeNB is referred to as master cell group (MCG), and a group of cells hosted by the SeNB is referred to as secondary cell group (SCG). Each cell group has a representative cell, which is referred to as primary cell (PCell) in the MSG and primary secondary cell (PScell) in the SCG. In the NR system, a UE may be served by the LTE and NR systems at the same time via an MSG supporting LTE system and an SCG supporting NR system respectively.

In the DC mode, the UE may have to report its power headroom to the LTE and NR systems according to a predetermined condition. The power headroom denotes a difference between the maximum transmit power configured to the UE and a transmit power estimated by the UE. The estimated transmit power is calculated based on the value for use in transmission for the case of performing actual uplink transmission (in this case, the calculated value is referred to as a real value) or based on a formula given in the standard for the case of performing no actual uplink transmission (in which case, the calculated value is referred to as a virtual value). On the basis of the power headroom information, the base station may determine the maximum transmit power available for the UE. Meanwhile, in a CA situation, the power headroom information is transmitted per component carrier.

Figure 2C:
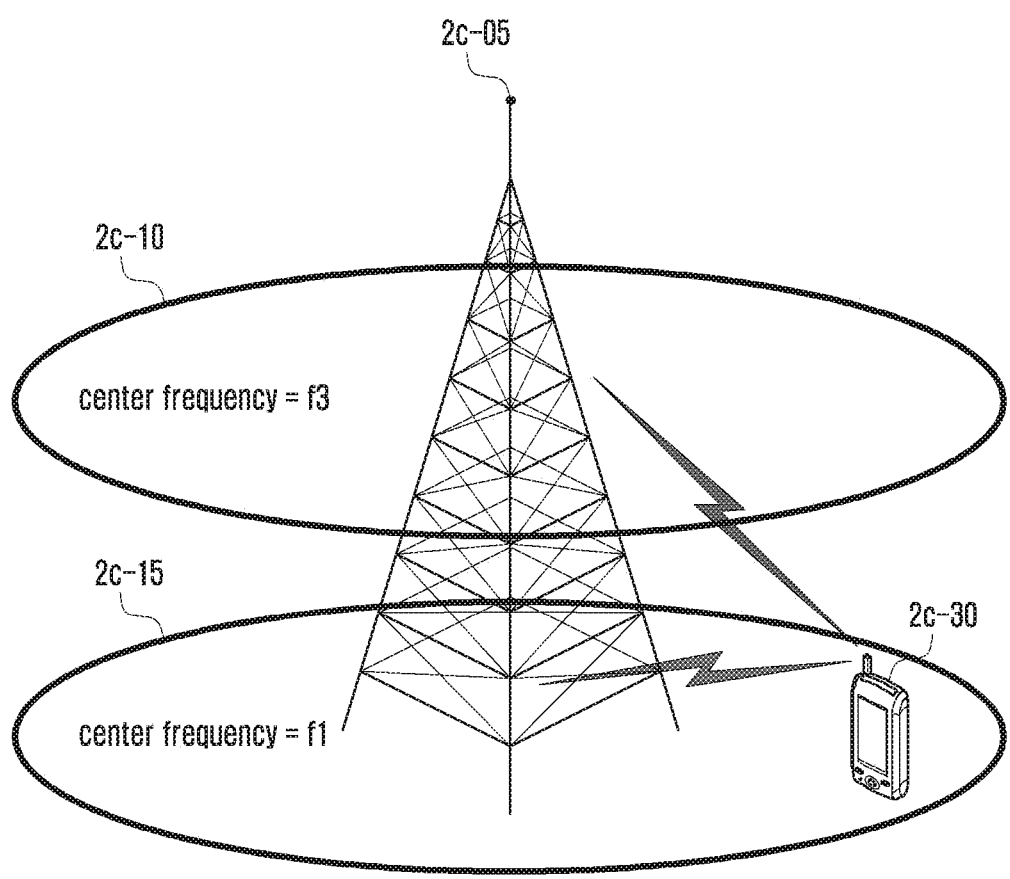
FIG. 2C is a diagram for explaining a carrier aggregation for a UE according to an embodiment of the disclosure.

FIG. 2C is a diagram for explaining a carrier aggregation for a UE according to an embodiment of the disclosure.

Referring to FIG. 2C, a base station transmits and receives signals through multiple carriers across a plurality of frequency bands. For example, when the base station 2c-05 is configured to use two carriers (carrier 2c-15 with center frequency f1 and carrier 2C-10 with center frequency f3), the conventional UE may transmit/receive data on one of the two carriers. However, the CA-enabled UE is capable of transmitting/receiving data on multiple carriers simultaneously. The base station 2C-05 may allocate extra carriers to the CA-enabled UE 2c-30 to increase a data rate of the UE 2c-30 depending on the situation.

Assuming that a cell is configured with one downlink carrier and one uplink carrier in the conventional concept, the carrier aggregation can be understood as if the UE communicates data via multiple cells. With the use of carrier aggregation, the peak data rate increases in proportion to the number of aggregated carriers.

In the following description, the phrase "a UE receives data through a certain downlink carrier or transmits data through a certain uplink carrier" means to receive or transmit data through control and data channels provided in cells corresponding to center frequencies and frequency bands characterizing the carriers. Although the description is directed to an LTE system for convenience of explanation, the disclosure can be applied to other types of wireless communication systems supporting carrier aggregation.

As uplink transmissions (i.e., transmissions from UEs to a base station) through different cells are likely to cause interference to each other regardless of whether carrier aggregation is used or not, it is necessary to control the uplink transmit power to a proper level. For this purpose, the UE calculates an uplink transmit power with a predetermined function and performs an uplink transmission at the calculated uplink transmit power. For example, the UE calculates a required uplink transmit power value by inputting scheduling information such as allocated transmission resources amount and modulation and coming scheme (MCS) and input values capable of estimating channel condition such as pathloss value to the predetermined function and performs an uplink transmission with the calculated required uplink transmit power value. The uplink transmit power value available for the UE is limited by the maximum transmit power value of the UE and, if the calculated required transmit power value is greater than the maximum transmit power value of the UE, the UE performs the uplink transmission with its maximum transmit power value. In this case, the insufficient uplink transmit power may cause uplink transmission quality degradation. Accordingly, it is preferable for the base station to perform scheduling such that the required transmit power does not exceed the maximum transmit power. However, because there are few parameters that the base station can measure, the UE reports its power headroom (PH) to the base station by transmitting a power headroom report (PHR), if necessary.

The power headroom is affected by: 1) allocated transmission resource amount, 2) MCS for uplink transmission, 3) pathloss on related downlink carrier, and 4) accumulated value of transmit power control commands. Among these elements, the pathloss (PL) and accumulated value of transmit power control commands vary depending on uplink carrier; thus, if multiple uplink carriers are aggregated to one UE, it is preferable to determine whether to transmit the PHR per uplink carrier. For an efficient PHR, however, it may be possible to report PHs of multiple uplink carriers through one uplink carrier. According to the operation strategy, it may be necessary to report the PHs for the carriers on which there is no real PUSCH transmission. In this case, it may be more efficient to report the PHs for the multiple uplink carriers through one uplink carrier. For this purpose, the legacy PHR should be extended. That is, multiple PHs should be arranged according to a predetermined ordering rule in a PHR.

A PHR is triggered when pathloss on a connected downlink carrier is equal to or greater than a predetermined threshold value, a prohibit PHR timer expires, or a predetermined time period elapses after the PHR generation. Although the PHR is triggered, the UE does not transmit the PHR immediately, but it waits until the arrival of an available uplink transmission timing. This is because the PHR is not delay-sensitive.

Figure 2D:
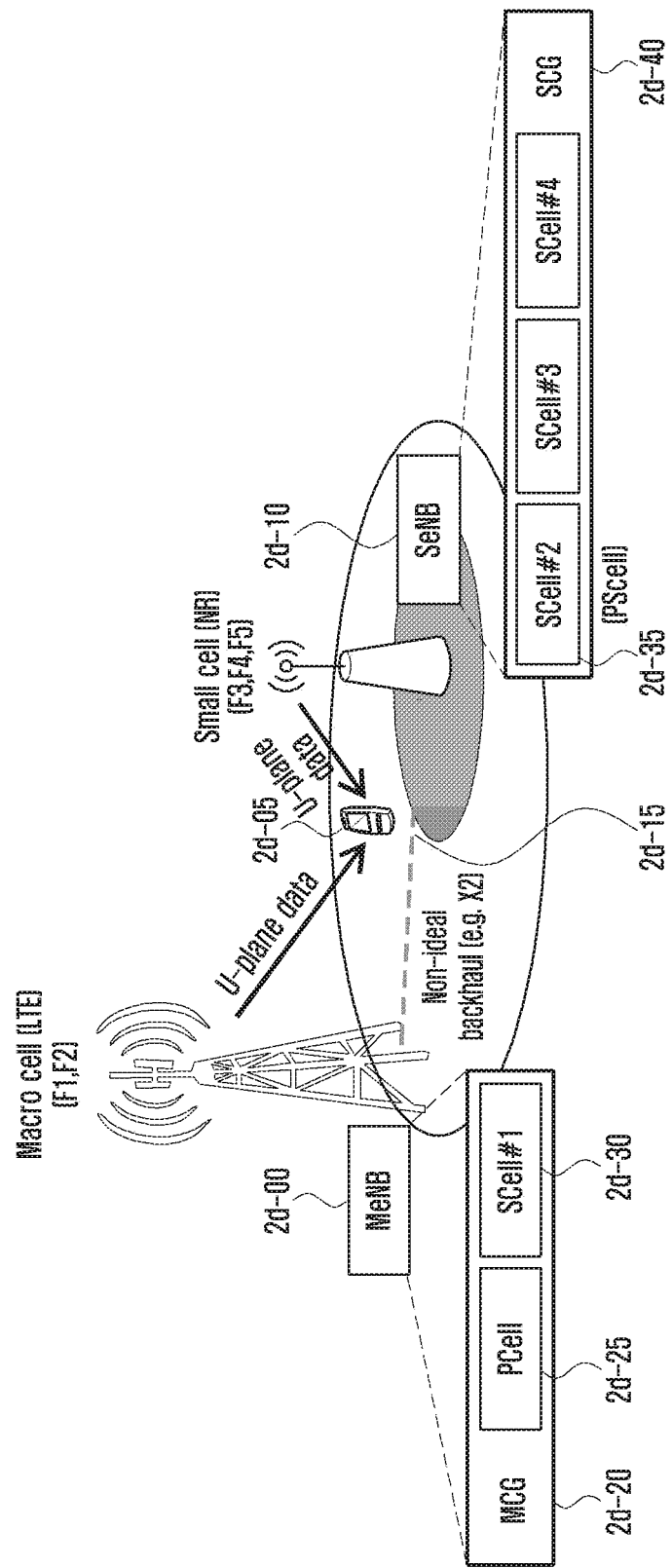
FIG. 2D is a diagram for explaining the concept of dual connectivity according to an embodiment of the disclosure.

FIG. 2D is a diagram for explaining the concept of dual connectivity according to an embodiment of the disclosure.

Referring to 2D, a dual connectivity (DC) technique makes it possible for a UE to connect to two base stations, and FIG. 2D depicts a UE 2d-05 connecting to an LTE technology-based macro eNB (MeNB) 2d-00 and an NR technology-based small cell eNB (SeNB) 2d-10 simultaneous for transmitting/receiving data. This technique is referred to as E-UTRAN-NR Dual Connectivity (EN-DC). The macro eNB is interchangeably referred to as Master E-UTRAN NodeB (MeNB), and the small cell eNB is interchangeably referred to as Secondary 5G NodeB (SgNB). There may be a plurality of small cells deployed in the service area of the MeNB, which connects to the SgNBs through wireline backhaul network 2d-15. A group of cells hosted by the eNB is referred to as master cell group (MCG) 2d-20, which should have a primary cell (PCell) 2d-25 taking charge of the functions of the legacy cell such as connection establishment, connection re-establishment, and handover. The PCell has an uplink control channel, i.e., PUCCH. The remaining cells excluding the PCell are referred to as secondary cells (SCells). FIG. 2D depicts a scenario where the MeNB hosts one SCell 2d-30 and the SgNB hosts 3 SCells. The MeNB may transmit a command for adding, changing, or removing the serving cells hosted by the SgNB in the course of communicating data with the UE. In order to make such a command, the MeNB may configure the UE to perform measurement on the serving and neighboring cells. The UE reports the measurement result to the MeNB according to the configuration information. In order for the SgNB to communicate data with the UE efficiently, there is a need of a serving cell taking a role similar to that of the PCell of the MCG and, in the disclosure, such a cell is referred as primary SCell (PSCell) 2d-35. The PSCell is selected among the serving cells belonging to the SCG 2d-40 and it has an uplink control channel, i.e., PUCCH. The PUCCH is used for the UE to transmit HARQ ACK/NACK information, channel status information (CSI), and scheduling requests (SRs) to the base station.

Figure 2E:
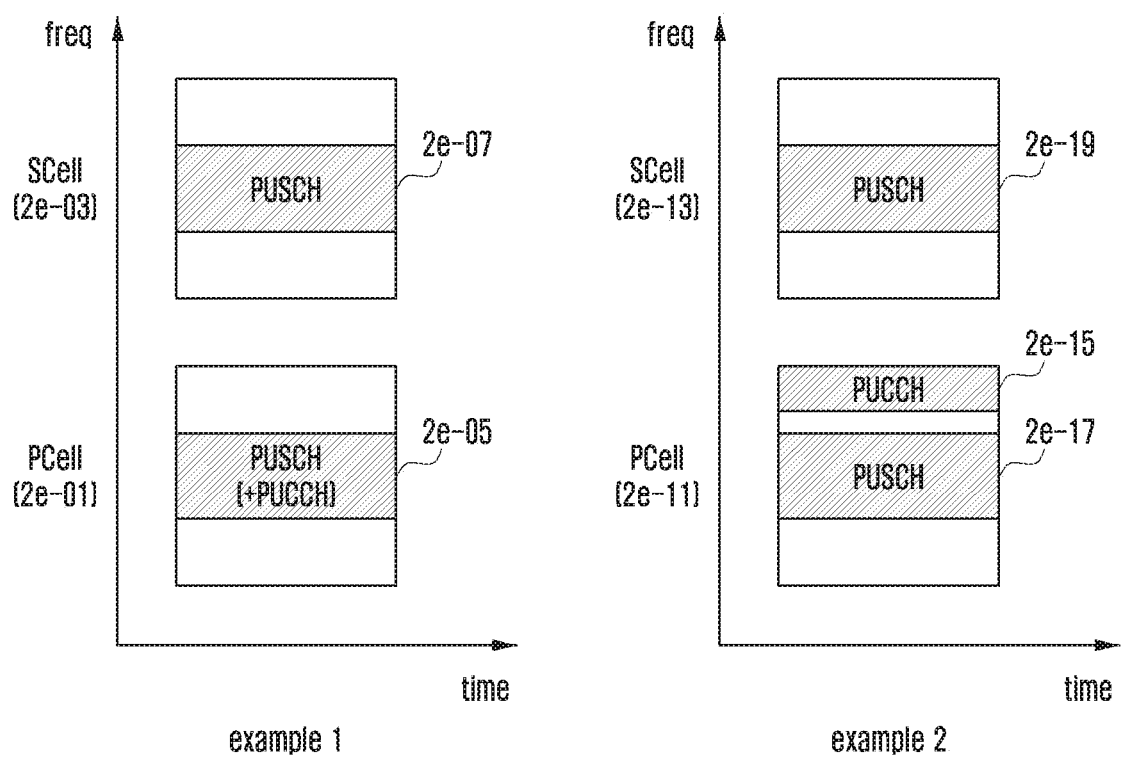
FIG. 2E is a diagram for explaining how to configure and perform uplink transmission in association with types of uplink channels according to an embodiment of the disclosure.

FIG. 2E is a diagram for explaining how to configure and perform uplink transmission in association with types of uplink channels according to an embodiment of the disclosure.

Referring to FIG. 2E, example 1 shows a scenario where a UE is configured with two serving cells, i.e., PCell 2e-01 and an SCell 2e-03, to perform uplink transmission as scheduled by a base station. In this scenario, the UE cannot transmit a PUCCH and a PUSCH simultaneously in one serving cell because of transmission scheme limitation and RF structural limitation. For this reason, the UE transmits PUCCH-embedded PUSCH as denoted by reference number 2e-05. Here, the PUCCH information is transmitted through the PCell preferentially and, if there is no PUSCH to be transmitted through the PCell, in the SCell with the lowest index. The aforementioned PHR message is transmitted as part of the PUSCH and, in this scenario, the UE needs to report just the PH value obtained by subtracting the transmit powers for PUSCH transmission 2e-05 or 2e-07 from the maximum transmit power ($P_{CMAX,c}$) per serving cell. This is referred to as Type 1 PH.

Likewise, example 2 shows a scenario where a UE is configured with two serving cells, i.e., PCell 2e-11 and an SCell 2e-13, to perform uplink transmission as scheduled by the base station. In this scenario, the UE has a capability of transmitting PUCCH and PUSCH simultaneously through one serving cell or separately using the above-described uplink transmission technology capable of simultaneous transmission. For the case of the PCell (or SCell capable of transmitting PUSCH 2e-19), it is necessary for the UE to report the PH value obtained by subtracting the transmit power for PUCCH transmission 2e-15 as well as the transmit power for the PUSCH transmission 2e-17 from the maximum transmit power ($P_{CMAX,c}$) for the PCell. This is referred to as Type 2 PH.

Figure 2F:
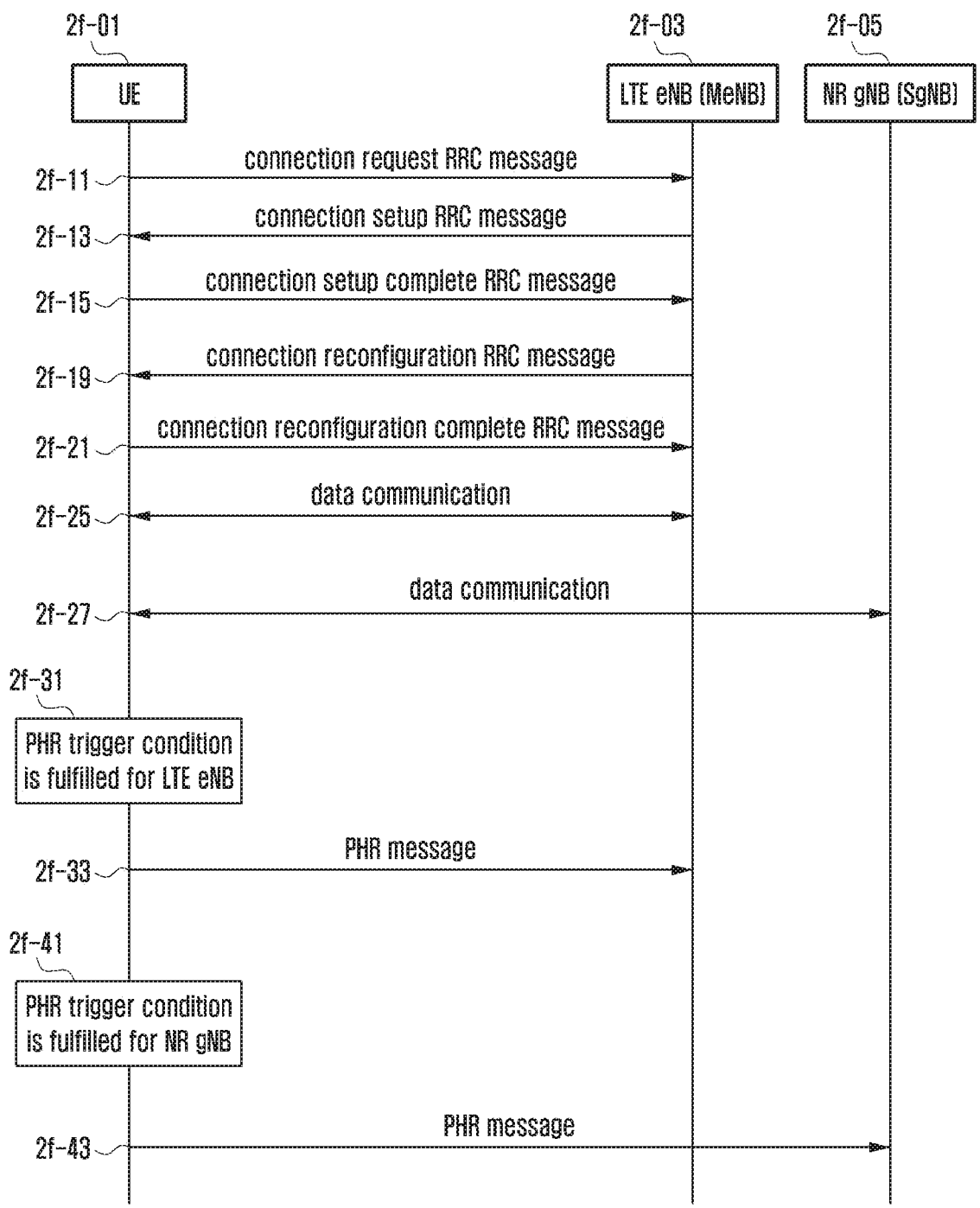
FIG. 2F is a diagram for explaining how to configure and perform uplink transmission in association with types of uplink channels according to an embodiment of the disclosure.

FIG. 2F is a diagram for explaining how to configure and perform uplink transmission in association with types of uplink channels according to an embodiment of the disclosure.

Referring to FIG. 2F, a UE 2f-01 in IDLE state searches around for a suitable LTE eNB (or cell) 2f-03 and, if it determines to access the corresponding cell, transmits a connection request message to the LTE eNB 2f-03, at operation 2f-11, through a random access procedure. The connection request message may be an RRC message that is transmitted via the above-described uplink transmission technology.

Next, the UE 2f-01 receives a connection setup message from the LTE eNB 2f-03 at operation 2f-13 and transmits a connection setup complete message as an acknowledgement message to the LTE eNB 2f-03 at operation 2f-15, thereby completing connection to the corresponding base station. Upon receipt of the connection setup complete message, the UE ef-01 transitions to CONNECTED state to communicate data with the corresponding base station. Next, the LTE eNB 2f-03 may configure PHR-related parameters with an RRC message (i.e., RRC connection reconfiguration message), at operation 2f-19, to receive a PHR for use in scheduling for the UE 2f-01. The PHR-related parameters may include periodicPHR-Timer, prohibitPHR-Timer, and dl-Pathloss-Change. The periodicPHR-Timer is a timer configured to transmit a PHR value to the LTE eNB 2f-03 periodically, the prohibitPHR-Timer is a timer configured to prevent the PHR from being transmitted too frequently, and dl-Pathloss-Change value is a threshold value for triggering a PHR when signal reception change on the downlink channel is equal to or greater than the threshold value. The connection reconfiguration message may include radio bearer-related configuration information for use in data transmission, or a separate connection reestablishment message may be transmitted for the configuration. In the case where the UE 2f-01 performs measurement on the neighboring NR gNBs as configured based on the configuration information received from the LTE eNB 2f-03 and transmits a measurement result to the LTE eNB 2f-03, the connection reconfiguration message may further include configuration information for use of the NR gNB 2f-05 in addition to the current LTE eNB 2f-03. That is, dual connectivity configuration information may also be included. The RRC configuration may be conveyed by an RRCConnectionReconfiguration message. Upon receipt of the RRC message, the UE 2f-01 transmits an acknowledgement message to the LTE eNB 2f-03 at operation 2f-21. The acknowledgement message is an RRCConnectionReconfigurationComplete message.

If the dual connectivity is configured for use of both the LTE eNB 2f-03 and the NR gNB 2f-05 simultaneously according to the configuration message. The UE 2f-01 may perform data communication with the LTE eNB 2f-03 and the NR gNB 2f-05 simultaneously at operations 2f-25 and 2f-27.

Meanwhile, it may be possible to define the timing of the PHR to the base stations (i.e., when to trigger a PHR), and the same conditions may be defined for the LTE and NR systems as follows:

- DL received signal strength is equal to or greater than dl-PathlossChange dB after expiry of prohibitPHR-Timer
- periodicPHR-Timer expires
- PHR is initially configured
- SCell with uplink is added
- PSCell of secondary base station is added when using dual connectivity technology If one of the PHR trigger conditions is fulfilled per base station at operation 2f-31 and 2f-41, the UE generates and transmits per-base station PHRs to the corresponding base stations at operations 2f-33 and 2f-43.

If one of the PHR trigger conditions is fulfilled for the LTE eNB 2f-03, the UE transmits a PHR including Type 1 PH values for all currently configured and activated serving cells of the LTE eNB 2f-03 and the NR gNB 2f-05 at operation 2f-33. If an actual transmission occurs at the LTE eNB 2f-03 or the NR gNB 2f-05 at the time point of PHR transmission, the PHR includes the $P_{CMAX,c}$ value of the cell for which the Type 1 PH is reported. Because it is assumed that the LTE eNB 2f-03 is the MeNB in this embodiment, if the UE 2f-01 is configured to be able to transmit PUCCH and PUSCH simultaneously in the PCell of the MeNB, the UE 2f-01 includes the Type 2 PH value of the PCell in the PHR. However, because the Type 2 PH for the PSCell of the NR gNB 2f-05 is not supported in the NR system, the Type 2 PH and corresponding $P_{CMAX,c}$ value is not included in the PHR.

If one of the PHR trigger conditions is fulfilled for the NR gNB 2f-05, the UE generates a PHR including Type 1 PH values for all currently configured and activated serving cells of the LTE eNB 2f-03 and the NR gNB 2f-05 and transmits the PHR to the NR gNB 2f-05 at operation 2f-43.

If an actual transmission occurs at the LTE eNB 2*f*-03 or the NR gNB 2*f*-05 at the time point of PHR transmission, the PHR includes the $P_{CMAX,c}$ value of the cell for which the Type 1 PH is reported. Because it is assumed that the LTE eNB 2*f*-03 is the MeNB in this embodiment, if the UE 2*f*-01 is configured to be able to transmit PUCCH and PUSCH simultaneously in the PSCell of the NR gNB (i.e., SgNB), the UE 2*f*-01 includes the Type 2 PH value of the PSCell in the PHR. Furthermore, the UE 2*f*-01 includes the Type 2 PH for the PCell of the LTE eNB 2*f*-03 and, if it is configured to report about the actual transmission value, the $P_{CMAX,c}$ value for the LTE PCell in the PHR.

If one of the PHR trigger conditions is fulfilled, the base station may determine the current PH of the UE 2*f*-01 and perform scheduling for the UE based on the PH of the UE.

Figure 2G:
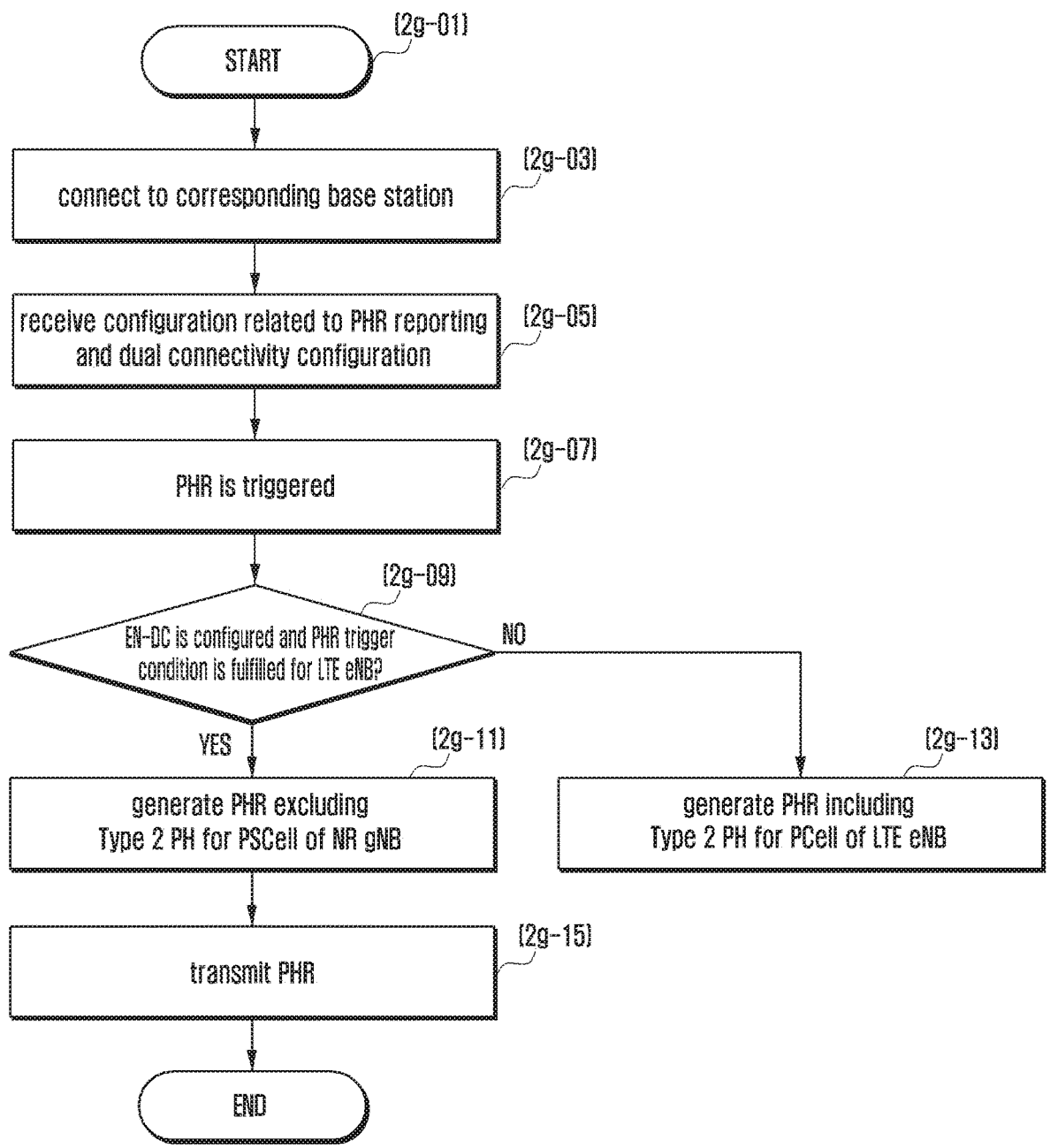
FIG. 2G is a flowchart illustrating a UE operation for reporting PH in a system supporting an inter-RAT dual connectivity according to an embodiment of the disclosure.

FIG. 2G is a flowchart illustrating a UE operation for reporting PH in a system supporting an inter-RAT dual connectivity according to an embodiment of the disclosure.

Referring to FIG. 2G, in method 2*g*-01, a UE in IDLE state searches around for a suitable LTE eNB (or cell) and connects to the corresponding LTE eNB at operation 2*g*-03. For this purpose, the UE transmits an RRCConnectionRequest message to the LTE eNB, receives an RRCConnectionSetup message from the LTE eNB, and transmits an RRCConnectionSetupComplete message, thereby completing the connection procedure.

Next, the UE receives an RRC configuration message for a PHR from the LTE eNB at operation 2*g*-05, and transmits an acknowledgement message. The RRC configuration message may be an RRCConnectionReconfiguration message, and the acknowledgement message may be an RRCConnectionReconfigurationComplete message. The configuration message may include PHR-related parameters such as periodicPHR-Timer, prohibitPHR-Timer, and dl-PathlossChange. The periodicPHR-Timer is a timer configured to transmit a PHR value to the LTE eNB periodically, the prohibitPHR-Timer is a timer configured to prevent the PHR from being transmitted too frequently, and dl-PathlossChange value is a threshold value for triggering PHR when signal reception change on the downlink channel is equal to or greater than the threshold value. The connection reconfiguration message may include radio bearer-related configuration information for use in data transmission, or a separate connection reestablishment message may be transmitted for the configuration. In the case where the UE performs measurement on the neighboring NR gNBs as configured based on the configuration information received from the LTE eNB and transmits a measurement result to the LTE eNB, the connection reconfiguration message may further include configuration information for use of the NR gNB in addition to the current LTE eNB. That is, dual connectivity configuration information may also be included.

Next, the UE determines at operation 2*g*-07 whether a PHR is triggered to each of the configured base stations based on the configured parameters according to the following conditions:

DL received signal strength is equal to or greater than dl-PathlossChange dB after expiry of prohibitPHR-Timer periodicPHR-Timer configured by the base station for periodic report expires PHR is initially configured SCell with uplink is added PSCell of secondary base station is added when using dual connectivity technology If one of the PHR trigger conditions is fulfilled per base station at operation 2*g*-07, the UE determines at operation 2*g*-09 whether the EN-DC is configured and whether the PHR trigger condition is fulfilled for the LTE eNB or the NR gNB.

If it is determined that the EN-DC is configured and the PHR trigger condition is fulfilled for the LTE eNB or if the LTE-LTE DC is configured, the UE generates a PHR to be transmitted to the LTE eNB that includes Type 1 PH values for all currently configured and activated serving cells of the LTE eNB and the NR gNB. If an actual transmission occurs at the LTE eNB or the NR gNB at the time point of PHR transmission, the PHR includes the $P_{CMAX,c}$ value of the cell for which the Type 1 PH is reported. Because it is assumed that the LTE eNB is the MeNB in this embodiment, if the UE is configured to be able to transmit PUCCH and PUSCH simultaneously in the PCell of the MeNB, the UE includes the Type 2 PH value of the PCell in the PHR, at operation 2*g*-13. However, because the Type 2 PH for the PSCell of the NR gNB is not supported in the NR system, the Type 2 PH and corresponding $P_{CMAX,c}$ value are not included in the PHR, at operation 2*g*-11.

If it is determined that the EN-DC is not configured, inter-NR DC is configured, or one of the PHR trigger conditions is fulfilled for the NR even though the EN-DC is configured, the UE generates a PHR to be transmitted to the NR gNB that includes Type 1 PH values for all currently configured and activated serving cells of the LTE eNB and the NR gNB. If an actual transmission occurs at the LTE eNB or the NR gNB at the time point of PHR transmission, the PHR includes the $P_{CMAX,c}$ value of the cell for which the Type 1 PH is reported. Because it is assumed that the LTE eNB is the MeNB in this embodiment, if the UE is configured to be able to transmit PUCCH and PUSCH simultaneously in the PSCell of the NR gNB (i.e., SgNB), the UE includes the Type 2 PH value of the PSCell in the PHR. Furthermore, the UE includes the Type 2 PH for the PCell of the LTE eNB and, if it is configured to report about the actual transmission value, the $P_{CMAX,c}$ value for the LTE PCell in the PHR.

Next, the UE transmits the PHR to the base station at operation 2*g*-15 to notify the base station of the PH of the UE. Accordingly, the base station may determine the current PH of the UE and perform scheduling for the UE based on the PH of the UE.

Figure 2H:
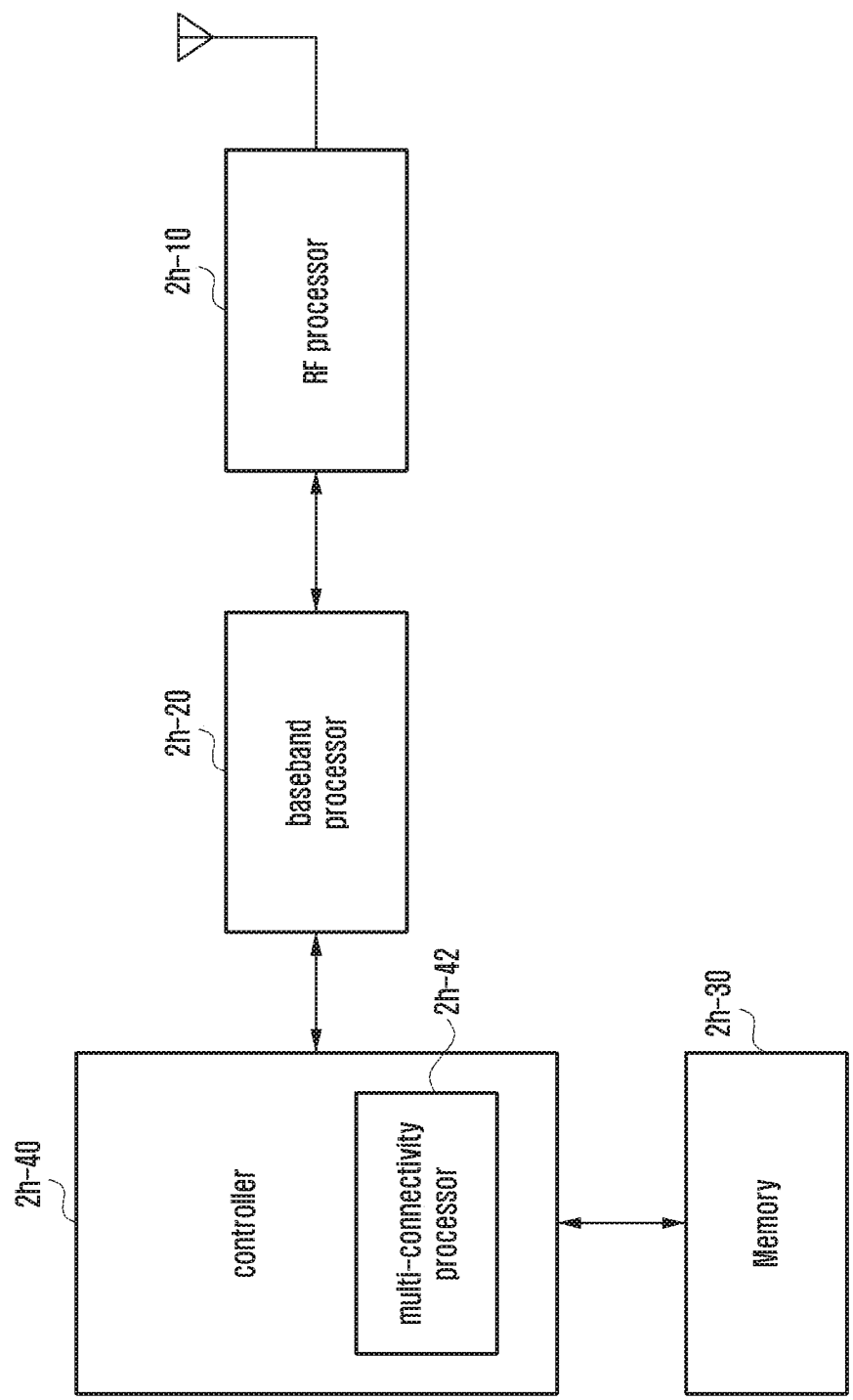
FIG. 2H is a block diagram illustrating a configuration of a UE in a wireless communication system according to an embodiment of the disclosure.

FIG. 2H is a block diagram illustrating a configuration of a UE in a wireless communication system according to an embodiment of the disclosure.

Referring to FIG. 2H, the UE includes a radio frequency (RF) processor 2*h*-10, a baseband processor 2*h*-20, a memory 2*h*-30, and a controller 2*h*-40.

The RF processor 2*h*-10 has a function for transmitting/receiving a signal over a radio channel such as band conversion and amplification of the signal. That is, the RF processor 2*h*-10 up-converts a baseband signal from the baseband processor 2*h*-20 to an RF band signal and transmits the RF signal via an antenna and down-converts the RF signal received via the antenna to a baseband signal. For example, the RF processor 2*h*-10 may include a transmission filter, a reception filter, an amplifier, a mixer, an oscillator, a digital-to-analog converter (DAC), and an analog-to-digital converter (ADC). Although one antenna is depicted in the drawing, the UE may be provided with a plurality of antennas. The RF processor 2*h*-10 may also include a plurality of RF chains. The RF processor 2*h*-10 may perform beamforming. For beamforming, the RF processor 2h-10 may adjust the phase and size of a signal to be transmitted/received by means of the antennas or antenna elements.

The baseband processor 2h-20 has a baseband signal-bit string conversion function according to a physical layer standard of the system. For example, in a data transmission mode, the baseband processor 2h-20 performs encoding and modulation on the transmission bit string to generate complex symbols. In a data reception mode, the baseband processor 2h-20 performs demodulation and decoding on the baseband signal from the RF processor 2h-10 to recover the transmitted bit string. In the case of using an OFDM scheme for data transmission, the baseband processor 2h-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 2h-20 splits the baseband signal from the RF processor 2h-10 into OFDM symbols, performs fast Fourier transform (FFT) on the OFDM symbols to recover the signals mapped to the subcarriers, and performs demodulation and decoding on the signals to recover the transmitted bit string.

The baseband processor 2h-20 and the RF processor 2h-10 process the transmission and reception signals as described above. Accordingly, the baseband processor 2h-20 and the RF processor 2h-10 may be referred to as a transmitter, a receiver, a transceiver, or a communication unit. At least one of the baseband processor 2h-20 and the RF processor 2h-10 may include a plurality of communication modules for supporting different radio access technologies. At least one of the baseband processor 2h-20 and the RF processor 2h-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.5 GHz and 5 GHz bands) and an mmWave band (e.g., 60 GHz).

The memory 2h-30 stores data such as basic programs for operation of the UE, application programs, and setting information. The memory 2h-30 may also store the information on a second access node for radio communication with a second radio access technology. The memory 2h-30 provides the stored information in response to a request from the controller 2h-40.

The controller 2h-40 controls overall operations of the UE. For example, the controller 2h-40 controls the baseband processor 2h-20 and the RF processor 2h-10 for transmitting and receiving signals. The controller 2h-40 writes and reads data to and from the memory 2h-30. For this purpose, the controller 2h-40 may include at least one processor. For example, the controller 2h-40 may include a communication processor (CP) for controlling communications and an application processor (AP) for controlling higher layer programs such as applications. According to an embodiment of the disclosure, the controller 2h-40 includes a multi-connectivity processor 2h-42 for processing operations in a multi-connectivity mode. For example, the controller 2h-40 may control the UE to perform the UE operation described with reference to FIG. 2E.

According to an embodiment of the disclosure, the controller 2h-40 ascertains PH configuration from a control message received from the base station and, if the dual-connectivity is configured, types of RATs of neighboring base stations as well as the serving base station to determine the type of PH information to transmit and then transmits a message containing the corresponding PH information.

The methods of the disclosure that are claimed in the claims and described in the specification can be implemented by hardware, software, or a combination of them.

In the case of being implemented in software, it may be possible to store at least one program (software module) in a computer-readable storage medium. The at least one program stored in the computer-readable storage medium may be configured for execution by at least one processor embedded in an electronic device. The at least one program includes instructions executable by the electronic device to perform the methods disclosed in the claims and specifications of the disclosure.

Such a program (software module or software program) may be stored in a non-volatile memory such as random access memory (RAM) and flash memory, Read Only Memory (ROM), Electrically Erasable Programmable Read Only Memory (EEPROM), a magnetic disc storage device, a Compact Disc-ROM (CD-ROM), digital versatile discs (DVDs) or other types of optical storage device, and a magnetic cassette. It may also be possible to store the program in a memory device implemented in combination of part or all of the aforementioned media. The memory may include a plurality of memories.

The program may be stored in an attachable storage device accessible through a communication network implemented as a combination of Internet, intranet, local area network (LAN), wireless LAN (WLAN), and Storage Area Network (SAN). The storage device may be attached to the device performing the methods according to embodiments of the disclosure by means of an external port. It may also be possible for a separate storage device installed on a communication network to attach to the device performing the methods according to embodiments of the disclosure.

In the embodiments of the disclosures, the components are described in singular or plural forms depending on the embodiment. However, the singular and plural forms are selected appropriately for the proposed situation just for explanatory convenience without any intention of limiting the disclosure thereto; thus, the singular form includes the plural form as well, unless the context clearly indicates otherwise.

Although the description has been made with reference to particular embodiments, the disclosure can be implemented with various modifications without departing from the scope of the disclosure. Thus, the disclosure is not limited to the particular embodiments disclosed, and it will include the following claims and their equivalents.

Third Embodiment

Detailed descriptions of well-known functions and structures incorporated herein may be omitted to avoid obscuring the subject matter of the disclosure. Embodiments of the disclosure are described in detail with reference to the accompanying drawings.

Figure 3A:
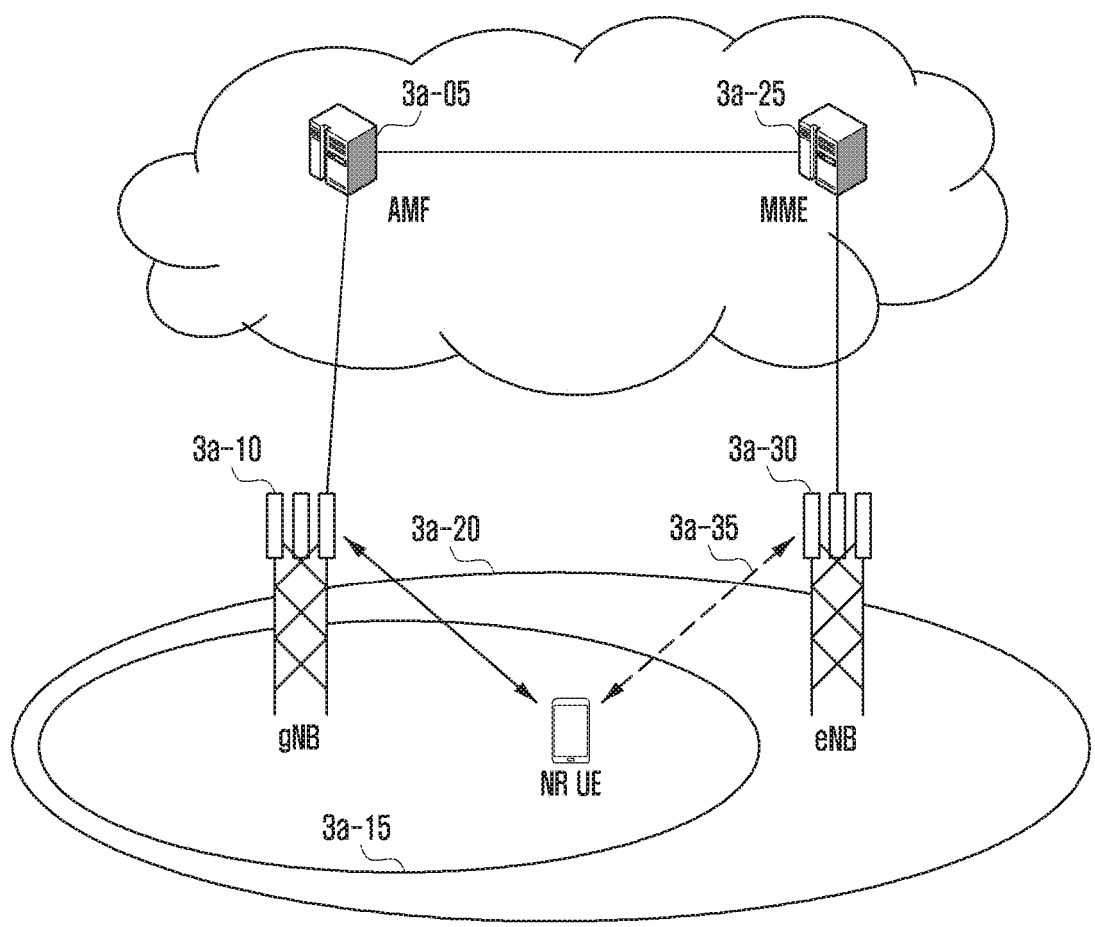
FIG. 3A is a diagram illustrating architecture of a next generation mobile communication system according to an embodiment of the disclosure.

FIG. 3A is a diagram illustrating architecture of a next generation mobile communication system according to an embodiment of the disclosure.

Referring to FIG. 3A, a RAN of the next generation mobile communication system includes a new radio Node B (gNB) 3a-10 and a new radio core network (AMF) 3a-05. A new radio user equipment (hereinafter, referred to as NR UE or simply UE) 3a-15 connects to an external network via the gNB 3a-10 and the AMF 3a-05.

In FIG. 3A, the gNB 3a-10 corresponds to the evolved Node B (eNB) in the legacy LTE system. The NR UE 3a-15 connects to the gNB, which may provide services superior to those of the legacy eNB. In the next generation mobile communication system where all user traffic is served through shared channels, there is a need of an entity for collecting UE-specific status information (such as buffer status, power headroom status, and channel status) and scheduling the UEs based on the collected information, and the gNB 3a-10 takes charge of such functions. Typically, one gNB hosts multiple cells. In order to meet the data rate requirement that is higher than that for legacy LTE, it is necessary to secure a maximum bandwidth broader than ever before by employing advanced technologies such as orthogonal frequency division multiplexing (OFDM) as a radio access scheme and beamforming. It may be possible to employ an adoptive modulation and coding (AMC) technology to determine a modulation scheme and a channel coding rate in adaptation to the channel condition of the UE. The AMF 3a-05 is responsible for mobility management, bearer setup, and QoS setup. The AMF 3a-05 is responsible for other control functions as well as UE mobility management functions in connection with a plurality of gNBs. The next generation mobile communication system may interoperate with legacy LTE systems in such a way of connecting the AMF 3a-05 to a mobility management entity (MME) 3a-25 through a network interface. The MME 3a-25 is connected to an eNB 3a-30 as a legacy base station. A UE supporting LTE-NR Dual Connectivity may establish a connection to the eNB 3a-30 as denoted by reference number 3a-35 as well as the gNB 3a-10 as denoted by reference number 3a-20.

Figure 3B:
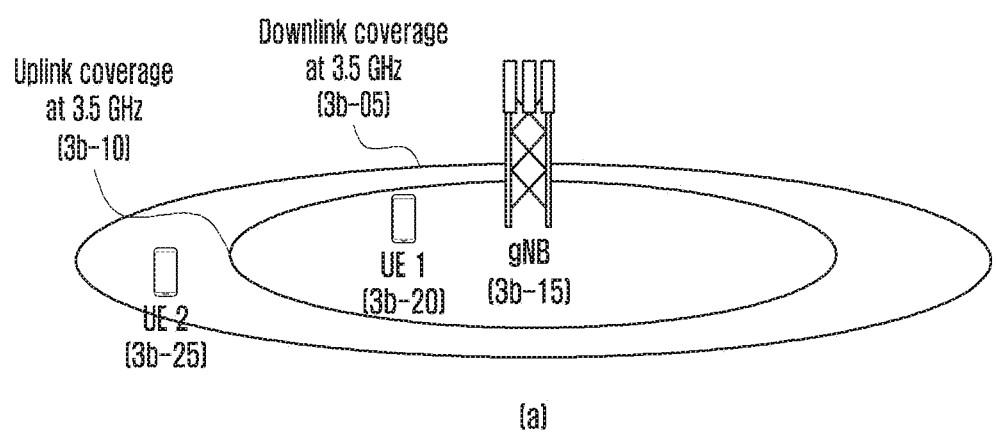
FIG. 3B is a conceptual diagram for explaining use of additional uplink frequency according to an embodiment of the disclosure.
Figure 3B:
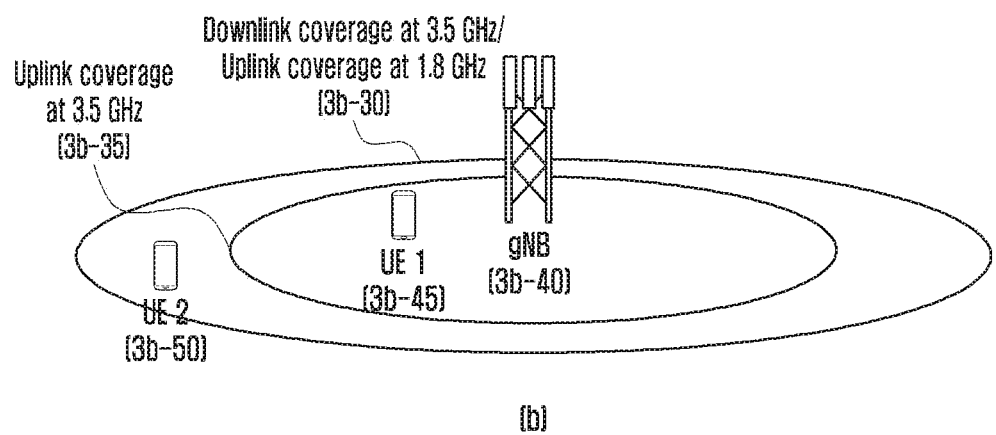

FIG. 3B is a conceptual diagram for explaining use of additional uplink frequency according to an embodiment of the disclosure.

Referring to FIG. 3B, a mobile communication system, a UL-DL coverage mismatch may occur. The UL-DL coverage mismatch occurs because of a difference in channel characteristics between uplink and downlink, a limitation of the maximum transmit power of a terminal, or structural limitations of a transmit antenna. Typically, a downlink service area is broader than an uplink service area. In a case of a 3.5 GHz TDD system, the DL coverage 3b-05 is broader than the UL coverage 3b-10. In this case, no problem arises in that a first UE 3b-20 receives services in both the UL and DL, but a problem may arise in that the second UE 3b-25 transmits UL data to the gNB 3b-15. In order to mitigate the problem that arises from such coverage mismatch, the effective DL coverage is reduced in size for matching with the UL coverage. However, such a cost is too much for UL transmissions.

In the next generation mobile communication system, a method is employed for a UE 3b-45 to use a UL frequency for broader coverage to overcome the performance limitation that arises from such mismatch. That is, the UE is capable of using a supplementary UL frequency of 1.8 GHz in addition to the UL frequency of 3.5 GHz as denoted by reference number of 3b-30. The supplementary UL frequency is referred to as SUL frequency. By the nature of frequency, the propagation distance of a radio signal increases as the frequency decreases. This means that a frequency of 1.8 GHz that is lower than the frequency of 3.5 GHz expands the coverage. As a consequence, the second UE 3b-50 is capable of transmitting data to the gNB 3b-40 successfully using the UL frequency of 1.8 GHz as denoted by reference number 3b-30. The DL coverage 3b-35 is broader than the UL coverage 3b-30. Regardless of the coverage issue, the first UE 1b-45 may select one of the 1.8 GHz frequency or the 3.5 GHz frequency bands for the purpose of distributing UL access congestion because it can use both the 1.8 GHz and 3.5 GHz UL frequency bands. The SUL frequency may be an LTE frequency.

It may be possible to configure both of an NR UL frequency and an SUL frequency to one UE and, in this case, the PUSCH as an uplink data channel may be transmitted on one uplink at one time. The PUCCH is also transmitted on one uplink at one time, the uplink being identical with or different from that on which the PUSCH is transmitted.

In a mobile communication system, a UE reports its available transmit power amount when a predetermined event occurs. The available transmit power amount_information is used by a base station to manage resources scheduled for the corresponding UE. For example, if the available transmit power amount reported by a UE is sufficient, the base station may allocate additional radio resources to the UE. In LTE, the available transmit power amount is referred to as power headroom (PH). In the next generation mobile communication system, a UE has to transmit the corresponding information. The disclosure proposes a PH format and a PH transmission procedure that are applicable for the case where an SUL frequency is configured.

A UE reports its PH to the base station when a predetermined even occurs. The predetermined event is as follows.
  prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;
  periodicPHR-Timer expires;
  upon configuration or reconfiguration of the power headroom reporting functionality by upper layers, which is not used to disable the function;
  activation of an SCell of any MAC entity with configured uplink;
  addition of the SCell with PUCCH in SCG (PSCell) in EN-DC;
  prohibitPHR-Timer expires or has expired, when the MAC entity has UL resources for new transmission, and the following is true in this TTI for any of the activated Serving Cells of any MAC entity with configured uplink:
  there are UL resources allocated for transmission or there is a PUCCH transmission on this cell, and the required power backoff due to power management (as allowed by P-MPR$_c$) for this cell has changed more than dl-PathlossChange dB since the last transmission of a PHR when the MAC entity had UL resources allocated for transmission or PUCCH transmission on this cell.

The dl-PathlossChange, prohibitPHR-Timer, and periodicPHR-Timer are transmitted to the UE via RRC signaling. While the prohibitPHR-Timer is running, the UE cannot report PH to the base station. If the periodicPHR-Timer expires, the UE may report its PH to the base station without any request to the base station for separate radio resources.

FIG. 3C is a diagram illustrating a power headroom report (PHR) format in use for legacy LTE according to an embodiment of the disclosure.

Referring to FIG. 3C, there are various PHR formats defined for use in legacy LTE. The PHR formats include a basic PHR format for a situation of using a UE's frequency, extendedPHR format, and extended PHR2 formats for use in a situation of using a carrier aggregation technology that aggregates multiple frequencies for providing a service, and a dualConnectivityPHR format for use in a situation of using a dual connectivity technology that establishes connections to two base stations simultaneously for providing a service. Among them, the extendedPHR format is described to understand the characteristics of PHR formats. The first byte 3c-05 of the extendedPHR format includes bits corresponding to respective SCells. Each of the bits is used to indicate the SCell for which PH information is included in the PHR format. If the cell-specific bit is set to 1, this means that the PH information of the SCell corresponding to the cell-specific bit is included in the PHR format. The first byte followed by one or more bytes carries the PH information for PCell and SCells. For one serving cell, one byte 3c-10, 3c-20, or 3c-30 carrying information of at least one PH and one byte 3c-15, 3c-25, or 3c-35 selectively carrying the transmit power information of the UE are generated. The PH information is carried in the corresponding PH field, which spans 6 bits. A byte carrying the PH information includes a P field and a V field as well as the PH field. The P field is used to indicate whether the UE's transmit power limited by a regulation or rule rather than a wireless power control factor has affected the PH information. The V field is used to indicate that the corresponding PH information is generated by applying a predefined parameter because there is no actual transmission. If the V field is set to 1, this means that the predefined parameter is applied and, in this case, the UE's transmit power information that is supposed to be carried in another byte is omitted. A byte including the PH field is followed by a byte carrying the UE's transmit power information corresponding to the PH field. The byte includes a Pcmax field that carries the UE's transmit power information and spans 6 bits. The remaining 2 bits are reserved bits for future use. In the case of transmitting the PH information for the PCell and one or more SCells, the PH information for the PCell is arranged first and followed by the PH information for the SCells in an ascending order of SCell indices in the PHR format. The PCell is provided with PUCCH and capable of transmitting PUSCH and PUCCH simultaneously depending on the network and UE capability. If the PUSCH and PUCCH are in use simultaneously, it is necessary to subtract both the transmit power amount assigned for the PUSCH and the transmit power amount assigned for the PUCCH from the maximum transmit power amount of the UE to calculate the PH. In the case where the PUSCH and PUCCH are in use, the base station notifies the UE of the situation using the PUCCH configuration. In order to report the PH for the case of transmitting the PUSCH only and the PH for the case of transmitting the PUSCH along with the PUCCH, Type 1 PH as denoted by reference number 3c-20 and Type 2 PH as denoted by reference number 3c-10 are used. The Type 1 PH is defined as Pcmax−PPUSCH. Here, the PPUSCH denotes the transmit power amount assigned for PUSCH. The Type 2 PH is defined as Pcmax−PPUSCH−PPUCCH. Here, the PPUCCH denotes the transmit power amount assigned for PUCCH. If the PUCCH configuration indicates no simultaneous use of PUSCH and PUCCH, only the Type 1 PH is used. If the PUCCH configuration indicates simultaneous use of PUSCH and PUCCH, both the Type 1 PH and Type 2 PH are used. The Type 2 PH is applicable only to the PCell and not to the SCell in a carrier aggregation (CA) system. If the PUCCH configuration indicates simultaneous use of the PUSCH and the PUCCH, both the Type 1 PH and the Type 2 PH are included as PH for the PCell. The PH for the PCell is arranged at the beginning part in consideration that the Type 1 PH is necessary for interpreting the Type 2 PH. For SCells, if ul-Configuration is configured, Type 3 PH is applied; if not, the Type 1 PH is applied. Accordingly, in this PHR format, only one of the Type 1 PH and Type 3 PH is included per SCell.

The UE calculates the PH using Equation (1). Equation (1) assumes PUCCH-only transmission.

$$\text{PH}(i) = P_{CMAX,c}(i) - \{10 \log_{10}(M_{PUSCH,c}(i)) + P_{O\_PUSCH,c}(j) + \alpha_x(j) \cdot PL_c + \Delta_{TF,c}(i) + f_c(i)\}$$ Equation 1

The PH(i) at the $i^{th}$ subframe in serving cell c is calculated with the maximum uplink transmit power $P_{CMAX,c}(i)$, number of resource blocks $M_{PUSCH,c}(i)$, power offset derived from MCS $\Delta_{TF,c}$, pathloss $P_{Lc}$, and accumulated TPC commands $f_c(i)$. In Equation (1), $P_{Lc}$ denotes the pathloss in the cell for which pathloss is supposed to be provided for serving cell c. The pathloss for use in determining an uplink transmit power of an arbitrary serving cell is a pathloss on the downlink channel of the corresponding cell or the path loss on the downlink channel of another cell. Which pathloss is to be used is notified from the base station to the UE during the call setup procedure. In Equation (1), $f_c(i)$ denotes the accumulated value of TPC commands for serving cell c. In Equation (1) $P_{O\_PUSCH,C}$ denotes a higher layer parameter indicating a sum of a cell-specific value and a UE-specific value. Typically, $P_{O\_PUSCH,C}$ varies with the transmission type of PUSCH such as semi-persistent scheduling, dynamic scheduling, and random access response. In Equation (1), αc is 3-bit cell-specific value denoting a weight that is applied to the pathloss for use in calculating the uplink transmit power (i.e., as this value increases, the impact of the pathloss to the uplink transmission power calculation increases), and its value is limited according to the transmission type of the PUSCH. In Equation (1), j denotes the type of PUSCH. That is, j is set to 0 for semi-persistent scheduling, 1 for dynamic scheduling, and 2 for random access response. If there is no PUSCH transmit in a certain serving cell, according to the definition $M_{PUSCH}$ and $\Delta_{TF}$ cannot be applied in Equation (1).

Although there is no actual PUSCH transmission, the base station may trigger a PHR to acquire pathloss information on a specific uplink. If the PHR is triggered for a specific serving cell, the UE determines a PH value calculation scheme depending on whether there is an actual PUSCH transmission. If there is an actual PUSCH transmission in the corresponding serving cell, the UE calculates PH using Equation (1) as in the legacy technology. If there is no actual PUSCH transmission in the corresponding serving cell, this means that there is no transmission resources allocated and that the values of $M_{PUSCH}$ and $\Delta_{TF}$ to be used are unclear; thus, there is a need of a device for making it possible for the base station and the UE to calculate and interpret the PH using the same $M_{PUSCH}$ and $\Delta_{TF}$ agreed therebetween. For example, it may be possible for the UE and the base station to predetermine a transmission format (transmission resource amount and MCS level) for the case where there is no PUSCH transmission. Assuming such a reference transmission format with 1 RB and the lowest MCS level, $M_{PUSCH}$ and $\Delta_{TF}$ become 0, which has the same meaning that $M_{PUSCH}$ and $\Delta_{TF}$ are omitted in Equation (1). That is, because there is no actual data transmission in the corresponding serving cell, $P_{CMAX,c}(i)$ does not exist for the corresponding serving cell. Thus, it is necessary to determine the value of the $P_{CMAX,c}(i)$. One approach is to define and apply a virtual $P_{CMAX,c}(i)$ for virtual transmission. The $P_{CMAX,c}(i)$ may be determined using the maximum transmit power allowed for the corresponding cell and $P_{powerclass}$ as the nominal maximum transmit power of the UE. For example, $P_{CMAX,c}$ may be calculated by Equation (2):

$$P_{CMAX,c} = \min\{P_{EMAX}, P_{powerclass}\} \quad \text{Equation 2}$$

The $P_{CMAX}$ is determined to satisfy $P_{CMAX\_L} \leq P_{CMAX} \leq P_{CMAX\_H}$. Here, if zero power back-off is considered, $P_{CMAX\_L} = P_{CMAX\_H}$ and thus $P_{CMAX} = P_{CMAX\_H}$. Here, $P_{CMAX\_H}$ is the least one of $P_{powerclass}$ and $P_{EMAX}$. $P_{EMAX}$ is the cell-specific maximum allowed transmit power, and $P_{powerclass}$ is a UE-specific maximum allowed transmit power.

Figure 3D:
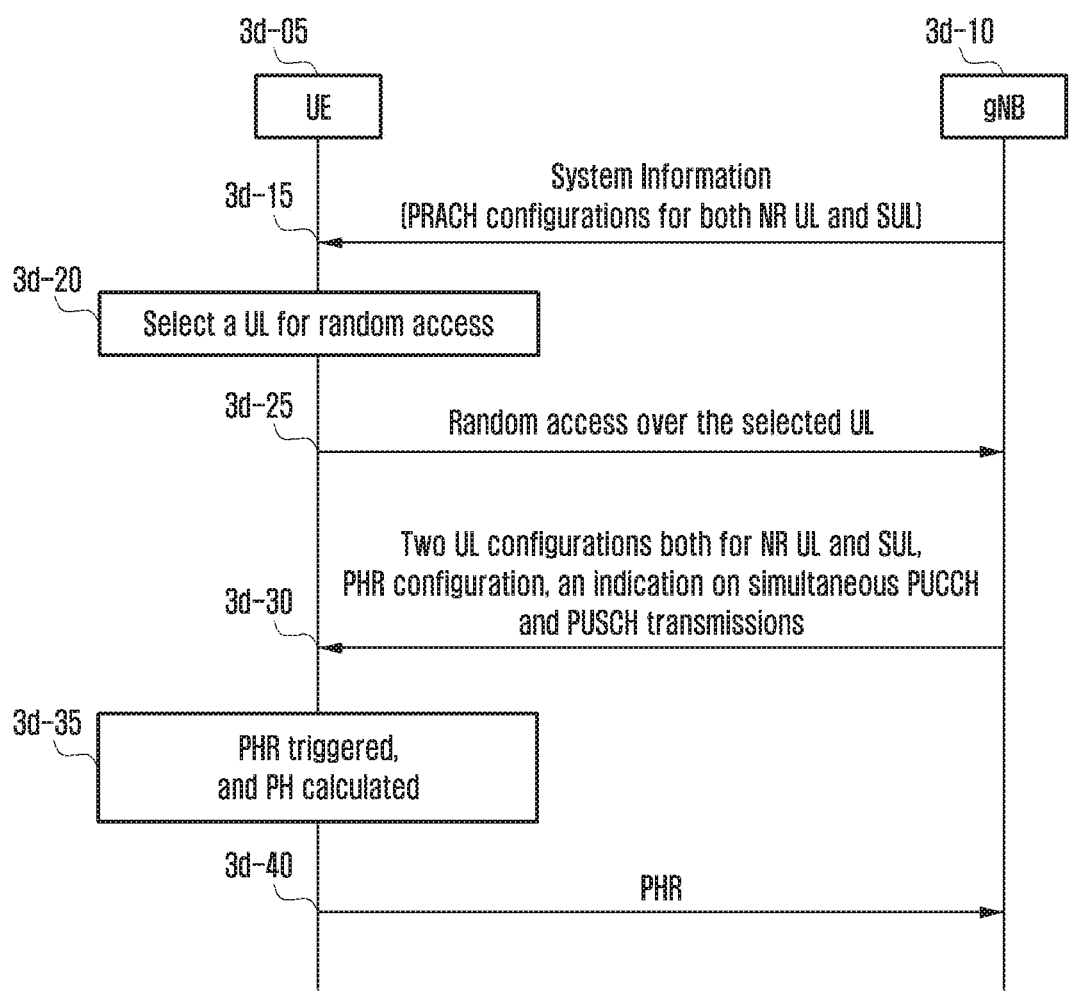
FIG. 3D is a signal flow diagram illustrating a PHR procedure according to an embodiment of the disclosure.

FIG. 3D is a signal flow diagram illustrating a PHR procedure according to an embodiment of the disclosure.

Referring to FIG. 3D, a UE 3d-05 receives system information from a gNB 3d-10 at operation 3d-15. The system information includes PRACH configuration information to be applied to NR uplink (UL) and SUL. The UE 3d-05 selects an uplink according to a predetermined rule at operation 3d-20 and performs random access over the selected uplink at operation 3d-25. After completing the random access successfully, the UE 3d-05 transitions to the connected mode and receives configuration information from the gNB at operation 3d-30. If the UE 3d-05 uses both the NR UL and SUL, the configuration information may be provided per uplink. The gNB 3d-10 transmits PHR configuration information to the UE 3d-05. The configuration information includes dl-PathlossChange, prohibitPHR-Timer, and periodicPHR-Timer. The gNB 3d-10 configures the UE 3d-05 to support simultaneous transmissions of PUSCH and PUCCH over each of the NR UL and the SUL or not. The gNB 3d-10 configures whether the UE generates PH information with a predefined parameter when there is no actual transmission. If a PHR is triggered according to a predetermined rule, the UE calculates PH per serving cell at operation 3d-35. The UE 3d-05 selects one of the PHR formats proposed in the disclosure based on the proposed conditions and transmits the PH in the selected PHR format to the gNB at operation 3d-40.

Figure 3E:
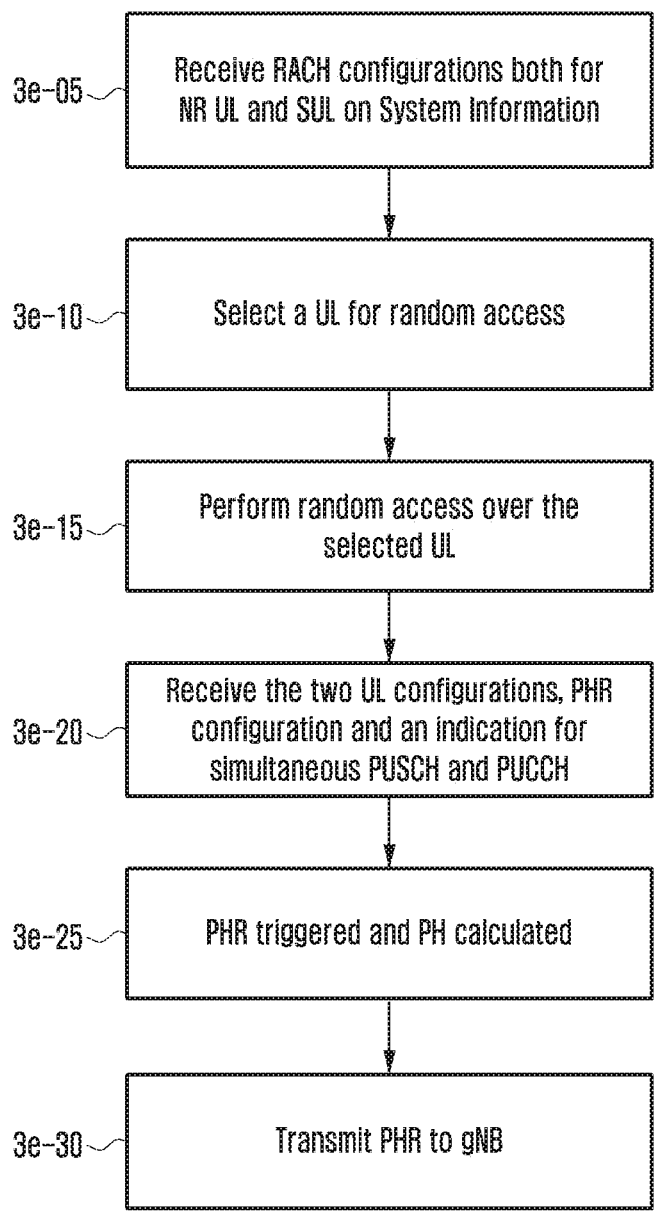
FIG. 3E is a flowchart illustrating a UE operation in a PHR procedure according to an embodiment of the disclosure.

FIG. 3E is a flowchart illustrating a UE operation in a PHR procedure according to an embodiment of the disclosure.

Referring to FIG. 3E, at operation 3e-05 a UE receives system information from a gNB. The system information includes PRACH configuration information to be applied to NR UL and SUL.

At operation 3e-10, the UE selects one uplink according to a predetermined rule.

At operation 3e-15, the UE perform random access over the selected uplink.

At operation 3e-20 the UE receives configuration information on the two uplinks. The configuration information includes dl-PathlossChange, prohibitPHR-Timer, and periodicPHR-Timer. The UE is configured to support simultaneous transmissions of PUSCH and PUCCH over each of the NR UL and the SUL or not. The UE is configured to generate or not to generate PH information with a predefined parameter when there is no actual transmission.

At operation 3e-25, if a PHR is triggered according to a predetermined rule, the UE calculates PH per serving cell.

At operation 3e-30, the UE selects one of the PHR formats proposed in the disclosure based on the proposed conditions and transmits the PH in the selected PHR format to the gNB.

In the next generation mobile communication system, an SUL frequency may be configured in a PCell or SCell. Table 2 shows cases that may be considered in the PCell. Case 1 is the case where the PUSCH is configured on one uplink and only a sounding reference signal (SRS) is configured on another link. Here, the uplink configured with the PUSCH is configured to have also the PUCCH. Case 2 is the case where PUSCH is configured on both the two uplinks. In Case 2, one of the two uplinks with PUSCH is configured to have PUCCH.

TABLE 2

| PCell | xUL (either SUL or NUL) | | | yUL (either NUL or SUL) | | |
|---|---|---|---|---|---|---|
| | PUCCH | PUSCH | SRS | PUCCH | PUSCH | SRS |
| Case 1: PUSCH UL + SRS- only UL | O | O | X or O | X | X | O |
| Case 2: PUSCH UL + PUSCH UL | O | O | X or O | X | O | X or O |

Table 3 shows cases that may be considered in the SCell. Case 3 is the case where SRS is configured on both the two uplinks. Case 4 is the case where PUSCH is configured on one uplink while only SRS is configured on the other uplink. Case 5 is the case where PUSCH is configured on both the two uplinks; however, in the SCell with PUCCH, Case 1 and Case 2 exist.

TABLE 3

| SCell | xUL | | yUL | |
|---|---|---|---|---|
| | PUSCH | SRS | PUSCH | SRS |
| Case 3: SRS-only UL + SRS-only UL | X | O | X | O |
| Case 4: PUSCH UL + SRS-only UL | O | X or O | X | O |
| Case 5: PUSCH UL + PUSCH UL | O | X or O | O | X or O |

In the above cases, if a PHR is triggered, two PH values may be generated because there are two uplinks. If the legacy PHR format is reused, there is a need of a rule for selecting one of the PH values because only one of the two PH values is reported (except for Type 2 PH) for one cell regardless of Type 1 PH or Type 3 PH. In the disclosure, the PH value for the uplink on which the PUSCH is configured is reported. Meanwhile, in the case where the PUSCH is configured on all uplinks or only the SRS is configured on both the uplinks, the PH value for a predetermined uplink (NR UL or SUL) or the uplink configured via RRC is reported.

In Case 1 and Case 4, one of the two uplinks is configured to have the PUSCH while the other is configured to have only SRS. Because the PH information on the uplink configured with PUSCH is more useful, the PH value for the uplink configured with PUSCH is reported. In Case 2, Case 3, and Case 5, all uplinks are configured to have PUCCH or only SRS. In these cases, the PH value of a predetermined uplink (NR UL or SUL) or the uplink configured via RRC is reported.

For the above cases, it may be possible to propose a new PHR format capable of containing two PH values of Type 1 PH or Type 3 PH. In the legacy LTE technology, one of the Type 1 PH or Type 3 PH, with the exception of Type 2 PH, is included in one PHR. The disclosure proposes a PHR format capable of containing multiple Type 1 PHs or Type 3 PHs for one cell.

Figure 3F:
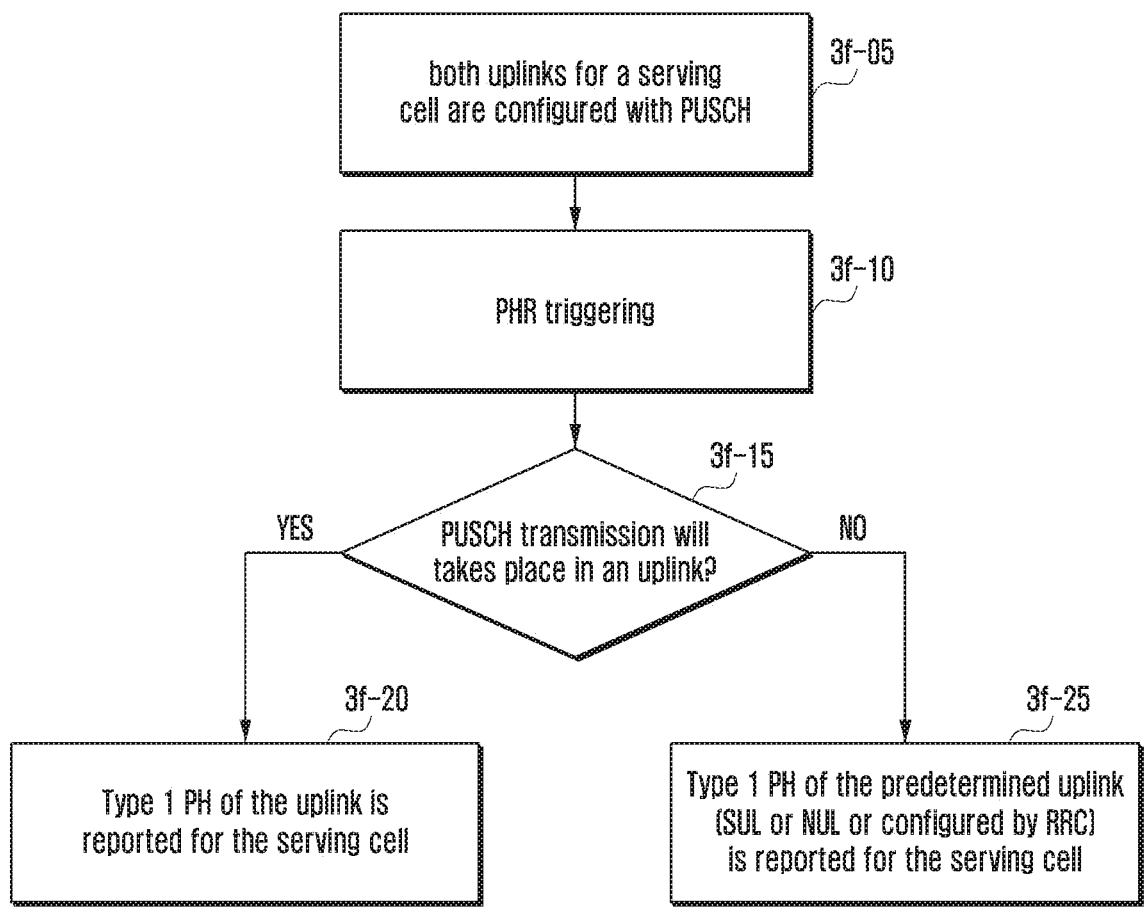
FIG. 3F is a flowchart illustrating a UE operation in a PHR procedure, when PUSCH is configured on two uplinks, according to an embodiment of the disclosure.

FIG. 3F is a flowchart illustrating a UE operation in a PHR procedure, when PUSCH is configured on two uplinks, according to an embodiment of the disclosure. In this embodiment, it is assumed that the legacy PHR format is reused.

Referring to FIG. 3F, at operation 3f-05, the UE is configured with PUCCH on two uplinks for one serving cell according to configuration information received from a base station. Although the PUSCH is configured on both the two uplinks, one PUSCH transmission takes place at one time.

At operation 3f-10, the UE detects a PHR trigger according to the above conditions.

At operation 3f-15, the UE determines whether one PUSCH transmission takes place on one uplink.

If one PUSCH transmission takes place on one uplink, the UE calculates Type 1 PH for the uplink on which the PUSCH transmission takes place, generates a PHR including the Type 1 PH, and transmits the PHR to the base station at operation 3f-20. Any PH for the uplink on which no PUSCH transmission takes place is not considered.

If one PUSCH transmission does not take place on one uplink, this means that PUSCH transmission does not take place on any of the two uplinks. In this case, the UE reports Type 1 PH value for a predetermined uplink (NR UL or SUL) or an uplink configured via RRC at operation 3f-25. Because no actual PUSCH transmission takes place on the selected uplink, the UE calculates the Type 1 PH using a virtual format.

Figure 3G:
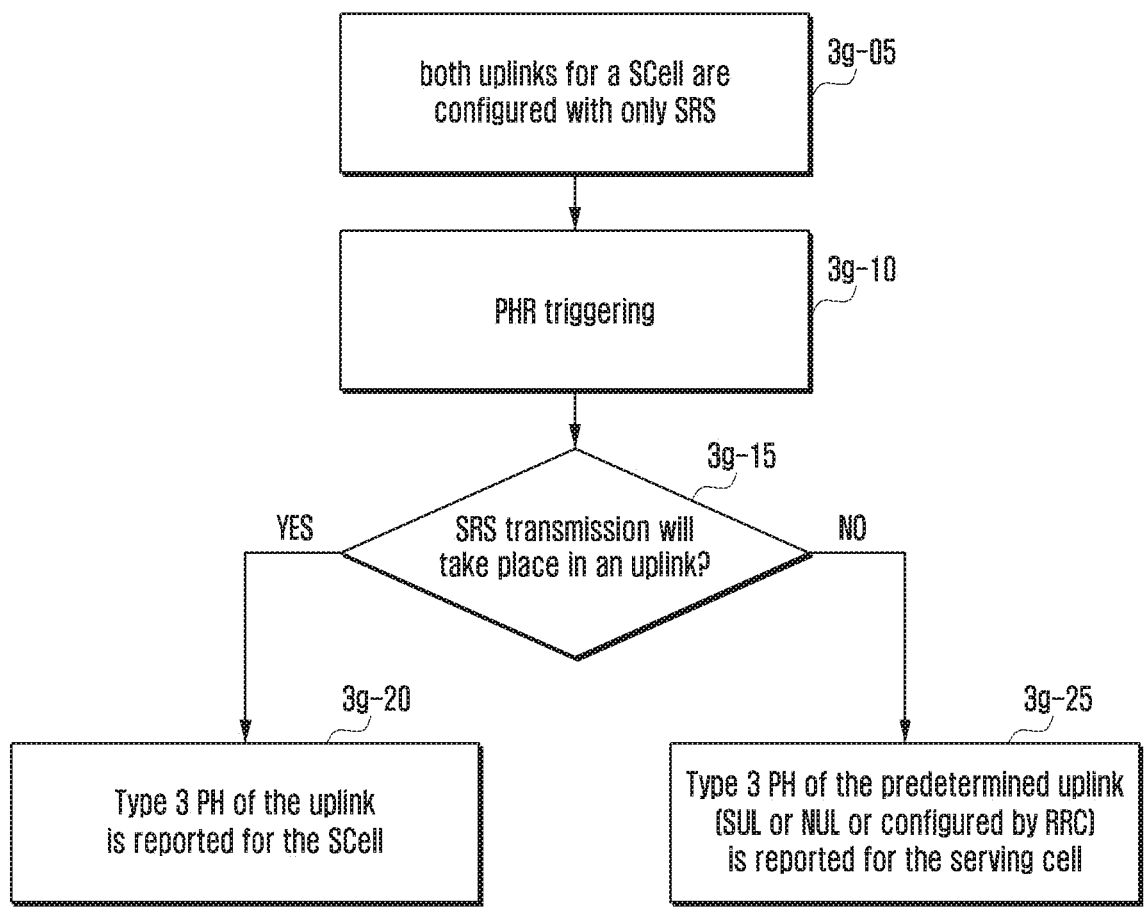
FIG. 3G is a flowchart illustrating a UE operation in a PHR procedure, when only SRS is configured on two uplinks, according to an embodiment of the disclosure.

FIG. 3G is a flowchart illustrating a UE operation in a PHR procedure, when only SRS is configured on two uplinks, according to an embodiment of the disclosure. In this embodiment, it is assumed that the legacy PHR format is reused.

Referring to FIG. 3G, at operation 3g-05, the UE is configured with only SRS on two uplinks for one serving cell according to configuration information received from a base station.

At operation 3g-10, the UE detects a PHR trigger according to the above conditions.

At operation 3g-15, the UE determines whether an SRS transmission takes place on one uplink.

If an SRS transmission takes place on one uplink, the UE calculates Type 3 PH, generates a PHR including the Type 3 PH, and transmits the PHR to the base station at operation 3g-20. Any PH for the uplink on which no SRS transmission takes place is not considered.

If an SRS transmission does not take place on one uplink, this means that SRS transmission does not take place on any of the two uplinks. In this case, the UE reports, at operation 3g-25, Type 3 PH value for a predetermined uplink (NR UL or SUL) or an uplink configured via RRC at. Because no actual SRS transmission takes place on the selected uplink, the UE calculates the Type 3 PH using a virtual format.

FIG. 3H is a diagram illustrating a PHR format for a case where only a PCell exists according to an embodiment of the disclosure.

Referring to FIG. 3H, the PHR format proposed in the disclosure has to include one Type 1 PH 3h-05 for the PCell. The Type 1 PH for the PCell is followed by the corresponding maximum uplink transmit power value $P_{CMAX,c}$ 3h-10. If an SUL frequency is added to the PCell, an additional PH 3h-15 is included in the PHR. In this case, if a PUSCH is configured on the SUL frequency, a Type 1 PH is included; if only an SRS is configured on the SUL frequency, a Type 3 PH is included. The additional PH is followed by the corresponding maximum uplink transmit power value $P_{CMAX,c}$ 3h-20.

FIG. 3I is a diagram illustrating a PHR format for use in configuring multiple SCells according to an embodiment of the disclosure.

Referring to FIG. 3I, in the case of using carrier aggregation, a bitmap composed of bits for indicating activated serving cells is arranged in the first byte of the new PHR format as denoted by reference number 3i-05. As described above, the new PHR format includes a Type 2 PH 3i-10 for the PCell. The type 2 PH 3i-10 for the PCell is followed by corresponding uplink maximum transmit power value $P_{CMAX,c}$ 3i-15. If an SUL frequency is configured in the PCell, an additional PH 3i-15 is added. If the SUL frequency is configured with PUSCH, Type 1 PH is included; if the SUL frequency is configured with only SRS, Type 3 PH is included. The additional PH 3i-20 is followed by the corresponding maximum uplink transmit power value $P_{CMAX,c}$ 3i-25. If an SCell configured with at least one uplink is activated, at least one PH is included as denoted by reference number 3i-30. If the uplink is configured with only SRS, Type 3 PH is included. If not, Type 1 PH is included. The PH for the activated SCell is followed by the corresponding maximum uplink transmit power value $P_{CMAX,c}$ 3i-35. The SCell may be configured with multiple uplinks. In this case, an additional PH corresponding to the additional uplink is included as denoted by reference number 3i-40. In the case where the SCell has an additional uplink frequency, if the additional uplink frequency is configured with PUSCH, Type 1 PH is included; if the additional uplink frequency is configured with only SRS, Type 3 PH is included. The PH for the additional uplink frequency is followed by the corresponding maximum uplink transmit power value $P_{CMAX,c}$ 3i-45.

Figure 3J:
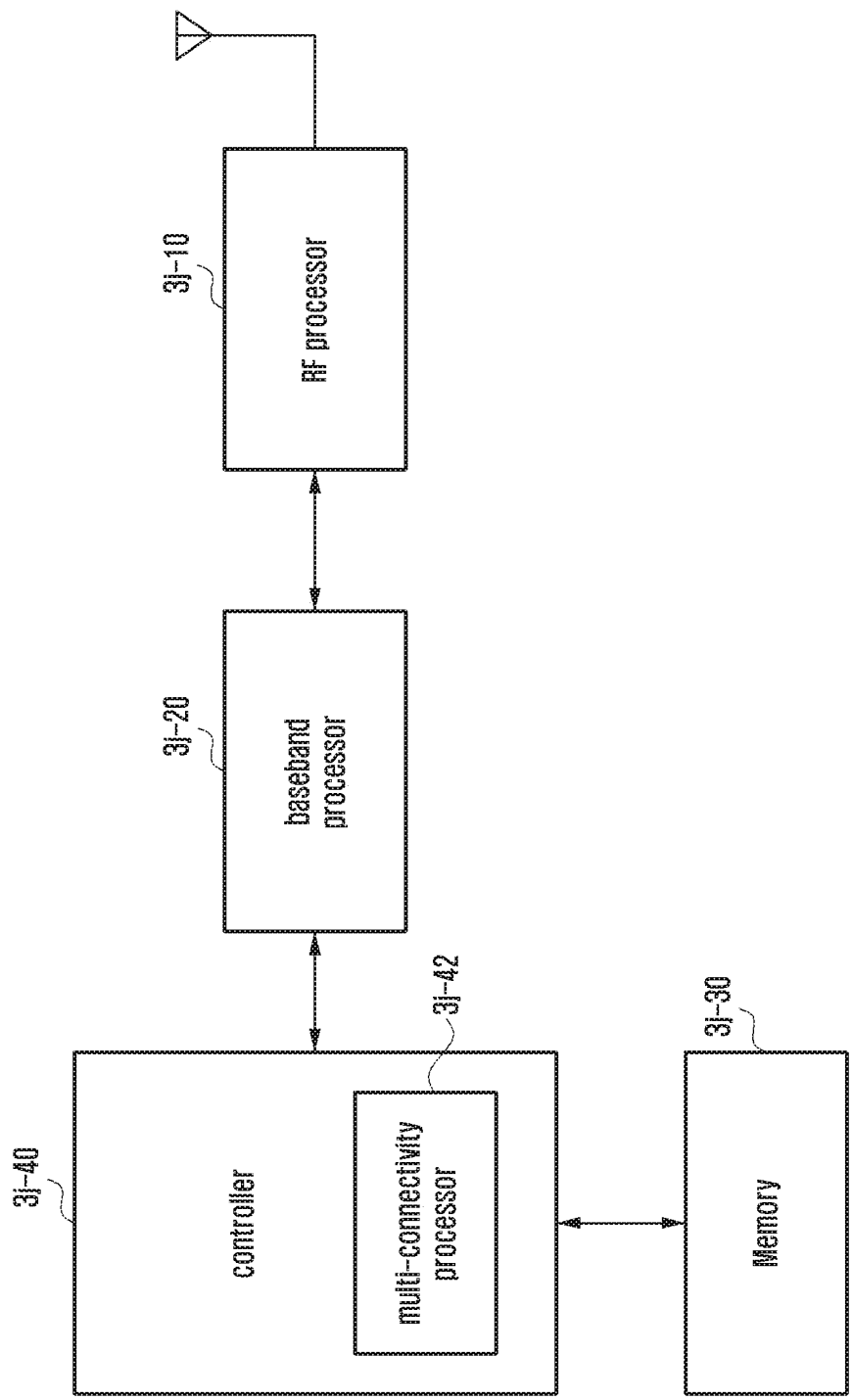
FIG. 3J is a block diagram illustrating a configuration of a UE according to an embodiment of the disclosure.

FIG. 3J is a block diagram illustrating a configuration of a UE according to an embodiment of the disclosure.

Referring to FIG. 3J, the UE includes a radio frequency (RF) processor 3j-10, a baseband processor 3j-20, a memory 3j-30, a controller 3j-40 and a multi-connectivity processor 3j-42.

The RF processor 3j-10 has a function for transmitting/receiving a signal over a radio channel such as band conversion and amplification of the signal. That is, the RF processor 3j-10 up-converts a baseband signal from the baseband processor 3j-20 to an RF band signal and transmits the RF signal via an antenna and down-converts the RF signal received via the antenna to a baseband signal. For example, the RF processor 3j-10 may include a transmission filter, a reception filter, an amplifier, a mixer, an oscillator, a digital-to-analog converter (DAC), and an analog-to-digital converter (ADC). Although one antenna is depicted in the drawing, the UE may be provided with a plurality of antennas. The RF processor 3j-10 may also include a plurality of RF chains. The RF processor 3j-10 may perform beamforming. For beamforming, the RF processor 3j-10 may adjust the phase and size of a signal to be transmitted/received by means of the antennas or antenna elements. The RF processor 3j-10 may be configured to support a MIMO scheme with which the UE can receive multiple layers simultaneously.

The baseband processor 3j-20 has a baseband signal-bit string conversion function according to a physical layer standard of the system. For example, in a data transmission mode, the baseband processor 3j-20 performs encoding and modulation on the transmission bit string to generate complex symbols. In a data reception mode, the baseband processor 3j-20 performs demodulation and decoding on the baseband signal from the RF processor 3j-10 to recover the transmitted bit string. In the case of using an OFDM scheme for data transmission, the baseband processor 3*j*-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 3*j*-20 splits the baseband signal from the RF processor 3*j*-10 into OFDM symbols, performs fast Fourier transform (FFT) on the OFDM symbols to recover the signals mapped to the subcarriers, and performs demodulation and decoding on the signals to recover the transmitted bit string.

The baseband processor 3*j*-20 and the RF processor 3*j*-10 process the transmission and reception signals as described above. Accordingly, the baseband processor 3*j*-20 and the RF processor 3*j*-10 may be referred to as a transmitter, a receiver, a transceiver, or a communication unit. At least one of the baseband processor 3*j*-20 and the RF processor 3*j*-10 may include a plurality of communication modules for supporting different radio access technologies. At least one of the baseband processor 3*j*-20 and the RF processor 3*j*-10 may also include multiple communication modules for processing the signals in different frequency bands. For example, the different radio access technologies may include a wireless local area network (WLAN) (e.g., Institute of electrical and electronics engineers (IEEE) 802.11) and a cellular network (e.g., LTE). The different frequency bands may include a super high frequency (SHF) band (e.g., 2.5 GHz and 5 GHz bands) and an mmWave band (e.g., 60 GHz).

The memory 3*j*-30 stores data such as basic programs for operation of the UE, application programs, and setting information. The memory 3*j*-30 may also store the information on a second access node for radio communication with a second radio access technology. The memory 3*j*-30 provides the stored information in response to a request from the controller 3*j*-40.

The controller 3*j*-40 controls overall operations of the UE. For example, the controller 3*j*-40 controls the baseband processor 3*j*-20 and the RF processor 3*j*-10 for transmitting and receiving signals. The controller 3*j*-40 writes and reads data to and from the memory 3*j*-30. For this purpose, the controller 3*j*-40 may include at least one processor. For example, the controller 3*j*-40 may include a communication processor (CP) for controlling communications and an application processor (AP) for controlling higher layer programs such as applications.

Figure 3K:
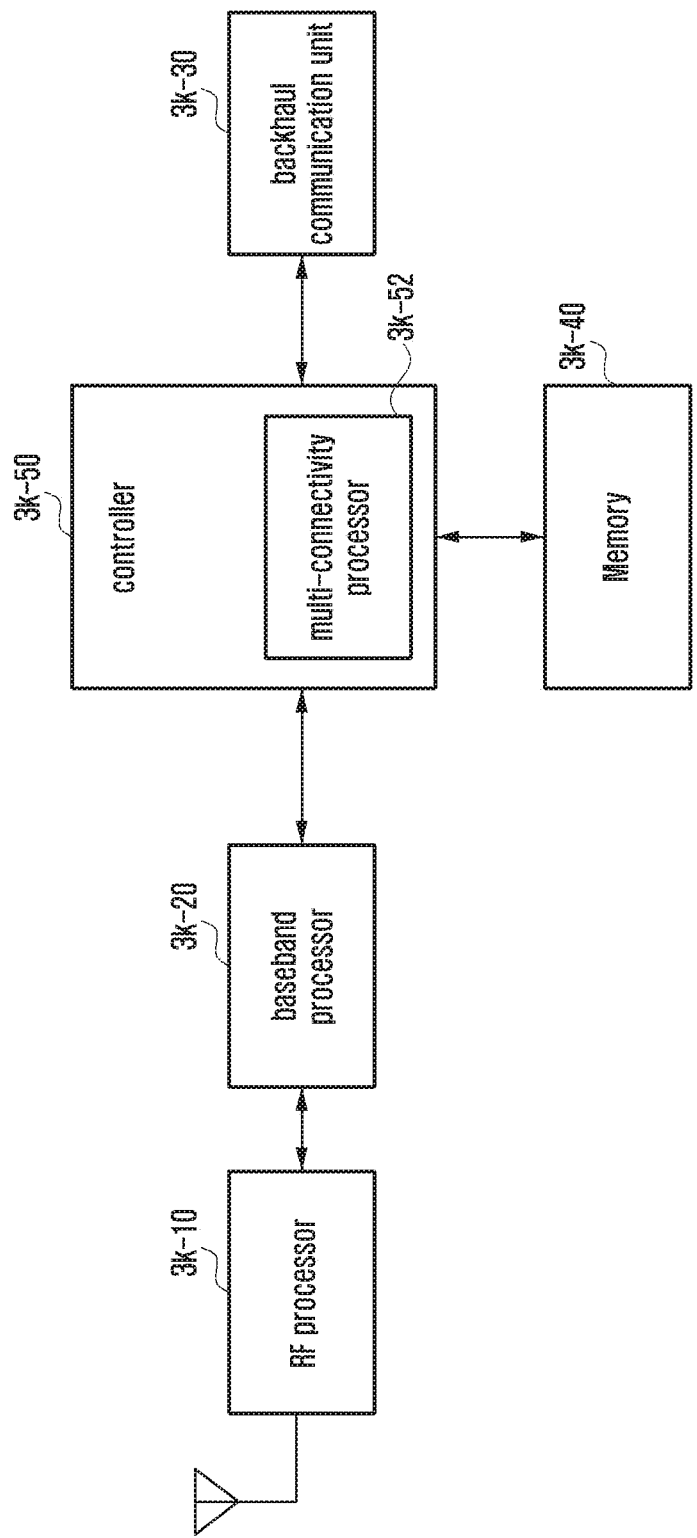
FIG. 3K is a block diagram illustrating a configuration of a gNB according to an embodiment of the disclosure.

FIG. 3K is a block diagram illustrating a configuration of a base station according to an embodiment of the disclosure.

Referring to FIG. 3K, the base station includes an RF processor 3*k*-10, a baseband processor 3*k*-20, a backhaul communication unit 3*k*-30, a memory 3*k*-40, a controller 3*k*-50 and a multi-connectivity processor 3*k*-52.

The RF processor 3*k*-10 has a function for transmitting/receiving a signal over a radio channel such as band conversion and amplification of the signal. That is, the RF processor 3*k*-10 up-converts a baseband signal from the baseband processor 3*k*-20 to an RF band signal and transmits the RF signal via an antenna and down-converts the RF signal received via the antenna to a baseband signal. For example, the RF processor 3*k*-10 may include a transmission filter, a reception filter, an amplifier, a mixer, an oscillator, a DAC, and an ADC. Although one antenna is depicted in the drawing, the base station may be provided with a plurality of antennas. The RF processor 3*k*-10 may also include a plurality of RF chains. The RF processor 3*k*-10 may perform beamforming. For beamforming, the RF processor 3*k*-10 may adjust the phase and size of a signal to be transmitted/received by means of the antennas or antenna elements. The RF processor 3*k*-10 may be configured to transmit one or more layers for a downlink MIMO operation.

The baseband processor 3*k*-20 has a baseband signal-bit string conversion function according to a physical layer standard of the system. For example, in a data transmission mode, the baseband processor 3*k*-20 performs encoding and modulation on the transmission bit string to generate complex symbols. In a data reception mode, the baseband processor 3*k*-20 performs demodulation and decoding on the baseband signal from the RF processor 3*k*-10 to recover the transmitted bit string. In the case of using an OFDM scheme for data transmission, the baseband processor 3*k*-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 3*k*-20 splits the baseband signal from the RF processor 3*k*-10 into OFDM symbols, performs fast Fourier transform (FFT) on the OFDM symbols to recover the signals mapped to the subcarriers, and performs demodulation and decoding on the signals to recover the transmitted bit string. The baseband processor 3*k*-20 and the RF processor 3*k*-10 process the transmission and reception signals as described above. Accordingly, the baseband processor 3*k*-20 and the RF processor 3*k*-10 may be referred to as a transmitter, a receiver, a transceiver, or a communication unit.

The backhaul communication unit 3*k*-30 provides an interface for communication with other nodes in the network. That is, the backhaul communication unit 3*k*-30 converts a bit string to be transmitted from the base station to another node, e.g., another base station and core network, to a physical signal and converts a physical signal received from another node to a bit string.

The memory 3*k*-40 stores data such as basic programs for operation of the base station, application programs, and setting information. The memory 3*k*-40 may also store the information on the bearers established for UEs and measurement results reported by the connected UEs. The memory 3*k*-40 may also store the information for use by a UE in determining whether to enable or disable multi-connectivity. The memory 3*k*-40 may provide the stored data in reference to a request from the controller 3*k*-50.

The controller 3*k*-50 controls overall operations of the base station. For example, the controller 3*k*-50 controls the baseband processor 3*k*-20, the RF processor 3*k*-10, and the backhaul communication unit 3*k*-30 for transmitting and receiving signals. The controller 3*k*-50 writes and reads data to and from the memory 3*k*-40. For this purpose, the controller 3*k*-50 may include at least one processor.

Fourth Embodiment

The operation principle of the disclosure is described in detail with reference to the accompanying drawings. Detailed descriptions of well-known functions and structures incorporated herein may be omitted to avoid obscuring the subject matter of the disclosure. Furthermore, terms used herein are defined by taking functions of the disclosure into account and can be changed according to the practice or intention of users or operators. Therefore, definitions of the terms should be made according to overall disclosures set forth herein. In the following description, the terms indicating various access nodes, network entities, messages, interfaces between network entities, and information items are used for convenience of explanation of the disclosure. Accordingly, the terms used in the following description are not limited to specific meanings, and they may be replaced by other terms that are equivalent in technical meanings.

In the following descriptions, the terms and definitions given in the 3GPP LTE standards or terms and definitions modified based thereon are used for convenience of explanation. However, the disclosure is not limited by use of these terms and definitions and other arbitrary terms and can be applied to other standards-based systems in the same manner.

Figure 4A:
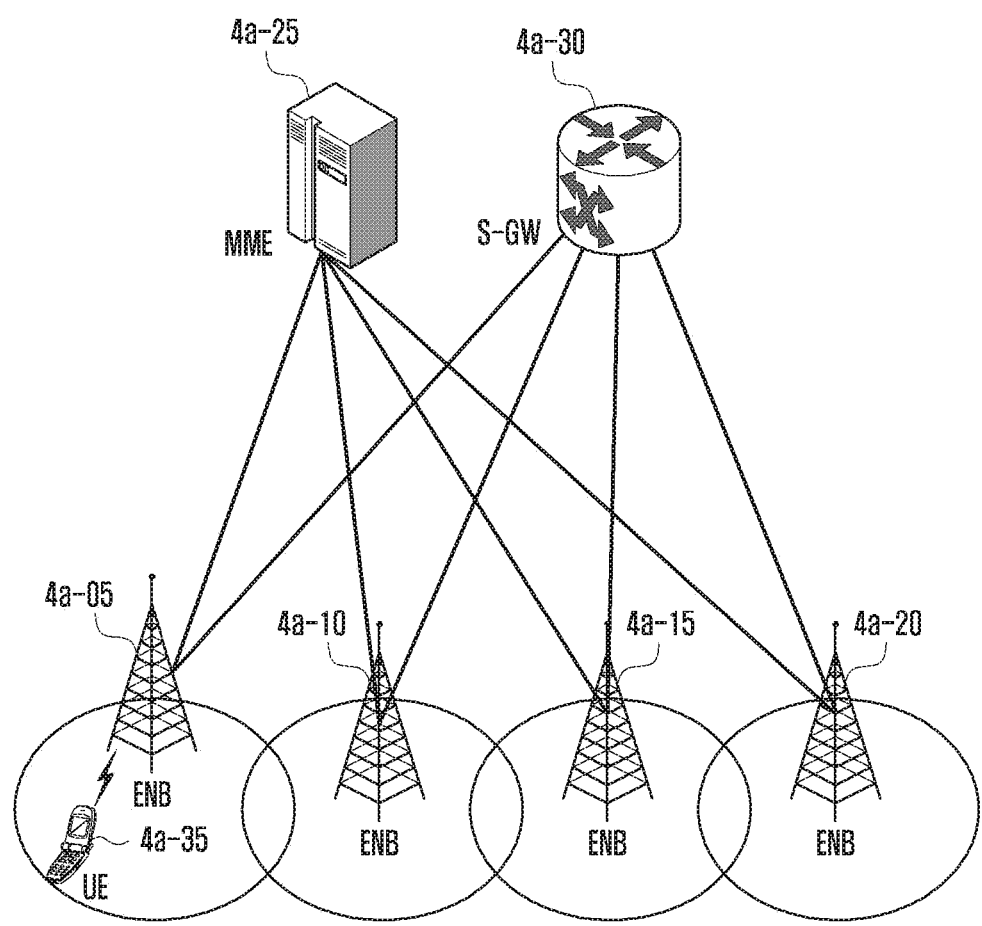
FIG. 4A is a diagram illustrating an LTE system architecture provided for reference to explain according to an embodiment of the disclosure.

FIG. 4A is a diagram illustrating LTE system architecture provided for reference to explain according to an embodiment of the disclosure.

Referring to FIG. 4A, a RAN of the LTE system includes evolved Node Bs (eNBs) 4a-05, 4a-10, 4a-15, and 4a-20; a Mobility Management Entity (MME) 4a-25; and a Serving Gateway (S-GW) 4a-30. The User Equipment (UE) 4a-35 connects to an external network via the eNBs 4a-05, 4a-10, 4a-15, and 4a-20 and the S-GW 4a-30.

In FIG. 4A, the eNBs 4a-05, 4a-10, 4a-15, and 4a-20 correspond to legacy Node Bs. An eNB is connected with the UE 4a-35 over a radio channel and takes charge of more complex functions than those of the legacy node B. In the LTE system where all user traffic including real time services such as Voice over IP (VoIP) is served through shared channels, there is a need of an entity for collecting UE-specific status information (such as buffer status, power headroom status, and channel status) and scheduling the UEs based on the collected information, and the eNBs 4a-05, 4a-10, 4a-15, and 4a-20 take charge of such functions. Typically, one eNB hosts multiple cells. For example, the LTE system adopts Orthogonal Frequency Division Multiplexing (OFDM) as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 4a-30 handles data bearer functions to establish and release data bearers under the control of the MME 4a-25. The MME 4a-25 handles various control functions for the UE as well as the mobile management function and has connections with the eNBs.

Figure 4B:
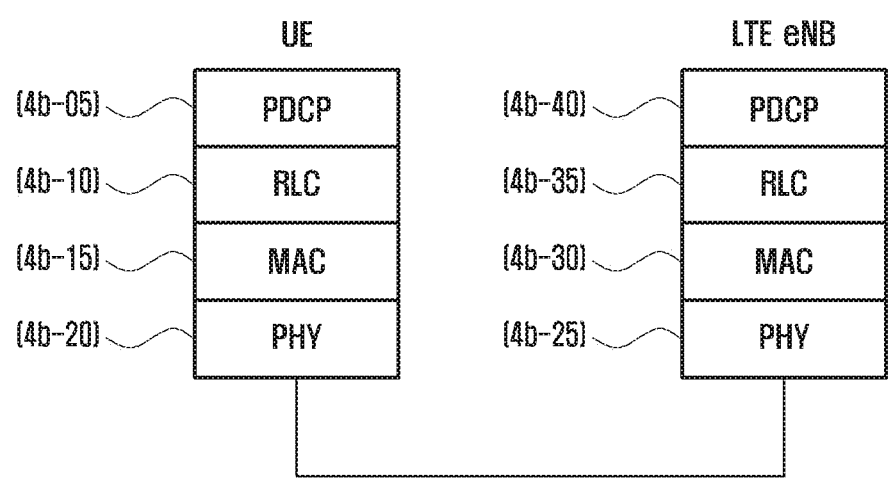
FIG. 4B is a diagram illustrating a protocol stack of an interface between a UE and an eNB in a LTE system for reference to explain according to an embodiment of the disclosure.

FIG. 4B is a diagram illustrating a protocol stack of an interface between a UE and an eNB in the LTE system for reference to explain according to an embodiment of the disclosure.

Referring to FIG. 4B, the protocol stack of the interface between the UE and the eNB in the LTE system includes a plurality of protocol layers stacked from the bottom to the top: physical layer denoted by reference numbers 4b-20 and 4b-25, medium access control (MAC) layer denoted by reference numbers 4b-15 and 4b-30, radio link control (RLC) layer denoted by reference numbers 4b-10 and 4b-35, and packet data convergence control (PDCP) layer denoted by reference numbers 4b-05 and 4b-40. The PDCP layer denoted by reference numbers 4b-05 and 4b-40 takes charge of compressing/decompressing an IP header. The main functions of the PDCP layer can be summarized as follows:
  Header compression and decompression: robust header compression (ROHC) only
  Transfer of user data
  In-sequence delivery of upper layer packet data unit (PDU) at PDCP re-establishment procedure for RLC acknowledged mode (RLC AM)
  Reordering for split bearers in dual connectivity (DC) (only support for RLC AM): PDCP PDU routing for transmission and PDCP PDU reordering for reception
  Duplicate detection of lower layer service data unit (SDU) at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink The RLC layer designated by reference numbers 4b-10 and 4b-35 takes charge of reformatting PDCP PDUs in order to fit them into the size for ARQ operation. The main functions of the RLC layer can be summarized as follows:
  Transfer of upper layer PDUs
  Error correction through ARQ (only for AM data transfer)
  Concatenation, segmentation, and reassembly of RLC SDUs (only for UM and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)
  RLC SDU discard (only for UM and AM data transfer)
  RLC re-establishment)

The MAC layer denoted by reference numbers 4b-15 and 4b-30 allows for connection of multiple RLC entities established for one UE and takes charge of multiplexing RLC PDUs from the RLC layer into a MAC PDU and demultiplexing a MAC PDU into RLC PDUs. The main functions of the MAC layer can be summarized as follows:
  Mapping between logical channels and transport channels
  Multiplexing/demultiplexing of MAC SDUs belonging to one or different logical channels into/from transport blocks (TB) delivered to/from the physical layer on transport channels
  Scheduling information reporting
  Error correction through hybrid automatic repeat request (HARQ)
  Priority handling between logical channels of one UE
  Priority handling between UEs by means of dynamic scheduling
  Multimedia broadcast multicast service (MBMS) service identification
  Transport format selection
  Padding The PHY layer denoted by reference numbers 4b-20 and 4b-25 takes charge of channel-coding and modulation on higher layer data to generate and transmit OFDM symbols over a radio channel, and demodulating and channel-decoding on OFDM symbols received over the radio channel to deliver the decoded data to the higher layers.

Figure 4C:
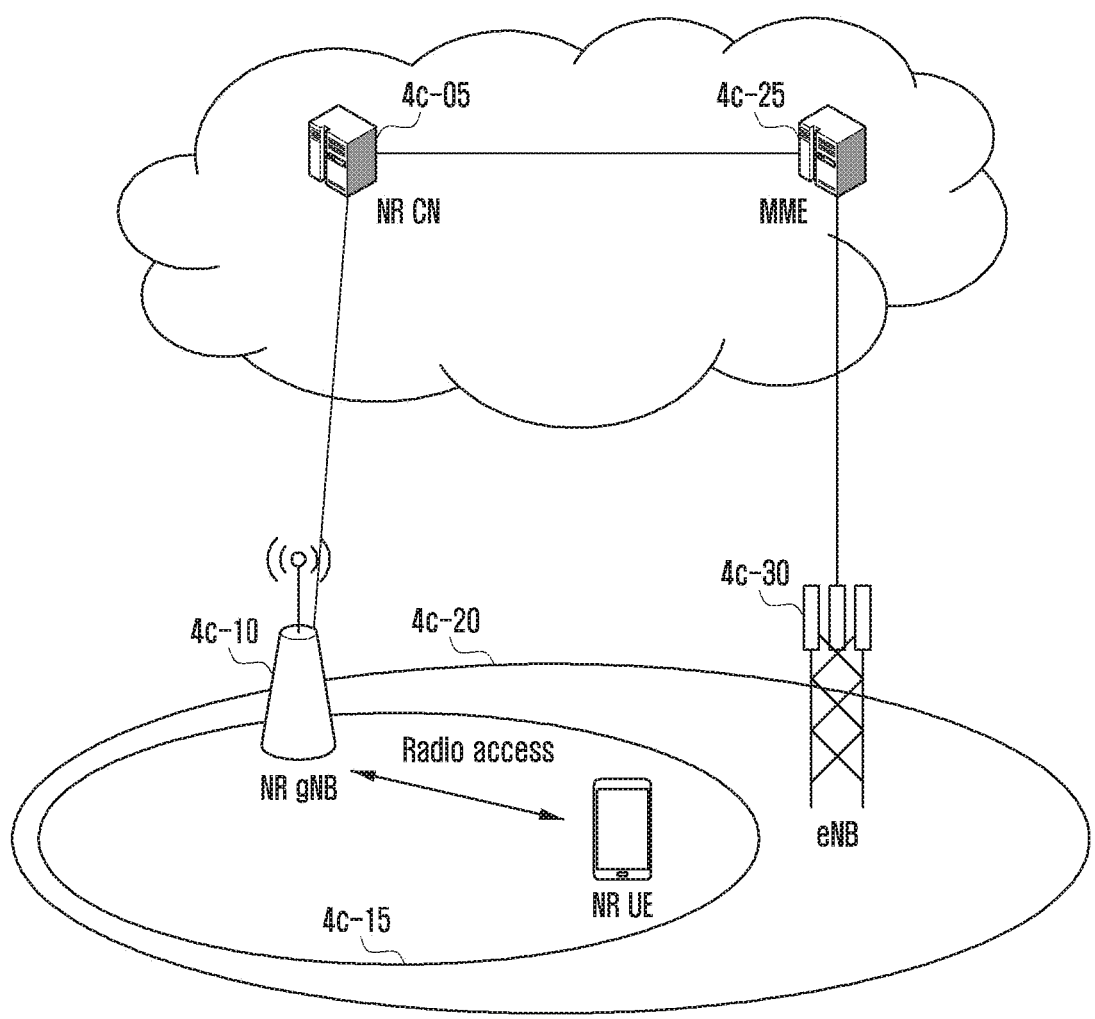
FIG. 4C is a diagram illustrating a structure of a next generation mobile communication system to according to an embodiment of the disclosure.

FIG. 4C is a diagram illustrating a structure of a next generation mobile communication system to according to an embodiment of the disclosure.

Referring to FIG. 4C, the next generation mobile communication system includes a RAN with a next generation base station (New Radio Node B (NR NB or NR gNB)) 4c-10 and a new radio core network (NR CN) 4c-05. A new radio user equipment (NR UE) 4c-15 connects to an external network via the NR gNB 4c-10 and the NR CN 4c-05.

In FIG. 4C, the NR gNB 4c-10 corresponds to an evolved Node B (eNB) of the legacy LTE. The NR gNB 4c-10 to which the NR UE 4c-15 connects through a radio channel 4c-20 is capable of providing superior services in comparison with the legacy eNB. In the next generation mobile communication system where all user traffic is served through shared channels, it is necessary to schedule the NR UEs based on scheduling information such as buffer status, power headroom status, and channel status collected by the NR UEs, and the NR gNB 4c-10 takes charge of this function. Typically, one NR gNB hosts multiple cells. In order to achieve a data rate higher than the peak data rate of legacy LTE systems, the next generation mobile communication system may adopt a beamforming technique along with orthogonal frequency division multiple access (OFDMA) as a radio access technology. The next generation mobile communication system may also adopt an adaptive modulation and coding (AMC) to determine the modulation scheme and channel coding rate in adaptation to the channel condition of the NR UE. The NR CN 4c-05 takes charge of mobility support, bearer setup, and QoS configuration. The NR CN 4c-05 may take charge of an NR UE mobility management function, and a plurality of NR gNBs may connect to the NR CN 4c-05. The next generation mobile communication system may also interoperate with a legacy LTE system and, in this case, the NR CN 4c-05 connects to an MME 4c-25 through a network interface. The MME 4c-25 communicates with the eNB 4c-30 as a legacy base station.

Figure 4D:
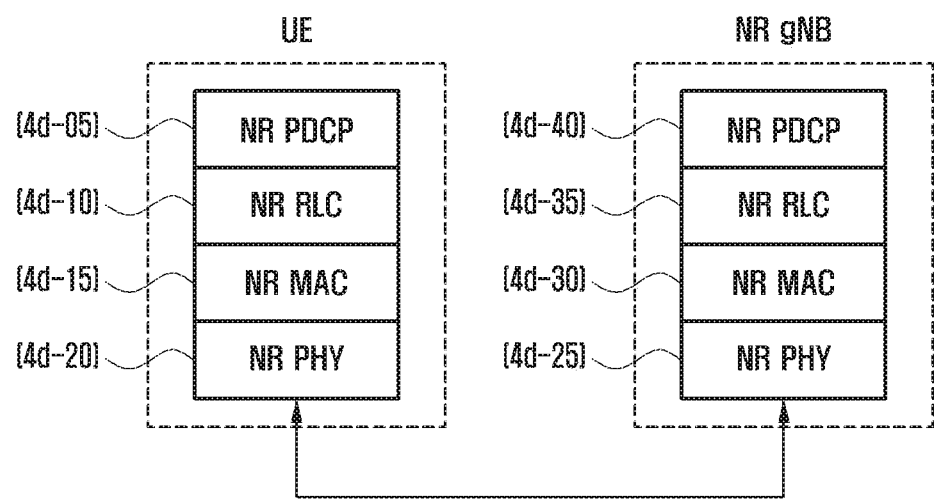
FIG. 4D is a diagram illustrating a protocol stack of an interface between an NR UE and an NR gNB in a next generation mobile communication system to according to an embodiment of the disclosure.

FIG. 4D is a diagram illustrating a protocol stack of an interface between an NR UE and an NR gNB in a next generation mobile communication system to according to an embodiment of the disclosure.

Referring to FIG. 4D, the protocol stack of the interface between an NR UE and an NR gNB in a next generation mobile communication system includes a plurality of protocol layers stacked from the bottom to the top: NR PHY layer denoted by reference numbers 4d-20 and 4d-25, NR MAC layer denoted by reference numbers 4d-15 and 4d-30, NR RLC layer denoted by reference numbers 4d-10 and 4d-35, and NR PDCP layer denoted by reference numbers 4d-05 and 4d-40. The main functions of the NR PDCP layer denoted by reference numbers 4d-05 and 4d-40 may include some of the following functions:

Header compression and decompression: ROHC only
    Transfer of user data
    In-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink The PDCP PDU reordering function of an NR PDCP entity is to reorder the PDCP PDUs delivered from a lower layer based on the PDCP sequence number (PDCP SN) and may include delivering the reordered data to an upper layer, recording the missing PDCP PDUs among the reordered PDCP PDUs, transmitting a status report indicating the missing PDCP PDUs to the sender, and requesting for retransmission of the missing PDCP PDUs.

The main functions of the NR RLC layer denoted by reference numbers 4d-10 and 4d-35 may include some of the following functions.

Transfer of upper layer PDUs
    In-sequence delivery of upper layer PDUs
    Out-of-sequence delivery of upper layer PDUs
    Error Correction through ARQ
    Concatenation, segmentation, and reassembly of RLC SDUs
    Re-segmentation of RLC data PDUs
    Reordering of RLC data PDUs
    Duplicate detection
    Protocol error detection
    RLC SDU discard
    RLC re-establishment The in-sequence delivery function of an NR RLC entity is to deliver the RLC SDUs received from the lower layer to the upper layer and may include reassembling, when multiple segmented RLC SDUs constituting an original RLC SDU are received, the RLC SDUs and delivering the reassembled RLC SDU to the upper layer; reordering the received RLC PDUs based on the RLC sequence number (SN) or PDCP SN; recording the missing RLC PDUs among the reordered RLC PDUs; transmitting a status report indicating the missing RLC PDUs to the sender; requesting for retransmission of the missing RLC PDUs; and delivering, when there is a missing RLC PDU, the RLC PDUs before the missing RLC PDU in sequence, delivering, if a predetermined timer expires even when there is any missing RLC SDU, all RLC SDUs received before the start of the timer to the upper layer in sequence, or delivering, if a predetermined timer expires even when there is any missing RLC SDU, all RLC SDUs received until then to the upper layer in sequence. It may also be possible to process the RLC PDUs in the receiving sequence (in the order of arrival regardless of sequence number) and deliver the RLC PDUs to the PDCP entity out of order (out-of-sequence delivery) and, if an RLC PDU is transmitted in the form of segments, to store the received segments, or wait until all segments constituting the RLC PDU are received and reassemble the segments into the original RLC PDU, which is delivered to the PDCP entity. The NR RLC layer may have no concatenation function and, in this case, the concatenation function may be performed in the NR MAC layer or replaced by the multiplexing function of the NR MAC layer.

The out-of-sequence delivery function of an NR RLC entity is to deliver the RLC SDUs received from the lower layer to the upper layer out of order and may include reassembling, when multiple segmented RLC SDUs constituting an original RLC SDU are received, the segmented RLC SDUs, delivering the reassembled RLC SDUs to the upper layer, arranging the received RLC PDUs based on the RLC SN or PDCP SN, and recording the SN of the missing RLC PDUs.

In the NR MAC layer denoted by reference number 4d-15 and 4d-30, an NR MAC entity may be connected to multiple NR RLC entities, and the main functions of the NR MAC entity may include some of the following functions:

Mapping between logical channels and transport channels
    Multiplexing/demultiplexing of MAC SDUs
    Scheduling information reporting
    Error correction through HARQ
    Priority handling between logical channels of one UE
    Priority handling between UEs by means of dynamic scheduling
    MBMS service identification
    Transport format selection
    Padding The NR PHY layer denoted by reference numbers 4d-20 and 4d-25 takes charge of channel-coding and modulation on upper layer data to generate and transmit OFDM symbols over a radio channel and demodulating and channel-decoding on OFDM symbols received over the radio channel to deliver the decoded data to the upper layers.

Figure 4E:
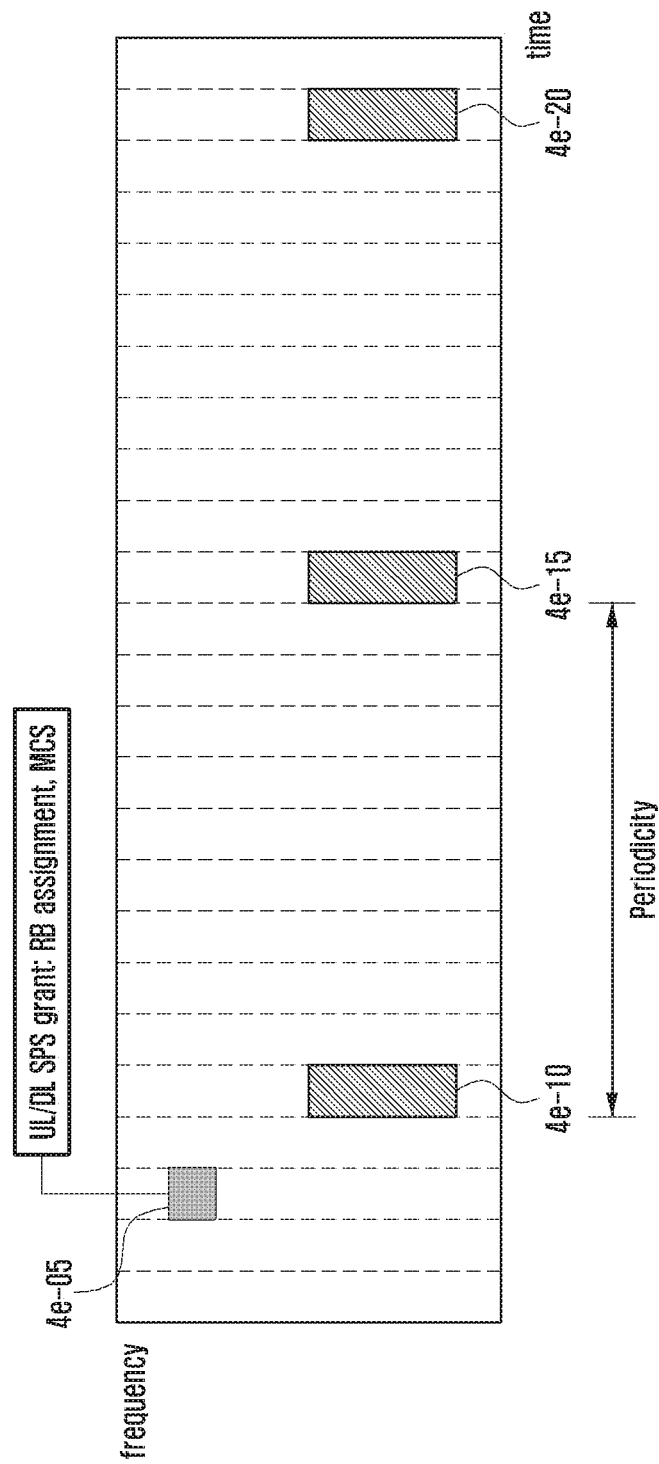
FIG. 4E is a diagram for explaining semi-persistent scheduling in an LTE system according to an embodiment of the disclosure.

FIG. 4E is a diagram for explaining semi-persistent scheduling in an LTE system according to an embodiment of the disclosure.

Referring to FIG. 4E, the LTE system employs semi-persistent scheduling (SPS) for scheduling services generating small data frequently, which is capable of reducing control information amount that is proportional to the number of users and securing system capacity for user data transmission. In particular, the SPS is used for VoIP in the LTE system. Basically, an eNB transmits common configuration information for SPS to a UE via an RRC control message and instructs to activate/deactivate the configured SPS via DCI carried by PDCCH. That is, the SPS is performed in such a way that the eNB transmits UL/DL resource allocation control information 4e-05 to the UE at one time in order for the eNB and the UE to operate to handle the data generating at a predetermined interval based on the control information as denoted by reference numbers 4e-10, 4e-15, and 4e-20. In LTE, the SPS is characterized in that the transmission resources are allocated at a predetermined interval for transmitting a MAC PDU. The resources allocated based on the control information are valid until SPS activation or SPS deactivation/release occurs. In the case of uplink SPS, it may be possible to implicitly configure such that the SPS is deactivated if there is no data transmission on the SPS transmission resources over a predetermined number of times (N times). That is, if there is no data to transmit on the resources allocated at the configured SPS interval, the UE may transmit a zero-padded signal or a padding BSR and PHR.

In the LTE system, the UL/DL SPS is performed as follows.

1. The eNB configures SPS parameters to the UE via RRC control information. This RRC control message includes an SPS C-RNTI, an SPS interval (semiPersistSchedIntervalDL and semiPersistSchedIntervalUL), and a maximum number of HARQ processes for SPS (numberOfConfSPS-Processes, numberOfConfUlSPS-Processes).

2. If the SPS is configure for UL/DL, the eNB transmits to the UE a downlink control information (DCI) format containing DL resource allocation control information 4e-05 with the SPS C-RNTI of the PDCCH. The DCI may include an allocation type (FDD/TDD), an MCS level, a new data indicator (NDI), a redundancy version (RV), an HARQ process number, and resource block assignment information. For reference, DCI format 0 is used for activation/deactivation of a UL SPS, and DCI formats 1/1A/2/4a/4b/4 care used for activation/deactivation of a DL SPS.

TABLE 5

DCI configuration for SPS deactivation

| | DCI Format 0 | DCI Format 1/1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | set to all '1' | N/A |
| HARQ process number | N/A | FDD: set to '000' TDD: set to '0000' |
| Modulation and coding scheme | N/A | set to '1111' |
| Redundancy version | N/A | set to '00' |
| Resource block assignment | N/A | set to all '1' |

Figure 4F:
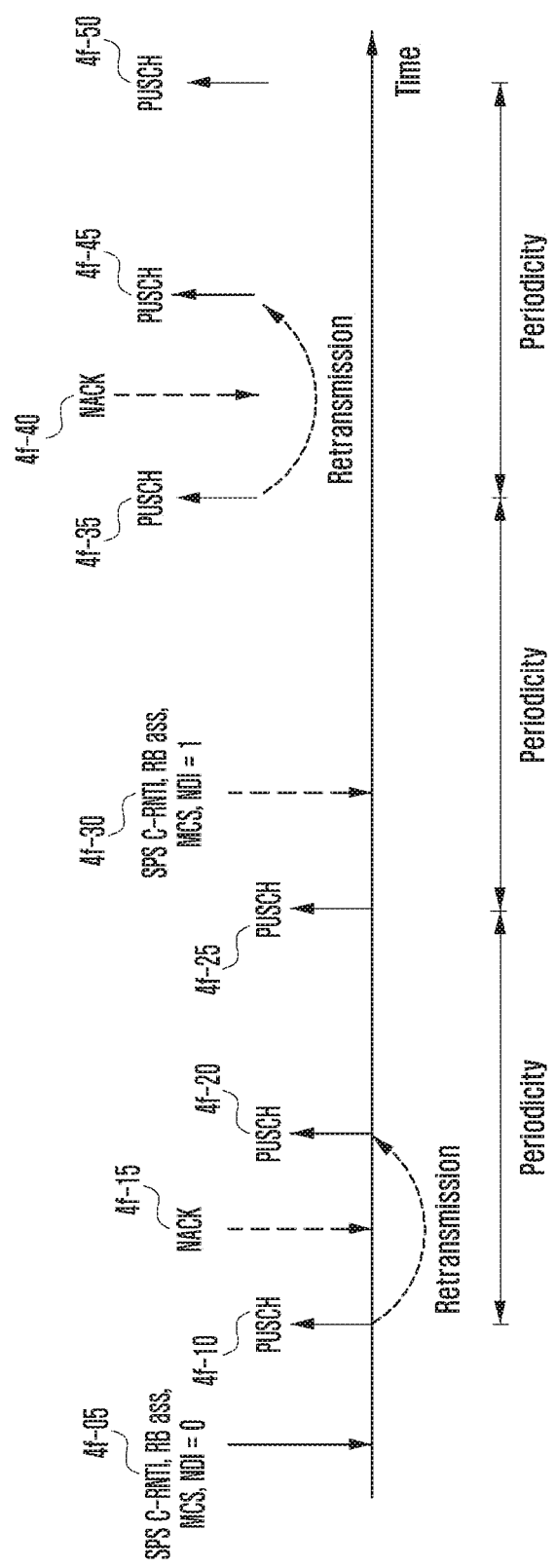
FIG. 4F is a diagram for explaining a data transmission and retransmission operation in an LTE system according to an embodiment of the disclosure.

FIG. 4F is a diagram for explaining a data transmission and retransmission operation in an LTE system according to an embodiment of the disclosure.

Referring to FIG. 4F, the LTE system supports hybrid automatic repeat request (HARQ) with soft combining to guarantee improvement of data reception performance. The HARQ is performed in the form of multiple parallel stop-and-wait processes for DL-SCH and UL-SCH in such a way that, upon receipt of a transport block, a receiver performs decoding on the transport block and makes a retransmission determination (ACK/NACK) based on whether the decoding is successfully performed. The receiver has to know the HARQ process associated with the corresponding ACK signal. In LTE, the HARQ uses an asynchronous protocol in downlink and a synchronous protocol in uplink. Here, the term "asynchronous" intends to mean that a retransmission may take place at a certain timing after an initial transmission, and the HARQ retransmission timing should be explicitly signaled by the eNB. In the synchronous HARQ, however, the retransmission timing is fixed after the initial transmission such that the eNB does not need to signal the HARQ retransmission timing at all. Furthermore, the uplink HARQ may be categorized into two categories: adaptive HARQ (retransmission RB is designated via PDCCH/DCI) and non-adaptive HARQ (retransmission is indicated by 1-bit ACK/NACK carried on PHICH).

TABLE 4

DCI configuration for SPS activation

| | DCI Format 0 | DCI Format 1/1A | DCI Format 2/4a/4b/4c |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

The LTE UL HARQ operation being referenced to explain the disclosure differs between dynamic resource allocation-based data transmission and uplink SPS transmission.

1. Dynamic resource allocation-based retransmission: Indication with C-RNTI
   NDI bit is toggled: New transmission
   NDI bit is not toggled (same): Adaptive retransmission (possible to indicate change of transmission resources)
2. Uplink SRS retransmission: Indication with SPS C-RNTI
   NDI bit is 0: new transmission+SPS allocation
   NDI bit is 1: adaptive retransmission (possible to indicate change of transmission resources)

FIG. 4F depicts an uplink SPS retransmission scheme by way of example according to an embodiment of the disclosure.

Referring to FIG. 4F, at operation 4f-05 the UE receives DCI scrambled with SPS C-RNTI, which includes resource block (RB) allocation information, MCI, and NDI. Here, the NDI is set to 0 to indicate a new SPS transmission. The UE transmits data on predetermined SPS transmission resources at operation 4f-10; if the eNB fails to receive the data successfully on the corresponding SPS transmission resources, the eNB may transmit a NACK to the UE at operation 4f-15. The corresponding NACK may be conveyed by a PHICH. The UE retransmits the data corresponding to the initial transmission at operation 4f-20. The UE transmits a next data packet at operation 4f-25 according to the predetermined SPS transmission interval; if it is necessary to change the RB for the corresponding SPS transmission, the eNB transmits the DCI with the NDI bit set to 1 at operation 4f-30. Upon receipt of the DCI signal, the UE performs the uplink SPS operation using the RB indicated by the corresponding DCI. That is, the UE transmits a data packet using the new RB at operation 4f-35, receives a NACK from the eNB at operation 4f-40, performs retransmission based on the NACK at operation 4f-45, and afterward continues uplink SPS transmission at operation 4f-50.

If it is necessary to release the corresponding SPS or configure new uplink SPS in the course of the uplink SPS transmission operation, the eNB may make such an instruction by changing the content of the DCI (e.g., NDI bit).

The disclosure encompasses overall uplink SPS operations for use in the next generation mobile communication system. In the disclosure, the term "SPS" is used with the same meaning as the term "grant-free uplink transmission". In the disclosure, descriptions are made of the uplink grant for resource allocation on the MAC layer, PUSCH transmission, and a problem of collision between dynamic grant-based PUSCH and configured grant-based PUSCH.

FIG. 4G is a diagram for explaining a collision-free data transmission method by prioritizing predetermined grants in a potential PUSCH collision situation being considered in according to an embodiment of the disclosure.

With regard to the legacy MAC operation, an uplink (UL) grant includes information on the resources for UL data transmission. In NR, the UL grant is categorized into two categories according to how the UL grant is signaled: dynamic grant and configured grant. Although two different UL grants are received at different time points, the actual PUSCH transmission timings indicated by the two different UL grants may be identical with each other. Typically, a scheduler of a base station (or gNB) manages resources to avoid such a PUSCH collision; if such a PUSCH collision problem occurs, it may be possible to guess a problem in implementation of the base station. In NR, however, it is difficult to guarantee complete protection against the above problem, which arises in situations as follows.

In NR, in the case of UL SPS transmission (or configured grant transmission) that is characterized by a very short transmission resource allocation interval, skipUplinkTx may be activated. That is, the UE can skip transmission on the configured resources if there is no actual data to transmit rather than the UE always transmitting data on all configured resources. This means that it is difficult for a gNB to ensure a slot in which the UE actually transmits data.

The gNB may not use the dynamic grant to avoid a collision with the configured grant. However, it may be necessary to use the dynamic grant for the above described reason in view of resource utilization efficiency (in the case of using the configured grant with a very short interval, it may be difficult to allocate resources with the dynamic grant and avoid PUSCH resources collision).

Thus, the dynamic grant may be used along with the configured grant, taking the risk of possibility of PUSCH collision.

Table 6 shows possible cases of PUSCH resource collision.

TABLE 6

| | Explicit grant based PUSCH tx | Configured grant based PUSCH tx |
| --- | --- | --- |
| Case 1 | new PUSCH by C-RNTI grant | new PUSCH by configured grant |
| Case 2 | PUSCH retransmission by C-RNTI grant | new PUSCH by configured grant |
| Case 3 | PUSCH retransmission by CS-RNTI grant | new PUSCH by configured grant |
| other cases | GNB can avoid other cases (e.g. collisions between two explicit grants or between two configured grants) | |

In summary, a new PUSCH transmission scheduled by the configured grant may collide with 1) a new PUSCH transmission scheduled by the dynamic grant being transmitted with a C-RNTI, 2) a PUSCH retransmission scheduled by the dynamic grant being transmitted with the C-RNTI, and 3) a PUSCH retransmission scheduled by a grant transmitted with a CS-RNTI; in such a case, it is necessary to prioritize the PUSCH (re)transmissions. Assuming that the gNB can avoid collisions between two PUSCH transmissions scheduled by two different dynamic grants and between two different configured grants, it is necessary to determine how to handle the three collision cases (i.e., Case 1, Case 2, and Case 3 in Table 6).

A description is made of the collision situations with reference to the drawing of FIG. 4G. The UE may receive a configured grant scheduling an uplink transmission at an interval of 2 ms and transmit data at the interval of 2 ms in subframe 1. Here, an offset value may be actually indicated by unit of slot or symbol, and the actual transmission may also be performed by unit of slot or symbol. Additionally the UE may also receive a configured grant scheduling an uplink transmission at an interval of 5 ms and transmit data at the interval of 5 ms in subframe 4. The UE may receive a dynamic grant with a C-RNTI for scheduling a new PUSCH transmission in subframe 8. In this case, the uplink transmissions scheduled by the two configured grants collide with each other in subframe 9 (Case 4). Actually, the gNB scheduler may regulate the uplink transmissions scheduled by the two configured grants to avoid collision therebetween. In subframe 11, the uplink transmission scheduled by the first configured grant and the new PUSCH transmission scheduled by the dynamic grant with the C-RNTI (C-RNTI grant) collide with each other (Case 1). A PUSCH retransmission is scheduled in subframe 12 by a C-RNTI grant, and the PUSCH transmissions scheduled by the configured grants and the PUSCH retransmission scheduled by the C-RNTI grant collide with each other in subframe 15. A PUSCH retransmission is scheduled in subframe 18 by a CS-RNTI grant, and the PUSCH transmission scheduled by the first configured grant and the PUSCH retransmission scheduled by the CS-RNTI collide with each other in subframe 21 (Case 3).

It is possible to understand the PUSCH collision cases through the above example, but it should be noted that no actual transmission takes place on part of resources for uplink transmission scheduled by the configured grants. The above-described problems may arise because the UE performs all transmissions (uplink/downlink) in an asynchronous transmission manner based on the received grant in NR. Here, the term "asynchronous transmission" is intended to mean that the gNB notifies the UE of the PUSCH transmission timing, whenever necessary, via an uplink grant.

The disclosure proposes a method for avoiding a potential PUSCH transmission collision by prioritizing PUSCH transmissions.

1. Solution method 1: Prioritize PUSCH transmission scheduled by an explicit/dynamic grant (PUSCH transmission scheduled by C-RNTI grant/CS-RNTI grant is prioritized over PUSCH transmission scheduled by configured grant, when the PUSCH transmissions collide with each other)

2. Solution method 2: Prioritize PUSCH transmission scheduled by configured grant (PUSCH transmission scheduled by configured grant is prioritized over PUSCH transmission scheduled by C-RNTI grant/CS-RNTI grant, when the PUSCH transmissions collide with each other)

3. Solution method 3: Prioritize new PUSCH transmission (PUSCH transmission scheduled by configured grant for Cases 2 and 3, and method 1 or method 2 are used for Case 1)

4. Solution method 4: Prioritize PUSCH transmission scheduled by configured grant for Cases 1 and 2, and prioritize PUSCH transmission scheduled by CS-RNTI grant over PUSCH transmission scheduled by configured grant for Case 3

5. Solution method 5: Notify the UE of prioritization method via explicit signaling (RRC signaling or MAC CE)

The proposed methods have pros and cons. One of the biggest advantages of Solution method 1 is reducing the complexity of the gNB. That is, considering the nature of the gNB in that it is preferable to decode a PUSCH transmission scheduled by an explicit grant, if the PUSCH transmission scheduled by the configured grant is prioritized according to Solution method 2, the gNB has to perform double decodings. That is, the gNB performs a decoding process on the PUSCH transmission corresponding to the explicit grant and another decoding process on the PUSCH transmission corresponding to the configured grant. Meanwhile, if Solution method 1 is used, it is possible for the MAC to process the PUSCH transmission scheduled by the C-RNTI grant and, if there is no PUSCH transmission scheduled by the C-RNTI grant, the PUSCH transmission scheduled by the CS-RNTI grant and, if there is also no PUSCH transmission scheduled by the CS-RNTI, the PUSCH transmission scheduled by the configured grant. However, it may not necessary to perform the UL grant reception operation and PUSCH transmission operation as the same operation. One of the reasons for necessity of Solution method 2 is that the configured grant may be used for scheduling URLLC data transmission. This is because, if the URLLC data transmission is consecutively scheduled by the configured grant, the corresponding data transmission should be prioritized over other data transmission (scheduled by dynamic grant). However, if the URLLC data are transmitted sporadically rather than consecutively, the transmission may be skipped in a slot where collision occurs and performed at the next transmission occasion.

Hereinafter, a description is made of the method for prioritizing a data transmission scheduled by a specific grant using the above solution methods in a PUSCH collision situation.

Figure 4H:
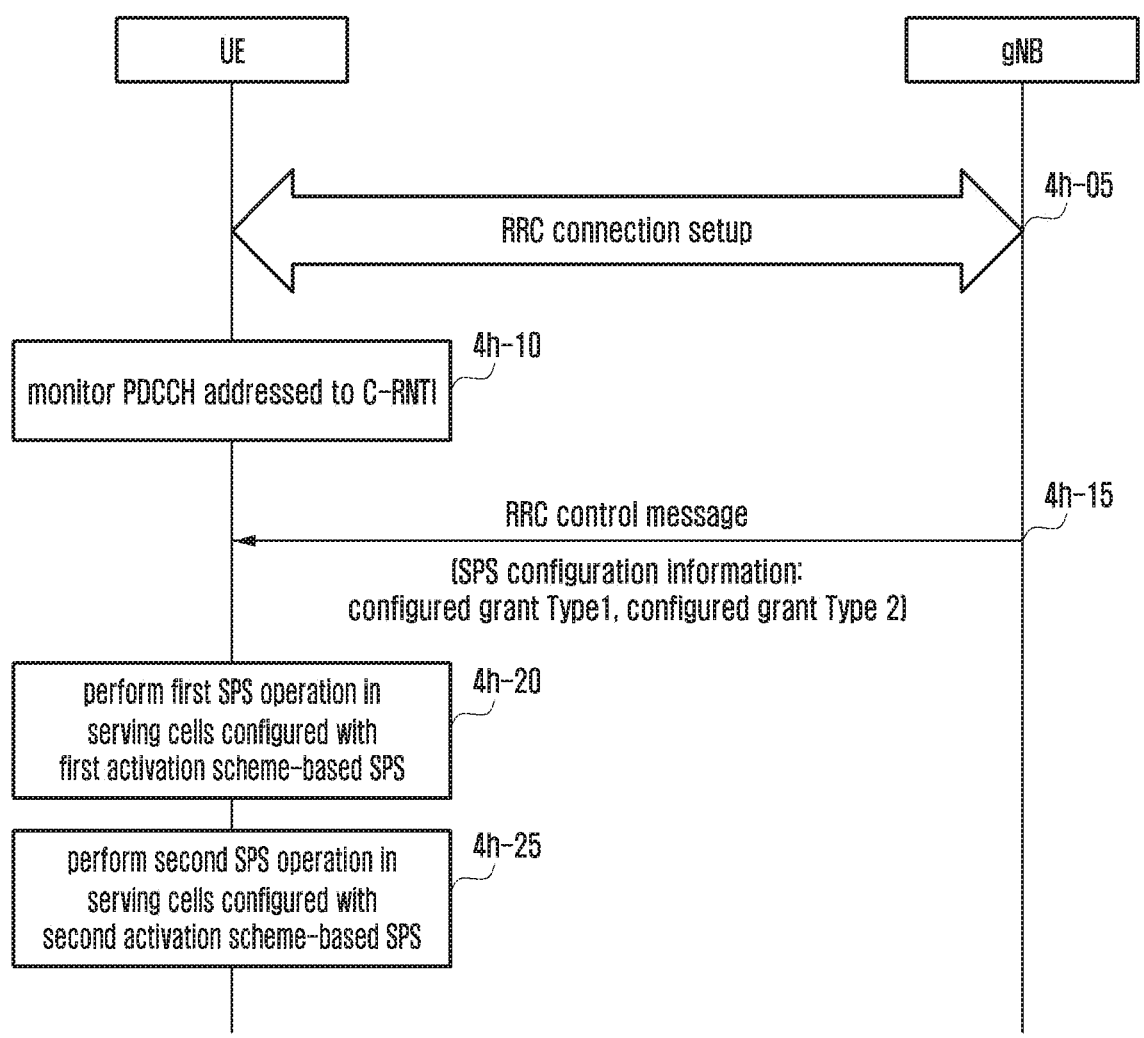
FIG. 4H is a signal flow diagram illustrating SPS-based operations between a UE and a gNB according to an embodiment of the disclosure.

FIG. 4H is a signal flow diagram illustrating SPS-based operations between a UE and a gNB according to an embodiment of the disclosure.

Referring to FIG. 4H, at operation 4h-05 the UE and the gNB establish an RRC connection. At this operation, the UE transmits a control message requesting for RRC connection setup through a random access procedure and receives a response message in reply to establish the RRC connection. In the process, the UE is allocated a C-RNTI as a UE identifier unique within the cell and communicates data with the gNB using the C-RNTI. For reference, a serving cell with the established RRC connection with the UE is the PCell for the UE.

At operation 4h-10, the UE monitors PDCCH with the C-RNTI for a downlink assignment or an uplink grant transmitted thereto.

At operation 4h-15, the UE receives an RRC control message (included in LTE RRCConnectionReconfiguration message). This control message may include UL SPS configuration information, i.e., configured grant Type 1 and configured grant Type 2. The configured grant Type 1 is associated with a first SPS operation, and the configured grant Type 2 is associated with a second SPS operation. The SPS configuration information may be transmitted per SPS operation or in common and include CS-RNTI, number of SPS UL HARQ processes, UL SPS transmission interval, UL grant, SPS start time, and information on the serving cell to which the SPS is configured.

At operation 4h-20, the UE performs the first SPS operation in the serving cells configured with a first activation scheme-based SPS.

At operation 4h-25, the UE performs the second SPS operation in the serving cells configured with a second activation scheme-based SPS.

The first SPS operation means that an SPS initial activation is performed via an RRC control message and an SPS retransmission/change/release is controlled via PDCCH. The first SPS operation may also mean that UL SPS initial transmission is indicated via a Layer 3 signal/RRC control message (or performed on the indicated transmission resources/in the indicated transmission format) and the UL SPS retransmission is indicated via a Layer 1 signal/PDCCH (or performed on the indicated transmission resources/in the indicated transmission format).

The second SPS operation may mean that the SPS initial activation, retransmission, change, and release are all controlled via PDCCH. The second SPS operation may also mean that the UL SPS initial transmission and UL SPS retransmission are all indicated via a Layer 1 signal/PDCCH. This operation may be similar to the SPS activation operation in the legacy LTE.

It is necessary to assume that basic SPS configuration information for the first and second SPS operations is received via an RRC control message.

Because only the second SPS operation (configured grant Type 2) is considered in the disclosure, the following description is made mainly of the second SPS operation.

Figure 4I:
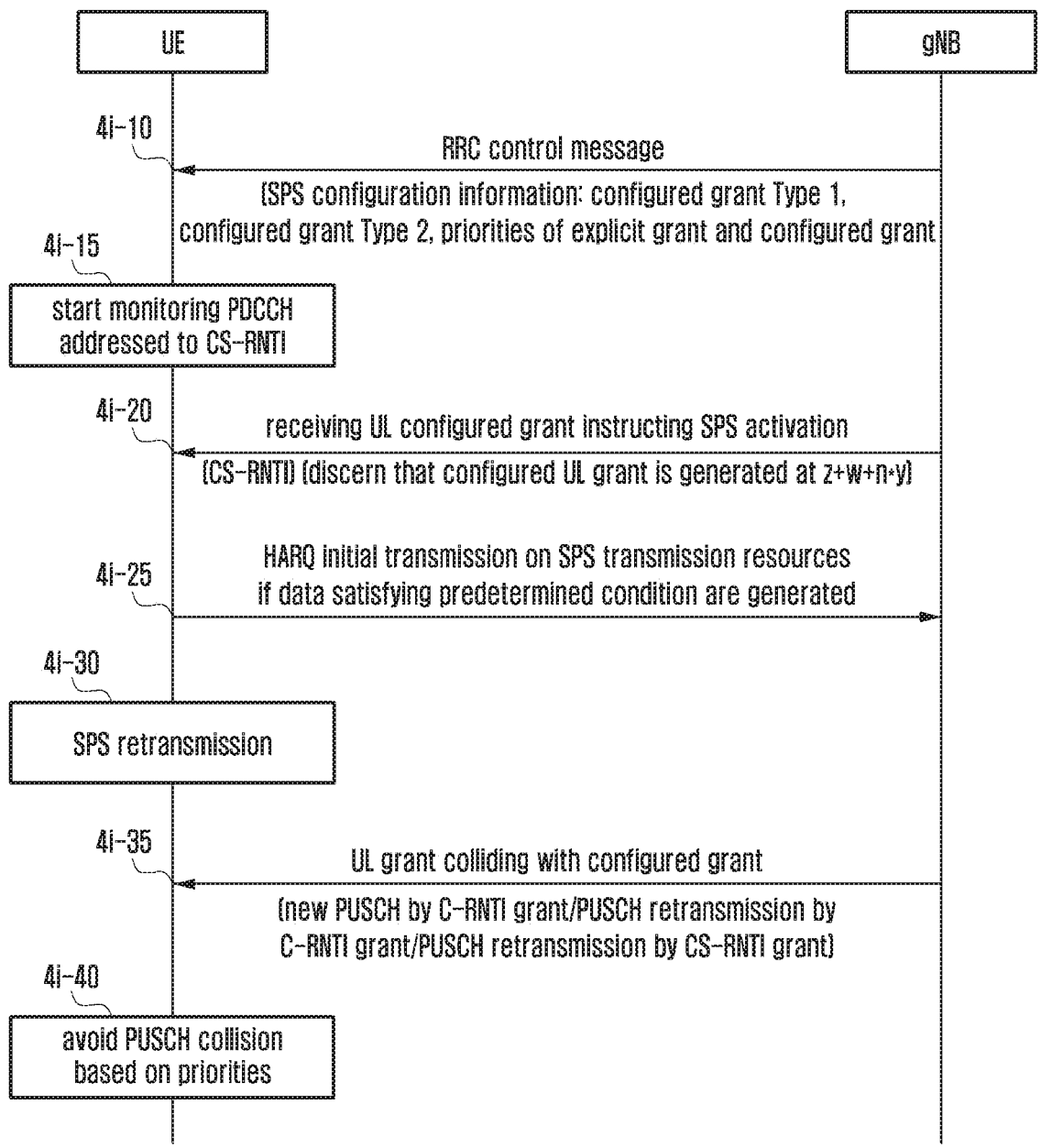
FIG. 4I is a signal flow diagram illustrating a second SPS procedure according to an embodiment of the disclosure.

FIG. 4I is a signal flow diagram illustrating a second SPS procedure according to an embodiment of the disclosure.

Referring to FIG. 4I, at operation 4i-10 the UE receives an RRC control message (included in LTE RRCConnectionReconfiguration message). This control message may include UL SPS configuration information, i.e., configured grant Type 1 and configured grant Type 2. The configured grant Type 1 is associated with a first SPS operation, and the configured grant Type 2 is associated with a second SPS operation. The SPS configuration information may be transmitted per SPS operation or in common and include CS-RNTI, number of SPS UL HARQ processes, UL SPS transmission interval, UL grant, SPS start time, and information on the serving cell to which the SPS is configured. In particular, this RRC message includes priority information on PUSCH transmissions scheduled by the explicit grant and the configured grant. The priority information may be given as fixed values in the standard.

At operation 4i-15, the UE starts monitoring PDCCHs to CS-RNTI and C-RNTI for a downlink assignment or an uplink grant at a predetermined time point in the serving cells configured with the second activation scheme-based SPS. The predetermined time point may be the time point at which the SPS configuration information is received (or the received SPS configuration information is completely interpreted or the configuration is completed based on the received configuration information).

At operation 4i-20, the UE receives a UL grant indicating activation of the SPS transmission resources via PDCCH. The UL grant is addressed to the C-RNTI of the UE and received on the PDCCH with the NDI set to 0. Assuming that the time point of receiving the PDCCH is "z", the UE activates (initializes) the SPS based on "z".

If data satisfying a predetermined condition is generated, the UE performs initial transmission on the SPS transmission resources at operation 4i-25. In detail, the UE may perform the initial transmission of the data satisfying the predetermined condition at the timing z+w+n*y. If no data satisfying the predetermined condition is generated, the UE skips the SPS data transmission on the corresponding transmission resources. Here, "w" is an integer value specified for PDCCH or a predetermined value given in the standard. The "w" denotes a temporal distance between a time point of receiving the UL grant and a time point of transmitting PUSCH scheduled by the UL grant.

At operation 4i-30, the UE performs a HARQ retransmission for the initially transmitted data on the SPS transmission resources. The UE monitors PDCCH for the UL grant addressed to the CS-RNTI and, if the UL grant addressed to the CS-RNTI is received, checks the NDI. If the NDI is set to a predetermined value, e.g., 1, the UE performs HARQ retransmission. If the NDI is set to another predetermined value, e.g., 0, the UE discards the UL grant indicated by the second SPS configuration information and uses the UL grant received via the PDCCH. That is the UE updates the SPS. If the UL grant received via the PDCCH includes information instructing release of SPS resources, the UE releases the SPS resources.

At operation 4i-35, the UE may receive a UL grant scheduling a UL transmission colliding with the PUSCH transmission scheduled by the previously configured grant. That is, a new PUSCH transmission scheduled by a C-RNTI grant, a PUSCH retransmission scheduled by a C-RNTI grant, or a PUSCH retransmission scheduled by a CS-RNTI may collide with the PUSCH transmission scheduled by the configured grant. At operation 4i-40, the UE prioritizes the PUSCH transmissions based on the priority information received previously from the gNB (or predetermined) and performs the PUSCH transmissions according to the priorities to avoid collision between the PUSCH transmissions. The PUSCH transmissions may be prioritized according to solution methods as follows.

1. Solution method 1: Prioritize PUSCH transmission scheduled by an explicit/dynamic grant (PUSCH transmission scheduled by C-RNTI grant/CS-RNTI grant is prioritized over PUSCH transmission scheduled by configured grant, when the PUSCH transmissions collide with each other)

2. Solution method 2: Prioritize PUSCH transmission scheduled by configured grant (PUSCH transmission scheduled by configured grant is prioritized over PUSCH transmission scheduled by C-RNTI grant/CS-RNTI grant, when the PUSCH transmissions collide with each other)

3. Solution method 3: Prioritize new PUSCH transmission (PUSCH transmission scheduled by configured grant for Cases 2 and 3, and method 1 or method 2 are used for Case 1)

4. Solution method 4: Prioritize PUSCH transmission scheduled by configured grant for Cases 1 and 2, and prioritize PUSCH transmission scheduled by CS-RNTI grant over PUSCH transmission scheduled by configured grant for Case 3

5. Solution method 5: Notify the UE of a prioritization method via explicit signaling (RRC signaling or MAC CE)

In particular, in the case of using Solution method 5, the gNB may change the prioritization method of the UE, whenever necessary, via explicit signaling.

Figure 4J:
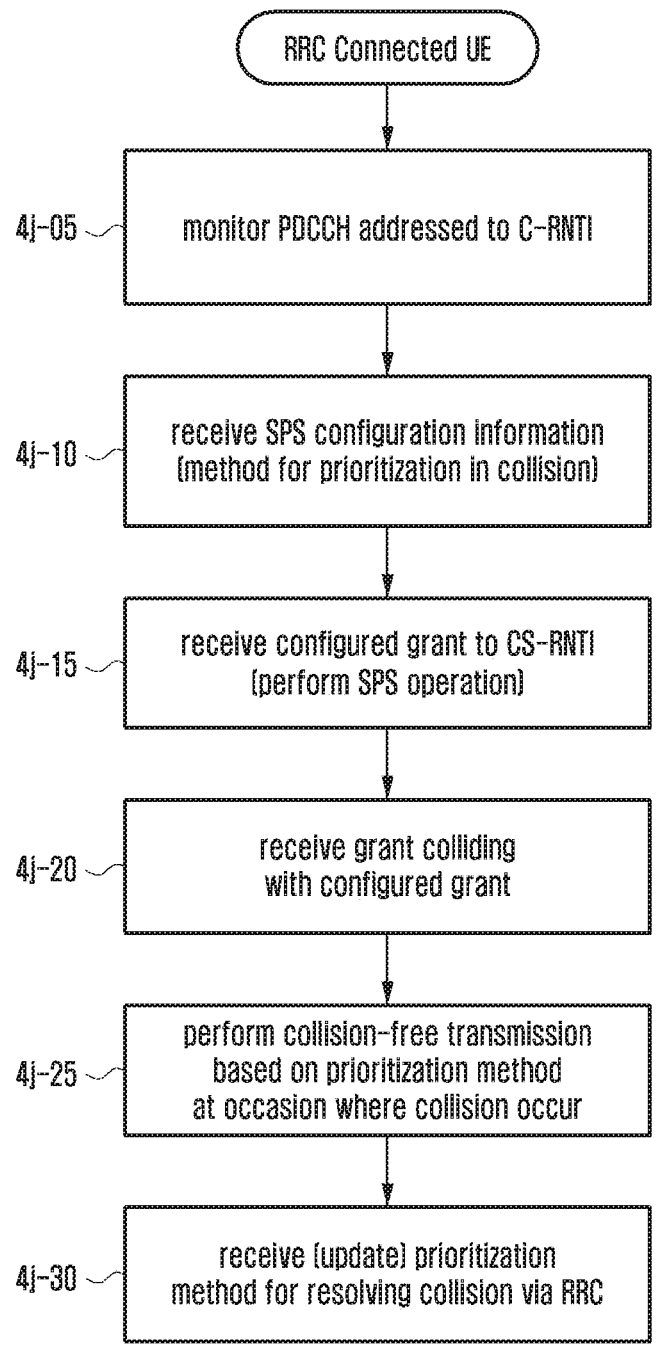
FIG. 4J is a flowchart illustrating a UE operation in a PUSCH collision avoidance procedure according to an embodiment of the disclosure.

FIG. 4J is a flowchart illustrating a UE operation in a PUSCH collision avoidance procedure according to an embodiment of the disclosure.

Referring to FIG. 4J, at operation 4j-05, the UE in the connected state monitors PDCCH with a C-RNTI to receive a downlink assignment or an uplink grant transmitted thereto. At operation 4j-10, the UE receives an RRC control message (included in LTE RRCConnectionReconfiguration message). This control message may include a UL SPS configuration information, i.e., configured grant Type 1 and configured grant Type 2. The configured grant Type 1 is associated with a first SPS operation, and the configured grant Type 2 is associated with a second SPS operation. The SPS configuration information may be transmitted per SPS operation or in common and include CS-RNTI, number of SPS UL HARQ processes, UL SPS transmission interval, UL grant, SPS start time, and information on the serving cell to which the SPS is configured. In particular, the RRC message includes priority information on PUSCH transmissions being scheduled by an explicit grant and a configured grant. The priority information may be given as fixed values in the standard.

At operation 4j-15, the UE starts monitoring PDCCHs addressed to CS-RNTI and C-RNTI for a downlink assignment or an uplink grant at a predetermined time point in the serving cells configured with the second activation scheme-based SPS. The predetermined time point may be the time point at which the SPS configuration information is received (or the received SPS configuration information is completely interpreted or the configuration is completed based on the received configuration information). The UE receives a UL grant instructing activation of SPS transmission resources via PDCCH. The UL grant is addressed to the C-RNTI of the UE and received on the PDCCH with the NDI set to 0. Assuming that the time point of receiving the PDCCH is "z", the UE activates (initializes) the SPS based on "z". If data satisfying a predetermined condition is generated, the UE performs initial transmission on the SPS transmission resources. In detail, the UE may perform the initial transmission of the data satisfying the predetermined condition at the timing z+w+n*y. If no data satisfying the predetermined condition is generated, the UE skips the SPS data transmission on the corresponding transmission resources. Here, "w" is an integer value specified for PDCCH or a predetermined value given in the standard. The "w" denotes a temporal distance between a time point of receiving the UL grant and a time point of transmitting PUSCH scheduled by the UL grant.

At operation 4j-20, the UE may receive a UL grant scheduling a UL transmission colliding with the PUSCH transmission scheduled by the previously configured grant. That is, a new PUSCH transmission scheduled by a C-RNTI grant, a PUSCH retransmission scheduled by a C-RNTI grant, or a PUSCH retransmission scheduled by a CS-RNTI may collide with the PUSCH transmission scheduled by the configured grant. At operation 4j-25, the UE prioritizes the PUSCH transmissions based on the priority information received previously from the gNB (or predetermined) and performs PUSCH transmissions according to the priorities to avoid collision between the PUSCH transmissions. The PUSCH transmissions may be prioritized according to solution methods as follows.

1. Solution method 1: Prioritize PUSCH transmission scheduled by an explicit/dynamic grant (PUSCH transmission scheduled by C-RNTI grant/CS-RNTI grant is prioritized over PUSCH transmission scheduled by configured grant, when the PUSCH transmissions collide with each other)

2. Solution method 2: Prioritize PUSCH transmission scheduled by configured grant (PUSCH transmission scheduled by configured grant is prioritized over PUSCH transmission scheduled by C-RNTI grant/CS-RNTI grant, when the PUSCH transmissions collide with each other)

3. Solution method 3: Prioritize new PUSCH transmission (PUSCH transmission scheduled by configured grant for Cases 2 and 3, and method 1 or method 2 are used for Case 1)

4. Solution method 4: Prioritize PUSCH transmission scheduled by configured grant for Cases 1 and 2, and prioritize PUSCH transmission scheduled by CS-RNTI grant over PUSCH transmission scheduled by configured grant for Case 3

5. Solution method 5: Notify the UE of a prioritization method via explicit signaling (RRC signaling or MAC CE)

In particular, in the case of using Solution method 5, the UE may receive explicit signaling from the gNB to update the prioritization method at operation 4j-30. That is, operation 4j-30 may be received and applied by an event-driven manner in an arbitrary operation.

Figure 4K:
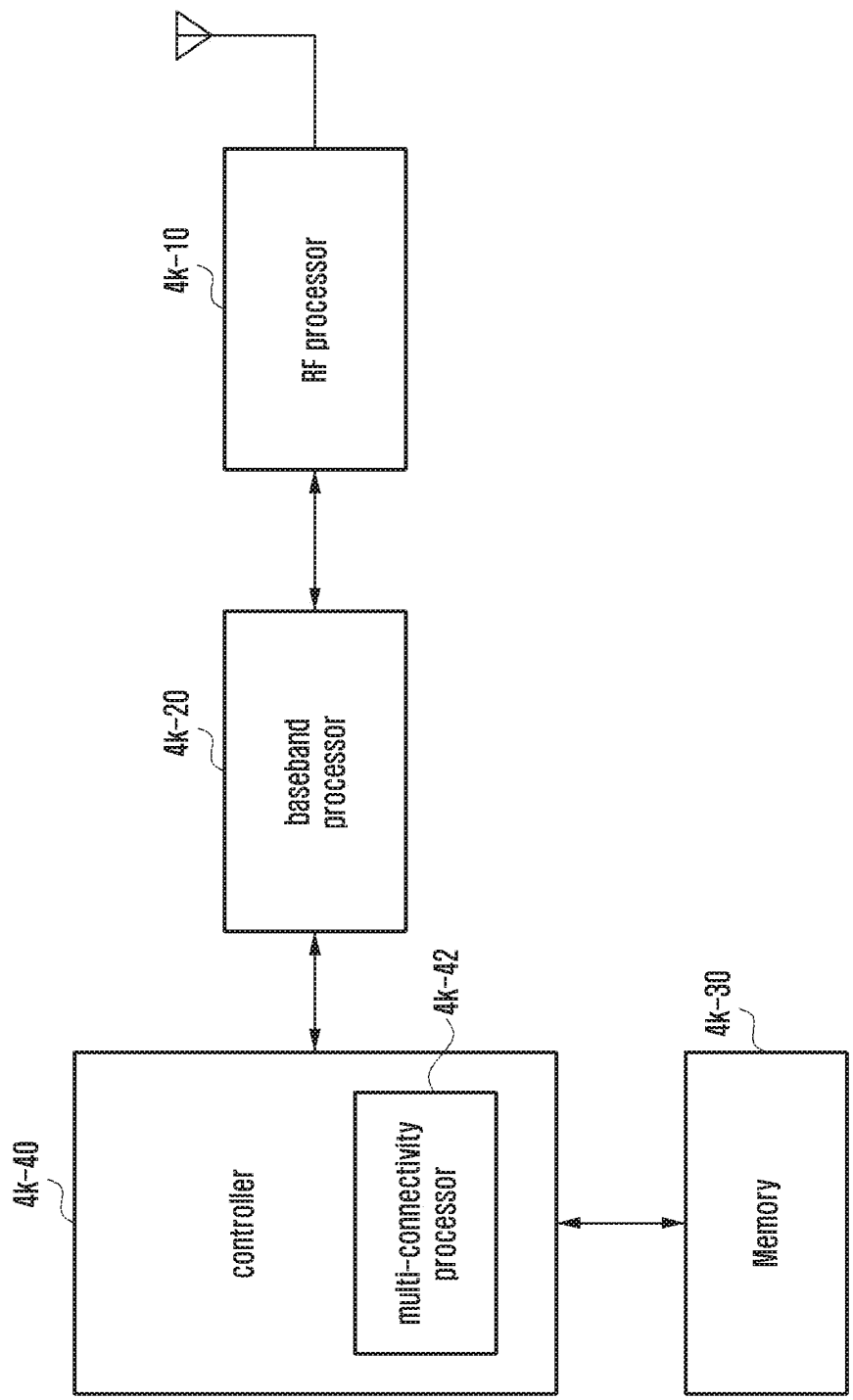
FIG. 4K is a block diagram illustrating a configuration of a UE according to an embodiment of the disclosure.

FIG. 4K is a block diagram illustrating a configuration of a UE according to an embodiment of the disclosure.

Referring to FIG. 4K, the UE includes a radio frequency (RF) processor 4k-10, a baseband processor 4k-20, a memory 4k-30, a controller 4k-40 and a multi-connectivity processor 4k-42.

The RF processor 4k-10 has a function for transmitting/receiving a signal over a radio channel such as band conversion and amplification of the signal. That is, the RF processor 4k-10 up-converts a baseband signal from the baseband processor 4k-20 to an RF band signal and transmits the RF signal via an antenna and down-converts the RF signal received via the antenna to a baseband signal. For example, the RF processor 4k-10 may include a transmission filter, a reception filter, an amplifier, a mixer, an oscillator, a digital-to-analog converter (DAC), and an analog-to-digital converter (ADC). Although one antenna is depicted in the drawing, the UE may be provided with a plurality of antennas. The RF processor 4k-10 may also include a plurality of RF chains. The RF processor 4k-10 may perform beamforming. For beamforming, the RF processor 4k-10 may adjust the phase and size of a signal to be transmitted/received by means of the antennas or antenna elements. The RF processor 4k-10 may be configured to support a MIMO scheme with which the UE can receive multiple layers simultaneously.

The baseband processor 4k-20 has a baseband signal-bit string conversion function according to a physical layer standard of the system. For example, in a data transmission mode, the baseband processor 4k-20 performs encoding and modulation on the transmission bit string to generate complex symbols. In a data reception mode, the baseband processor 4k-20 performs demodulation and decoding on the baseband signal from the RF processor 4k-10 to recover the transmitted bit string. In the case of using an OFDM scheme for data transmission, the baseband processor 4k-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 4k-20 splits the baseband signal from the RF processor 4k-10 into OFDM symbols, performs fast Fourier transform (FFT) on the OFDM symbols to recover the signals mapped to the subcarriers, and performs demodulation and decoding on the signals to recover the transmitted bit string.

The baseband processor 4k-20 and the RF processor 4k-10 process the transmission and reception signals as described above. Accordingly, the baseband processor 4k-20 and the RF processor 4k-10 may be referred to as a transmitter, a receiver, a transceiver, or a communication unit. At least one of the baseband processor 4k-20 and the RF processor 4k-10 may include a plurality of communication modules for supporting different radio access technologies. At least one of the baseband processor 4k-20 and the RF processor 4k-10 may also include multiple communication modules for processing the signals in different frequency bands. For example, the different radio access technologies may include a wireless local area network (WLAN) (e.g., Institute of Electrical and Electronics Engineers (IEEE) 802.11) and a cellular network (e.g., LTE). The different frequency bands may include a super high frequency (SHF) band (e.g., 2.5 GHz and 5 GHz bands) and an mmWave band (e.g., 60 GHz).

The memory 4k-30 stores data such as basic programs for operation of the UE, application programs, and setting information. The memory 4k-30 may also store the information on a second access node for radio communication with a second radio access technology. The memory 4k-30 provides the stored information in response to a request from the controller 4k-40.

The controller 4k-40 controls overall operations of the UE. For example, the controller 4k-40 controls the baseband processor 4k-20 and the RF processor 4k-10 for transmitting and receiving signals. The controller 4k-40 writes and reads data to and from the memory 4k-40. For this purpose, the controller 4k-40 may include at least one processor. For example, the controller 4k-40 may include a communication processor (CP) for controlling communications and an application processor (AP) for controlling higher layer programs such as applications.

Figure 4L:
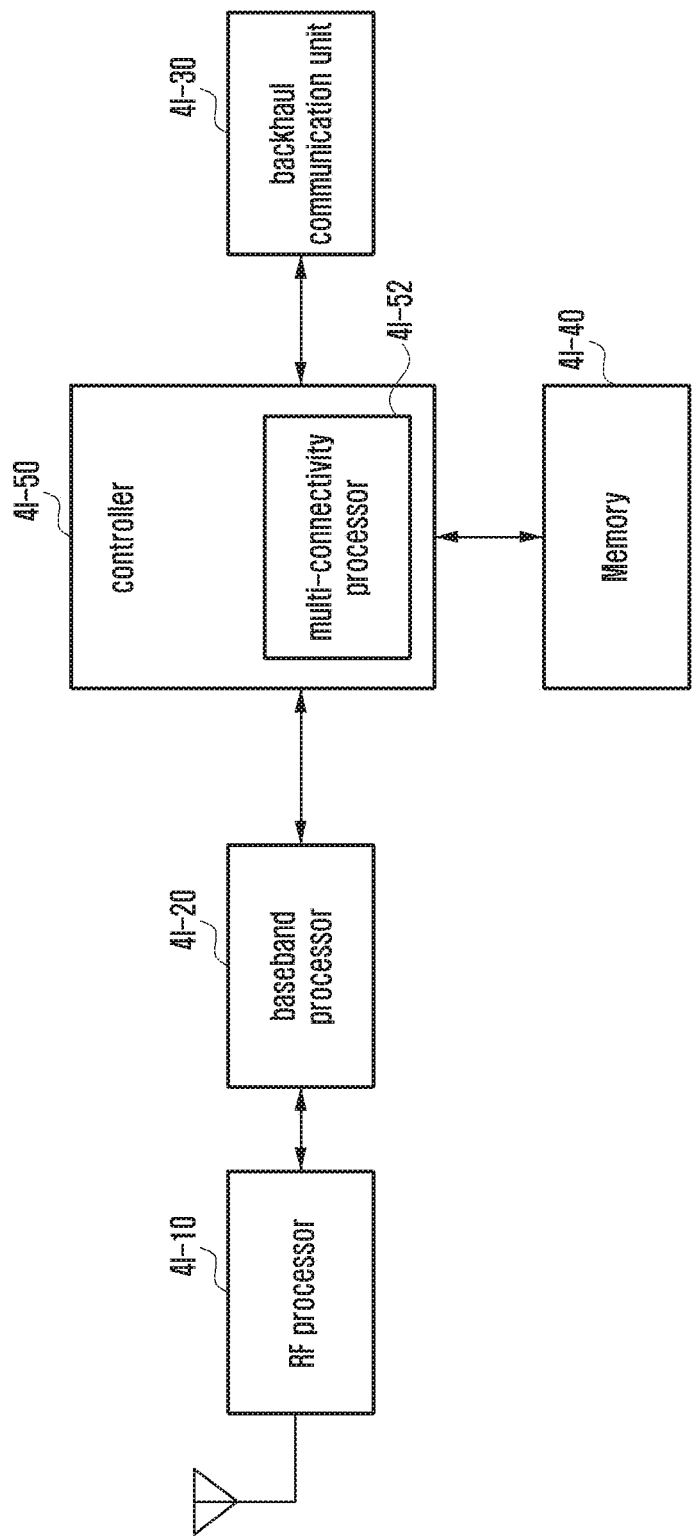
FIG. 4L is a block diagram illustrating a configuration of a gNB according to an embodiment of the disclosure.

FIG. 4L is a block diagram illustrating a configuration of a base station according to an embodiment of the disclosure.

Referring to FIG. 4L, the base station includes an RF processor 4l-10, a baseband processor 4l-20, a backhaul communication unit 4l-30, a memory 4l-40, a controller 4l-50 and a multi-connectivity processor 4l-52.

The RF processor 4l-10 has a function for transmitting/receiving a signal over a radio channel such as band conversion and amplification of the signal. That is, the RF processor 4l-10 up-converts a baseband signal from the baseband processor 4l-20 to an RF band signal and transmits the RF signal via an antenna and down-converts the RF signal received via the antenna to a baseband signal. For example, the RF processor 4l-10 may include a transmission filter, a reception filter, an amplifier, a mixer, an oscillator, a DAC, and an ADC. Although one antenna is depicted in the drawing, the base station may be provided with a plurality of antennas. The RF processor 4l-10 may also include a plurality of RF chains. The RF processor 4l-10 may perform beamforming. For beamforming, the RF processor 4l-10 may adjust the phase and size of a signal to be transmitted/received by means of the antennas or antenna elements. The RF processor 4l-10 may be configured to transmit one or more layers for a downlink MIMO operation.

The baseband processor 4l-20 has a baseband signal-bit string conversion function according to a physical layer standard of the system. For example, in a data transmission mode, the baseband processor 4l-20 performs encoding and modulation on the transmission bit string to generate complex symbols. In a data reception mode, the baseband processor 4l-20 performs demodulation and decoding on the baseband signal from the RF processor 4l-10 to recover the transmitted bit string. In the case of using an OFDM scheme for data transmission, the baseband processor 4l-20 performs encoding and modulation on the transmission bit string to generate complex symbols, maps the complex symbols to subcarriers, performs inverse fast Fourier transform (IFFT) on the symbols, and inserts a cyclic prefix (CP) into the symbols to generate OFDM symbols. In the data reception mode, the baseband processor 4l-20 splits the baseband signal from the RF processor 4l-10 into OFDM symbols, performs fast Fourier transform (FFT) on the OFDM symbols to recover the signals mapped to the subcarriers, and performs demodulation and decoding on the signals to recover the transmitted bit string. The baseband processor 4l-20 and the RF processor 4l-10 process the transmission and reception signals as described above. Accordingly, the baseband processor 4l-20 and the RF processor 4l-10 may be referred to as a transmitter, a receiver, a transceiver, or a communication unit.

The backhaul communication unit 4l-30 provides an interface for communication with other nodes in the network. That is, the backhaul communication unit 4l-30 converts a bit string to be transmitted from the base station to another node, e.g., another base station and core network, to a physical signal and converts a physical signal received from another node to a bit string.

The memory 4l-40 stores data such as basic programs for operation of the gNB, application programs, and setting information. The memory 4l-40 may also store the information on the bearers established for UEs and measurement results reported by the connected UEs. The memory 4l-40 may also store the information for use by a UE in determining whether to enable or disable multi-connectivity. The memory 4l-40 may provide the stored data in reference to a request from the controller 4l-50.

The controller 4l-50 controls overall operations of the base station. For example, the controller 4l-50 controls the baseband processor 4l-20, the RF processor 4l-10, and the backhaul communication unit 4l-30 for transmitting and receiving signals. The controller 4l-50 writes and reads data to and from the memory 4l-40. For this purpose, the controller 4l-50 may include at least one processor.

The disclosure is summarized as follows.

[Main Issue]

PUSCH collision problem between dynamic grant and configured grant

[Observations]

The following information is the content included in the legacy MAC specification.

- The ul-assignment-to-UL-data may be explicitly indicated by UL grant and another grant by the grant.
- If two UL grants indicating the same PUSCH occasion are received at different time points, the collision between the two PUSCH transmissions that is considered in NR may occur between the two UL grants.
- If a PUSCH collision occurs between explicit grants, this is a scheduler's error. The base station should be designed to avoid such a collision, which does not need to be reflected to the technical specification.
- However, there are cases where PUSCH collisions cannot be avoided. A collision between a PUSCH scheduled by an explicit UL grant and a PUSCH scheduled by a UL grant cannot be avoided.
- The skipUplinkTx is applied as default to all configured UL grants. This means that the base station cannot discern, when a slot is configured by a UL grant, the slot to be actually used.
- The base station may avoid the collision by refraining from scheduling by dynamic grants in all of the slots available for UL transmissions scheduled by configured grants.
- This strategy may be very inefficient and even may not work if the configured grants have short periodicities. (If every slot is configured by a UL grant, there is no spare slot for dynamic scheduling.)
- Because the configured grant is used only for a new transmission, a collision may occur between the new PUSCH transmission scheduled by the configured grant and one of new transmissions scheduled by a C-RNTI grant, a PUSCH retransmission scheduled by a C-RNTI grant, and a PUSCH retransmission scheduled by a CS-RNTI grant.

<Possible PUSCH Collisions>

| | Explicit grant based PUSCH tx | Configured grant based PUSCH tx |
|---|---|---|
| Case 1 | new PUSCH by C-RNTI grant | new PUSCH by configured grant |
| Case 2 | PUSCH retransmission by C-RNTI grant | new PUSCH by configured grant |
| Case 3 | PUSCH retransmission by CS-RNTI grant | new PUSCH by configured grant |
| other cases | GNB can avoid other cases (e.g. collisions between two explicit grants or between two configured grants) | |

[Discussion/Possible Solutions]

Basically, two solution methods (principles) can be considered.

1: Prioritize explicit grant (e.g., C-RNTI grant/CS-RNTI grant>configured grant and data for transmission)

2: Prioritize configured grant (e.g., configured grant and data for transmission>C-RNTI grant/CS-RNTI grant)

It may be possible to consider enhanced solution methods as follows:

3: Prioritize new transmission (tx) grant with an additional rule for handling case 1 (prioritize configured grant in case 2 and case 3)

4: Prioritize configured grant+CS-RNTI grant for case 1 and case 2 over configured grant for case 3

5: base station notifies priorities in a dedicated manner (RRC, MAC CE, etc.).

In Rel-15, it is proposed to consider only solution methods 1 and 2.

From the viewpoint of the base station complexity, it is preferable to prioritize the explicit grant (solution method 1). The base station attempts decoding on the explicit grant based on the PUSCH transmission_scheduled as default. Accordingly, if the configured grant is prioritized (solution method 2), the base station has to perform double decodings for the explicit grant and the configured grant.

Prioritizing the explicit grant is a good fit for the current principle of the NR MAC specification. The MAC operating based on the receipt of UL grants handles the C-RNTI uplink grant and, if no C-RNTI grant is received, the CS-RNTI uplink grant and, if no SC-RNTI uplink grant is received, then the configured grant. However, there may be a debate about the above-described principles for PUSCH transmissions scheduled by different UL grants, and there is no obvious reason for applying the same principle for handling PUSCH transmissions collisions.

One problem of solution method 1 is that the URLLC data scheduled by a configured grant may be disrupted by normal data scheduled by an explicit grant. In particular, a problem arises when the URLLC data are generated consecutively. If the URLLC data are generated just sporadically, this may cause a significant problem to the URLLC data that can be transmitted in the next slot.

As described above, the disclosure is advantageous in terms of allowing a terminal to request for system information efficiently in a next generation mobile communication system.

The disclosure is also advantageous in terms of allowing a terminal to report per-base station transmit powers accurately in order for a base station to perform uplink scheduling correctly.

The disclosure is also advantageous in terms of allowing a terminal to perform a power headroom report in adaptation to the situation (e.g., situation where only a PCell exists and situation where multiple SCells exist) for the case where PUSCHs are configured to the terminal on two uplinks, using the proposed power headroom format and method for reporting the power headroom, in a next generation mobile communication system using an SUL frequency.

The disclosure is also advantageous in terms of making it possible for a transmitting end to prioritize, when a configured grant and a dynamic grant for uplink transmissions of a terminal collide with each other in a next generation mobile communication system, the transmissions properly in a situation-adaptive manner and for a receiving end to perform in a configured method so as to receive data errorlessly by defining operations to be taken accurately in such a collision situation. The disclosure is also advantageous in terms of improving data transmission resources utilization efficiency by prioritizing transmission resources in consideration of the resource efficiency and the collision situation by taking notice that a collision situation occurs in the course of improvement of the resource utilization efficiency that risks the collision of PUSCH resources.

The disclosure is also advantageous in terms of facilitating a HARQ process sharing by adding a condition for making it possible to apply the HARQ process sharing between configured uplink resources and dynamic resources, even if an uplink transmission is skipped, in the next generation mobile communication system. This makes it possible to use a restricted number of HARQ processes efficiently.

It is to be appreciated that those skilled in the art can change or modify the embodiments without departing from the technical concept of this disclosure. Accordingly, it should be understood that the above-described embodiments are essentially for illustrative purposes only and not in any way for restriction thereto. Thus the scope of the disclosure should be determined by the appended claims and their legal equivalents rather than the specification, and various alterations and modifications within the definition and scope of the claims are included in the claims.

Although various embodiments of the disclosure have been described using specific terms, the specification and drawings are to be regarded in an illustrative rather than a restrictive sense in order to help understand the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a terminal in a wireless communication system, the method comprising:
   transmitting, to a base station, a first message for initiating a random access procedure;
   receiving, from the base station, a second message including a timing advance command, a temporary cell-radio network temporary identifier (C-RNTI) and an uplink grant, based on the first message;
   starting a time alignment timer associated with the timing advance command;
   transmitting, to the base station, a third message based on the uplink grant;
   receiving, from the base station, a fourth message for a completion of the random access procedure, based on the third message; and
   stopping the time alignment timer associated with the timing advance command based on a contention resolution for the random access procedure being identified successful by the fourth message, in case that the random access procedure was initiated for system information (SI) request,
   wherein the temporary C-RNTI is discarded according to the reception of the fourth message, based on the random access procedure being initiated for the SI request.

2. The method of claim 1,
   wherein the fourth message is a contention resolution message, and
   wherein the contention resolution is identified successful based on the fourth message being received before an expiration of a timer for monitoring a reception of the contention resolution message.

3. The method of claim 1,
wherein C-RNTI is set to the temporary C-RNTI according to a reception of the fourth message, based on the random access procedure not being initiated for the SI request.

4. A method by a base station in a wireless communication system, the method comprising:
receiving, from a terminal, a first message for initiating a random access procedure;
transmitting, to the terminal, a second message including a timing advance command, a temporary cell-radio network temporary identifier (C-RNTI), and an uplink grant, based on the first message;
receiving, from the terminal, a third message based on the uplink grant; and
transmitting, to the terminal, a fourth message for a completion of the random access procedure, based on the third message,
wherein a time alignment timer associated with the timing advance command is started by the terminal based on the second message,
wherein the time alignment timer associated with the timing advance command is stopped by the terminal based on a contention resolution for the random access procedure being identified successful by the fourth message, in case that the random access procedure was initiated for SI request, and
wherein the temporary C-RNTI is discarded by the terminal according to the reception of the fourth message, based on the random access procedure being initiated for the SI request.

5. The method of claim 4,
wherein the fourth message is a contention resolution message, and
wherein the contention resolution is identified successful by the terminal based on the fourth message being received before an expiration of a timer for monitoring a reception of the contention resolution message.

6. The method of claim 4,
wherein C-RNTI is set to the temporary C-RNTI by the terminal according to a reception of the fourth message, based on the random access procedure not being initiated for the SI request.

7. A terminal in a wireless communication system, comprising:
a transceiver; and
a controller configured to:
control the transceiver to transmit, to a base station, a first message for initiating a random access procedure,
control the transceiver to receive, from the base station, a second message including a timing advance command, a temporary cell-radio network temporary identifier (C-RNTI), and an uplink grant, based on the first message,
start a time alignment timer associated with the timing advance command,
control the transceiver to transmit, to the base station, a third message based on the uplink grant,
control the transceiver to receive, from the base station, a fourth message for a completion of the random access procedure, based on the third message,
stop the time alignment timer associated with the timing advance command based on a contention resolution for the random access procedure being identified successful by the fourth message, in case that the random access procedure was initiated for system information (SI) request, and
discard the temporary C-RNTI according to the reception of the fourth message, based on the random access procedure being initiated for the SI request.

8. The terminal of claim 7,
wherein the fourth message is a contention resolution message, and
wherein the controller is configured to identify a success of the contention resolution based on the fourth message being received before an expiration of a timer for monitoring a reception of the contention resolution message.

9. The terminal of claim 7,
wherein the controller is further configured to set C-RNTI to the temporary C-RNTI according to a reception of the fourth message, based on the random access procedure not being initiated for the SI request.

10. A base station in a wireless communication system, comprising:
a transceiver; and
a controller configured to:
control the transceiver to receive, from a terminal, a first message for initiating a random access procedure,
control the transceiver to transmit, to the terminal, a second message including a timing advance command, a temporary cell-radio network temporary identifier (C-RNTI), and an uplink grant, based on the first message,
control the transceiver to receive, from the terminal, a third message based on the uplink grant, and
control the transceiver to transmit, to the terminal, a fourth message for a completion of the random access procedure, based on the third message,
wherein a time alignment timer associated with the timing advance command is started by the terminal based on the second message,
wherein the time alignment timer associated with the timing advance command is stopped by the terminal based on a contention resolution for the random access procedure being identified successful by the fourth message, in case that the random access procedure was initiated for SI request, and
wherein the temporary C-RNTI is discarded by the terminal according to the reception of the fourth message, based on the random access procedure being initiated for the SI request.

11. The base station of claim 10,
wherein the fourth message is a contention resolution message, and
wherein the contention resolution is identified successful by the terminal based on the fourth message being received before an expiration of a timer for monitoring a reception of the contention resolution message.

12. The base station of claim 10,
wherein C-RNTI is set to the temporary C-RNTI by the terminal according to a reception of the fourth message, based on the random access procedure not being initiated for the SI request.

* * * * *